US010411335B2

(12) United States Patent
Sung et al.

(10) Patent No.: US 10,411,335 B2
(45) Date of Patent: Sep. 10, 2019

(54) ELECTRONIC DEVICE COMPRISING ANTENNA

(71) Applicant: Samsung Electronics Co., Ltd., Suwon-si, Gyeonggi-do (KR)

(72) Inventors: Sang Bong Sung, Seongnam-si (KR); Se Woong Kim, Gimhae-si (KR); Su Min Yun, Incheon (KR); Woo Suk Kang, Seoul (KR); In Young Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/008,553

(22) Filed: Jun. 14, 2018

(65) Prior Publication Data

US 2018/0366817 A1 Dec. 20, 2018

(30) Foreign Application Priority Data

Jun. 16, 2017 (KR) ........................ 10-2017-0076585

(51) Int. Cl.
*H01Q 1/24* (2006.01)
*H01Q 1/32* (2006.01)
(Continued)

(52) U.S. Cl.
CPC .............. *H01Q 1/38* (2013.01); *H01Q 1/243* (2013.01); *H01Q 1/32* (2013.01); *H01Q 1/48* (2013.01);
(Continued)

(58) Field of Classification Search
CPC ........... H01Q 1/38; H01Q 1/243; H01Q 1/32; H01Q 1/48; H01Q 1/521; H01Q 9/0407;
(Continued)

(56) References Cited

U.S. PATENT DOCUMENTS 7,800,542 B2  9/2010  Li et al.
8,179,324 B2  5/2012  Rao et al.
(Continued)

FOREIGN PATENT DOCUMENTS

CN  106654556 A  5/2017
EP  3 147 999 A1  3/2017
(Continued)

OTHER PUBLICATIONS

International Search Report dated Sep. 28, 2018, issued in International Patent Application No. PCT/KR2018/006726.
(Continued)

*Primary Examiner* — Nguyen T Vo
(74) *Attorney, Agent, or Firm* — Jefferson IP Law, LLP

(57) ABSTRACT

An antenna assembly in a vehicle is provided. The antenna assembly includes a first plane including a first edge and a second edge extending in parallel to each other in a first direction, a second plane spaced apart from the first plane that overlaps the first plane and including a third edge extending along the first edge, and a fourth edge extending along the second edge, a non-conductive layer interposed between the first plane and the second plane, and a plurality of wireless communication circuits electrically connected to the antenna assembly, wherein the first conductive pattern and the second conductive pattern are positioned diagonally at opposing corners with each other when viewed from above the first plane, and wherein the third conductive pattern and the fourth conductive pattern are positioned diagonally against each other without overlapping with the first and second conductive patterns, when viewed from above the first plane.

20 Claims, 34 Drawing Sheets

(51) Int. Cl.
| | |
|---|---|
| *H01Q 1/38* | (2006.01) |
| *H01Q 1/48* | (2006.01) |
| *H01Q 1/52* | (2006.01) |
| *H01Q 7/00* | (2006.01) |
| *H01Q 9/04* | (2006.01) |
| *H04B 1/40* | (2015.01) |
| *H04W 4/40* | (2018.01) |
| *H01Q 13/10* | (2006.01) |
| *H01Q 21/28* | (2006.01) |

(52) U.S. Cl.
CPC ............ *H01Q 1/521* (2013.01); *H01Q 9/0407* (2013.01); *H01Q 13/10* (2013.01); *H01Q 21/28* (2013.01); *H04B 1/40* (2013.01); *H01Q 7/00* (2013.01); *H04W 4/40* (2018.02)

(58) Field of Classification Search
CPC .......... H01Q 13/10; H01Q 21/28; H01Q 7/00; H04B 1/40; H04W 4/40
See application file for complete search history.

(56) References Cited

U.S. PATENT DOCUMENTS

| | | | |
|---|---|---|---|
| 8,730,110 | B2 | 5/2014 | Rao |
| 8,750,798 | B2 | 6/2014 | Rao et al. |
| 8,786,497 | B2 | 7/2014 | Sharawi |
| 8,791,865 | B2 * | 7/2014 | Su .............................. H01Q 1/38 |
| | | | 343/702 |
| 8,952,855 | B2 | 2/2015 | Andujar Linares et al. |
| 9,000,984 | B2 | 4/2015 | Rao et al. |
| 9,112,284 | B2 | 8/2015 | Andujar Linares et al. |
| 9,276,321 | B2 | 3/2016 | Smith et al. |
| 9,319,155 | B2 | 4/2016 | Rao et al. |
| 9,653,813 | B2 | 5/2017 | Smith et al. |
| 9,666,946 | B1 | 5/2017 | Sharawi et al. |
| 9,705,182 | B2 * | 7/2017 | Hsu ........................ H01Q 1/245 |
| 9,997,841 | B2 | 6/2018 | Andujar Linares et al. |
| 2009/0289852 | A1 | 11/2009 | Li et al. |
| 2010/0194642 | A1 | 8/2010 | Rao et al. |
| 2011/0215971 | A1 | 9/2011 | Rao |
| 2012/0009884 | A1 | 1/2012 | Rao et al. |
| 2012/0038519 | A1 | 2/2012 | Su |
| 2012/0139793 | A1 | 6/2012 | Sharawi |
| 2012/0200462 | A1 | 8/2012 | Rao et al. |
| 2012/0287011 | A1 * | 11/2012 | Smith .................. H01Q 9/0421 |
| | | | 343/853 |
| 2013/0009842 | A1 | 1/2013 | Smith et al. |
| 2013/0187825 | A1 | 7/2013 | Andujar Linares et al. |
| 2014/0198832 | A1 | 7/2014 | Rao et al. |
| 2015/0162667 | A1 | 6/2015 | Andujar Linares et al. |
| 2015/0333414 | A1 | 11/2015 | Andujar Linares et al. |
| 2016/0301145 | A1 | 10/2016 | Lee et al. |
| 2017/0005398 | A1 | 1/2017 | Andujar Linares et al. |
| 2017/0141473 | A1 | 5/2017 | Sharawi et al. |

FOREIGN PATENT DOCUMENTS

| | | |
|---|---|---|
| KR | 10-2015-0108689 A | 9/2015 |
| KR | 10-2016-0061770 A | 6/2016 |
| WO | 2013/090783 A1 | 6/2013 |

OTHER PUBLICATIONS

European Search Report dated Oct. 18, 2018, issued in European Patent Application No. 18177804.4.

* cited by examiner

ELECTRONIC DEVICE COMPRISING ANTENNA

CROSS-REFERENCE TO RELATED APPLICATION(S)

This application is based on and claims priority under 35 U.S.C. § 119(a) of a Korean patent application number 10-2017-0076585, filed on Jun. 16, 2017, in the Korean Intellectual Property Office, the disclosure of which is incorporated by reference herein its entirety.

BACKGROUND

1. Field

The disclosure relates to a technology for implementing the antenna of an electronic device.

2. Description of Related Art

Wireless communication technology makes it possible to transmit and receive various forms of information such as a text, an image, a video, voice, and the like. With the advent of autonomous vehicles, an automotive communication technology for continuously communicating with road infrastructure and other vehicles and for exchanging or sharing various pieces of useful information such as a traffic condition or the like has been recently developed. For example, a shark fin antenna supporting one or more communication protocols such as digital multimedia broadcasting (DMB) and global positioning system (GPS) may be mounted in a vehicle.

The above information is presented as background information only to assist with an understanding of the disclosure. No determination has been made, and no assertion is made, as to whether any of the above might be applicable as prior art with regard to the disclosure.

SUMMARY

Since being exposed to the outside, an antenna for a vehicle such as shark fin antenna may deface the exterior of a vehicle and may be damaged by an external environment according to the related art. Also, when the vehicle drives at a high speed, a wind noise may occur.

Aspects of the disclosure are to address at least the above-mentioned problems and/or disadvantages and to provide at least the advantages described below. Accordingly, an aspect of the disclosure is to provide an integrated antenna module capable of being efficiently installed in a vehicle by integrating antennas supporting various bands within a specific space.

Another aspect of the disclosure is to provide an integrated antenna module that employs an antenna supporting multi input multi output (MIMO) communication to maximize data transmission rate and effectively arranges a multi-band antenna to reduce electromagnetic mutual coupling between antennas and to have the improved isolation performance.

Additional aspects will be set forth in part in the description which follows and, in part, will be apparent from the description, or may be learned by practice of the presented embodiments.

In accordance with an aspect of the disclosure, an antenna assembly in a vehicle is provided. The antenna assembly includes a first plane including a first edge and a second edge extending in parallel to each other in a first direction, a second plane spaced apart from the first plane that overlaps the first plane and including a third edge extending along the first edge, and a fourth edge extending along the second edge, a non-conductive layer interposed between the first plane and the second plane, and a plurality of wireless communication circuits electrically connected to the antenna assembly. The first plane may include a first conductive pattern formed along a portion of the first edge, and a second conductive pattern formed along a portion of the second edge, and the first conductive pattern and the second conductive pattern may be positioned diagonally at opposing corners with each other when viewed from above the first plane. The second plane may include a third conductive pattern formed along a portion of the third edge, and a fourth conductive pattern formed along a portion of the fourth edge, and the third conductive pattern and the fourth conductive pattern may be positioned diagonally at opposing corners each other without overlapping with the first and second conductive patterns, when viewed from above the first plane.

In accordance with another aspect of the disclosure, a housing of an electronic device is provided. The housing includes a first plane including a first edge and a second edge extending in parallel to each other in a first direction, a second plane spaced from the first plane that overlaps the first plane and including a third edge extending along the first edge, and a fourth edge extending along the second edge, a non-conductive layer interposed between the first plane and the second plane, and a plurality of wireless communication circuits electrically connected to conductive patterns including a first conductive pattern or a second conductive pattern. The first plane may include the first conductive pattern formed along a portion of the first edge, and the second plane may include the second conductive pattern formed along a portion of the third edge or the fourth edge and formed without overlapping with the first conductive pattern when viewed from above the first plane.

In accordance with another aspect of the disclosure, an antenna device for a vehicle is provided. The antenna device includes a first layer including a first plane facing a first direction and a second layer disposed under the first layer and including a second plane facing in a second direction opposite to the first direction, a first conductive pattern disposed at a first edge among edges corresponding to the first plane and having an electrical length for transmitting and/or receiving a signal in at least a first frequency band, and a second conductive pattern disposed at a second edge, which is not adjacent to the first edge, from among edges corresponding to the first plane or a second plane and having an electrical length for transmitting and/or receiving the signal in at least the first frequency band.

According to various embodiments of the disclosure, it is possible to effectively arrange a multi-band antenna in a limited space through a plurality of conductive patterns, which is positioned in a diagonal direction in at least one plane.

A variety of effects directly or indirectly understood through this disclosure may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be variously made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
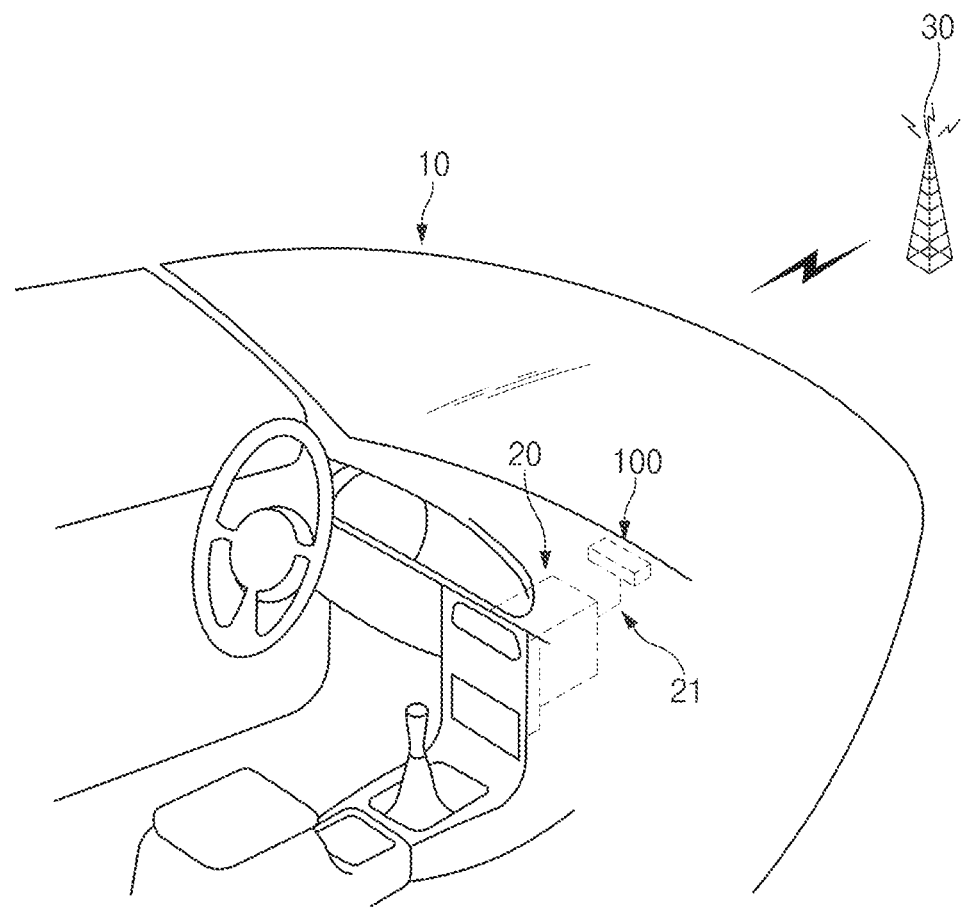
FIG. 1 illustrates an electronic device in a network environment according to various embodiments of the disclosure.

FIG. 1 illustrates an electronic device in a network environment according to various embodiments of the disclosure.

Referring to FIG. 1, an electronic device 100 according to an embodiment may be installed in a vehicle 10. The electronic device 100 may receive information necessary for the user utilizing the vehicle 10 (e.g., road traffic information, radio broadcast, vehicle location information, or the like), road traffic information necessary for the autonomous driving of the vehicle 10, or the like from an external device 30 or may transmit the information or the like to the external device 30. An embodiment is exemplified in FIG. 1 as the electronic device 100 is included in the vehicle 10. However, embodiments are not limited thereto. For example, the electronic device 100 may operate in various network environments. For example, the electronic device 100 may be a user terminal such as a tablet personal computer (PC) or a smartphone.

The external device 30 according to various embodiments may be a communication device, such as a base station, a broadcasting device, a radio broadcasting device, a satellite signal transceiver (e.g., global positioning system (GPS)), a user terminal, or the like, capable of transmitting and receiving signals. The external device 30 according to an embodiment may be a communication device supporting vehicle to everything (V2X) communication. The external device 30 according to another embodiment may be a key for vehicle transmitting a signal for controlling the vehicle 10. In addition, the external device 30 may include various devices capable of transmitting or receiving signals through wireless communication or wired communication.

The electronic device 100 may transmit and/or receive a signal to and/or from the external device 30 through the wireless communication or the wired communication. The electronic device 100 may support various communication protocols. According to various embodiments, the wireless communication may include cellular communication including at least one of, for example, long-term evolution (LTE), LTE advanced (LTE-A), code division multiple access (CDMA), wideband CDMA (WCDMA), universal mobile telecommunications system (UMTS), wireless broadband (WiBro), global system for mobile communications (GSM), or the like. According to an embodiment, the wireless communication may include at least one of, for example, Wi-Fi, Bluetooth, Bluetooth low energy (BLE), Zigbee, near field communication (NFC), magnetic secure transmission (MST), radio frequency (RF), or body area network (BAN). According to an embodiment, the wireless communication may include a global navigation satellite system (GNSS). The GNSS may be a GPS, a global navigation satellite system (Glonass), Beidou Navigation Satellite System (Beidou), or Galileo, the European global satellite-based navigation system, or the like. Hereinafter, in this specification, "GPS" and "GNSS" may be interchangeably used. The wired communication may include at least one of, for example, a universal serial bus (USB), a high definition multimedia interface (HDMI), a recommended standard-232 (RS-232), power line communication, a plain old telephone service (POTS), or the like. The network may include at least one of telecommunications networks such as a computer network (e.g., local area network (LAN) or wide area network (WAN)), an Internet, or a telephone network.

The electronic device 100 may be implemented with an integrated antenna including a multi-band antenna supporting various communication protocols. The electronic device 100 according to an embodiment may be implemented with an integrated antenna module, an antenna assembly, or an antenna device for a vehicle. The electronic device 100 according to an embodiment may be a telematics control unit (TCU). For example, the electronic device 100 may provide a host function through an integrated GPS tracking system and a GSM module. The electronic device 100 may provide a fully autonomous driving accident alarm, fault call, local support service telephone, traffic information, remote control lock, vehicle finder, remote diagnostics, and/or vehicle data. In addition, the electronic device 100 may perform various functions. For example, the electronic device 100 may be used as a hands-free device that controls the voice call and other functions of a mobile phone.

The electronic device 100 according to an embodiment may be disposed in the vehicle 10. The vehicle 10 may include the electronic device 100. The electronic device 100 according to an embodiment may be disposed inside the vehicle 10 or may be disposed outside the vehicle 10. The electronic device 100 may be disposed in the roof of the vehicle 10 or may be disposed adjacent to the roof. For example, the electronic device 100 may be disposed in the sun roof of the vehicle 10.

The electronic device 100 may be connected to a peripheral device 20 through a cable 21. The electronic device 100 may transmit the signal, which is received from the external device 30 through the cable 21, to the peripheral device 20 or may transmit the signal received from the peripheral device 20, to the external device 30. The peripheral device 20 according to an embodiment may be a display, which outputs content on a screen, based on the signal received from the electronic device 100, or an input/output port for obtaining a user input. For example, the peripheral device 20 may be a monitor, a keyboard, a touch screen display, or the like. The peripheral device 20 may be a power supply device capable of supplying or transmitting power to the electronic device 100. The cable 21 may be a device that transmits various communication signals supported by the electronic device 100. For example, the cable 21 may transmit a signal such as a television (TV) signal, a GPS signal, a radio signal (e.g., amplitude modulation (AM) and/or frequency modulation (FM)), a GSM signal, or the like. Furthermore, the cable 21 may transmit various types of signals.

Figure 2:
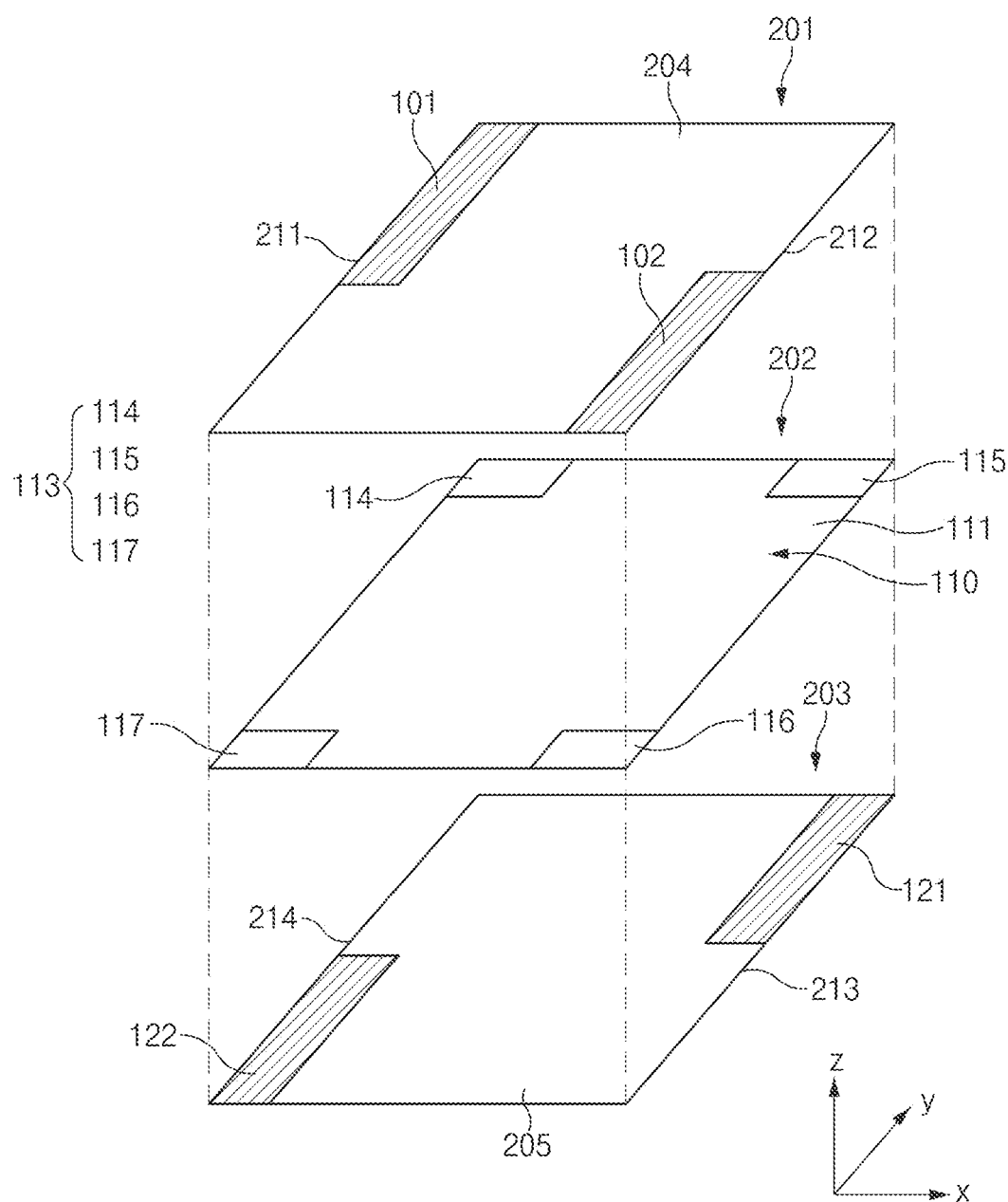
FIG. 2 schematically illustrates a hierarchical configuration of an antenna included in an electronic device according to an embodiment of the disclosure.

FIG. 2 schematically illustrates a hierarchical configuration of an antenna included in an electronic device according to an embodiment of the disclosure.

According to an embodiment, the electronic device 100 (e.g., the electronic device 100 of FIG. 1) may physically include three layers.

Referring to FIG. 2, the electronic device 100 may include a first layer 201, a second layer 202, and a third layer 203.

According to an embodiment, the first layer 201 may include a first plane 204 (or surface) that faces in a first direction (e.g., upward or +z direction) of the electronic device 100. The first plane 204 according to an embodiment may be a plane including a support member supporting a housing surrounding the electronic device 100 or an antenna inside the housing.

According to an embodiment, the second layer 202 may be interposed between the first layer 201 and the third layer 203. According to an embodiment, the second layer 202 may include a printed circuit board 110. According to an embodiment, the printed circuit board 110 may include a nonconductive layer.

According to an embodiment, the third layer 203 may include a second plane 205 that faces in a second direction (e.g., downward or '-z' direction) that is opposite to the first direction. The second plane 205 may overlap at least partially with the first plane 204, when viewed from above the first plane 204. According to an embodiment, the second plane 205 may be a plane including a support member supporting a housing surrounding the electronic device 100 according to an embodiment or an antenna inside the housing.

According to an embodiment, the first plane 204 may include a first edge 211 and a second edge 212. According to an embodiment, the second plane 205 may include a third edge 213 and a fourth edge 214. The third edge 213 may correspond to the second edge 212, and the fourth edge 214 may correspond to the first edge 211. The third edge 213 may be disposed on a side surface the same as the second edge 212. The fourth edge 214 may be disposed on a side surface the same as the first edge 211.

According to an embodiment, the first layer 201 may include at least one of a first conductive pattern 101 or a second conductive pattern 102. According to an embodiment, the first conductive pattern 101 may be formed along a portion of the first edge 211 among edges included in the first plane 204.

According to an embodiment, the second conductive pattern 102 may be formed along at least a portion of the second edge 212. According to an embodiment, the first conductive pattern 101 and the second conductive pattern 102 may be positioned diagonally against each other, when viewed from above the first plane 204.

According to an embodiment, the third layer 203 may include at least one of a third conductive pattern 121 or a fourth conductive pattern 122. According to an embodiment, the third conductive pattern 121 may be disposed along a portion of the third edge 213. The fourth conductive pattern 122 may be disposed along a portion of the fourth edge 214. The third conductive pattern 121 and the fourth conductive pattern 122 may be disposed diagonally at opposing corners with each other, when viewed from above the first plane 204.

According to an embodiment, the third conductive pattern 121 and the fourth conductive pattern 122 may be adjacent to vertices with which the first conductive pattern 101 and the second conductive pattern 102 do not overlap, when viewed from above the first plane 204. According to an embodiment, the first to fourth conductive patterns 101, 102, 121, and 122 may be adjacent to vertices with which the first to the fourth conductive patterns 101 to 122 do not overlap, when viewed from above a plane of the electronic device 100.

According to an embodiment, the first to fourth conductive patterns 101, 102, 121, and 122 may be positioned diagonally at opposing corners with each other, when viewed from above a plane of the electronic device 100. For example, the first conductive pattern 101 and the second conductive pattern 102 may be positioned diagonally at opposing corners with each other, when viewed from above the first plane 204; the first conductive pattern 101 and the third conductive pattern 121, or the second conductive pattern 102 and the fourth conductive pattern 122 may be positioned diagonally at opposing corners with each other, when viewed in a direction perpendicular to the first plane 204.

According to an embodiment, the electronic device 100 may transmit and/or receive a signal in at least a first frequency band, by using at least one of the first to fourth conductive patterns 101, 102, 121, and 122. For example, the first frequency band may be about 0.7 GHz to about 1 GHz or about 1.7 GHz to about 3.0 GHz. For example, the signal in the first frequency band may be a signal that is in compliance with the LTE standard. The first to fourth conductive patterns 101, 102, 121, and 122 may support a first signal, a second signal, a third signal, or a fourth signal in the first frequency band, respectively. The first to fourth conductive patterns 101, 102, 121, and 122 may support multi input multi output (MIMO) transmission/reception. Hereinafter, the first frequency band may be referred to as an "LTE frequency band."

According to an embodiment, at least one of conductive patterns may include a switch or a tuner for the purpose of adjusting a frequency.

According to an embodiment, the second layer 202 may include a printed circuit board 110. A partial region of at least one plane of the printed circuit board 110 may include a conductive layer 111. For example, the conductive layer 111 may be disposed on or under the printed circuit board 110. A ground plane (or ground layer) may be formed on the conductive layer 111. According to various embodiments of the disclosure, the electronic device 100 may use the ground plane as the ground of an antenna. The printed circuit board 110 may support various components of the electronic device 100.

According to an embodiment, the printed circuit board 110 may include at least one non-conductive region 113 formed by removing at least part of the conductive layer 111. For example, the non-conductive region 113 may be referred to as a "fill-cut region." At least one of the non-conductive region 113 (e.g., non-conductive region 117) may be used for a feed connection to an antenna disposed on the first layer 201 or the third layer 203. According to an embodiment, the printed circuit board 110 may include a non-conductive layer, and the non-conductive region 113 may be a part of the non-conductive layer.

According to an embodiment, other components of the electronic device 100 may be disposed on the printed circuit board 110. For example, a wireless communication circuit and a processor that are electrically connected to the wireless communication circuit may be disposed on the printed circuit board 110. A connection member may be disposed on the printed circuit board 110. According to an embodiment, the printed circuit board 110 may include conductive lines or wires for transmitting an electrical signal.

Figure 3:
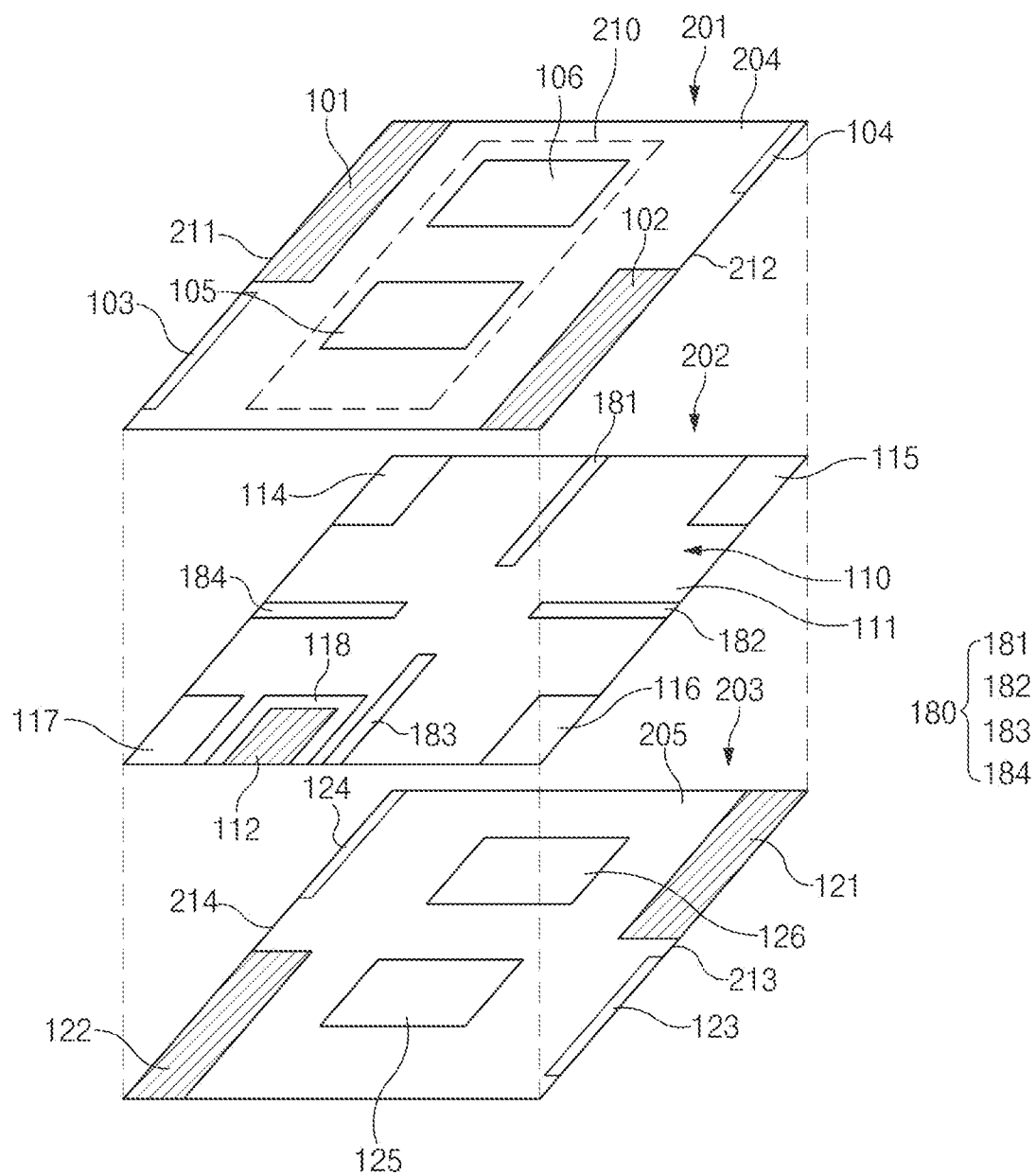
FIG. 3 schematically illustrates a hierarchical configuration of an antenna included in an electronic device according to another embodiment of the disclosure.

FIG. 3 schematically illustrates a hierarchical configuration of an antenna included in an electronic device according to an embodiment of the disclosure.

Referring to FIG. 3, the electronic device 100 (e.g., the electronic device 100 of FIG. 2) may include the first to fourth conductive patterns 101, 102, 121, and 122. The electronic device 100 of FIG. 3 may be substantially identical to the electronic device 100 of FIG. 2. With regard to the first to fourth conductive patterns 101, 102, 121, and 122, the descriptions given in FIG. 2 may be omitted.

According to an embodiment, the electronic device 100 may include fifth to eighth conductive patterns 103, 104, 123, and 124 for transmitting and/or receiving a signal in at least a third frequency band. The fifth to eighth conductive patterns 103, 104, 123, and 124 may be disposed to be physically spaced from each other.

According to an embodiment, the fifth conductive pattern 103 and the sixth conductive pattern 104 may be disposed on the same layer as each other. For example, the first layer 201 may include the fifth conductive pattern 103 and the sixth conductive pattern 104. While not overlapping with each other, the fifth conductive pattern 103 and the sixth conductive pattern 104 may be positioned diagonally at opposing corners with each other, when viewed from above the first plane 204 of the electronic device 100. For example, the fifth conductive pattern 103 may be disposed at the first edge 211, and the sixth conductive pattern 104 may be disposed at the second edge 212. When viewed from above the first plane 204, the first edge 211 and the second edge 212 may be parallel to each other without overlapping with each other (i.e., the first edge 211 and the second edge 212 are in different regions along an axis).

According to an embodiment, the seventh conductive pattern 123 and the eighth conductive pattern 124 may be disposed on the same layer. For example, the seventh conductive pattern 123 and the eighth conductive pattern 124 may be disposed on the third layer 203. While not overlapping with each other, the seventh conductive pattern 123 and the eighth conductive pattern 124 may be positioned diagonally at opposing corners with each other, when viewed from above the first plane 204 of the electronic device 100. For example, the seventh conductive pattern 123 may be disposed at the third edge 213, and the eighth conductive pattern 124 may be disposed at the fourth edge 214. When viewed from above the first plane 204, the third edge 213 and the fourth edge 214 may be parallel to each other without overlapping with each other (i.e., the third edge 213 and the fourth edge 214 are in different regions along an axis.

According to an embodiment, the fifth to eighth conductive patterns 103, 104, 123, and 124 may be adjacent to vertices which do not overlap with the first to fourth conductive patterns 101, 102, 121, and 122. For example, the fifth conductive pattern 103 may be disposed at the first edge 211 together with the first conductive pattern 101 and may be physically spaced not to overlap with the first conductive pattern 101. For example, the seventh conductive pattern 123 may be disposed at the third edge 213 at which the third conductive pattern 121 is disposed and may be physically spaced not to overlap with the third conductive pattern 121. For example, the sixth conductive pattern 104 may be disposed at the second edge 212 and may be physically spaced not to overlap with the second conductive pattern 102. The eighth conductive pattern 124 may be disposed at the fourth edge 214 and may be physically spaced not to overlap with the fourth conductive pattern 122.

According to an embodiment, the fifth to eighth conductive patterns 103, 104, 123, and 124 may support a signal or a network that is in compliance with the Wi-Fi standard. In an embodiment, the conductive patterns may operate as an MIMO antenna. For example, the fifth to eighth conductive patterns 103, 104, 123, and 124 may support the transmission/reception of 2×2 MIMO, the transmission/reception of 4×4 MIMO, or the like.

According to an embodiment, the electronic device 100 may transmit or receive a Bluetooth signal by using at least one of the fifth to eighth conductive patterns 103, 104, 123, and 124. Hereinafter, the third frequency band may be referred to as a "Wi-Fi frequency band."

In various embodiments of the disclosure, the number of conductive patterns for the Wi-Fi frequency may be changed variously.

According to an embodiment, the first layer 201 may include a ninth conductive pattern 105. The electronic device 100 may transmit and/or receive a signal in a fourth frequency band using the ninth conductive pattern 105. When viewed from above the first plane 204, the ninth conductive pattern 105 may be disposed not to overlap with the first to fourth conductive patterns 101, 102, 121, and 122. For example, the ninth conductive pattern 105 may be interposed between conductive patterns 101 and 102 for the LTE frequency of the first layer 201. For example, the ninth conductive pattern 105 may be disposed adjacent to the center of the first plane 204.

According to an embodiment, the ninth conductive pattern 105 may support a radio service. The radio service may be a satellite digital audio radio service (SDARS). The electronic device 100 may transmit or receive a SDARS signal by using the ninth conductive pattern 105. According to an embodiment, the ninth conductive pattern 105 may be implemented with a patch antenna. In another embodiment, the ninth conductive pattern 105 may be attached to a module for transmitting and receiving the SDARS signal or may be mounted in the module. The fourth frequency band may be a SDARS band. Hereinafter, the fourth frequency band may be referred to as an "SDARS frequency band."

According to an embodiment, the first layer 201 may include a tenth conductive pattern 106. In an embodiment, the electronic device 100 may transmit and/or receive a signal in at least a fifth frequency band, by using the tenth conductive pattern 106. In an embodiment, the fifth frequency band may be a frequency band in which a GPS signal is transmitted and received. Hereinafter, the fifth frequency band may be referred to as a "GPS frequency band."

According to an embodiment, when viewed from above the first plane 204, the tenth conductive pattern 106 may be disposed not to overlap with, for example, the first to ninth conductive patterns 101, 102, 121, 122, 103, 104, 123, 124, and 105. For example, the tenth conductive pattern 106 may be interposed between the conductive patterns 101 and 102 for the LTE frequency on the first layer 201. For example, the tenth conductive pattern 106 may be disposed adjacent to the center of the first plane 204. According to an embodiment, the ninth conductive pattern 105 and the tenth conductive pattern 106 may be adjacent.

According to an embodiment, the tenth conductive pattern 106 may support a location service. For example, the location service may be a service provided by a GNSS. According to an embodiment, the tenth conductive pattern 106 may be implemented with a patch antenna. In an embodiment, the tenth conductive pattern 106 may be a ceramic patch antenna using a ceramic dielectric.

According to an embodiment, the tenth conductive pattern 106 may include a GPS module for processing a GPS signal.

In an embodiment, the first plane 204 may be the upper surface of the electronic device 100. For example, the SDARS antenna and the GPS antenna may be disposed on the upper surface of the electronic device 100 for the purpose of maximizing the performance of an upper hemisphere isotropic sensitivity (UHIS) antenna.

According to an embodiment, the first layer 201 may include a ground plane 210 providing ground to the ninth conductive pattern 105 and/or the tenth conductive pattern 106, or the ground plane 210 may be formed in the first layer 201. The ninth conductive pattern 105 and the tenth conductive pattern 106 may share the ground plane 210 with each other. The interference due to signal transmission/reception between the first conductive pattern 101 and the second conductive pattern 102 may be reduced by the ground plane 210.

According to an embodiment, the second layer 202 may include the conductive layer 111 in at least a partial region. The remaining regions 114, 115, 116, 117, and 118 of the second layer 202 may include a non-conductive material. The regions 114, 115, 116, 117, and 118 may be formed by removing at least part of the conductive layer 111. Hereinafter, the regions 114, 115, 116, 117, and 118 may be referred to as a "non-conductive region."

According to an embodiment, at least one or more slits 180 for transmitting and receiving a signal in a second frequency band may be disposed on the conductive layer 111. A part of the conductive layer 111 may be removed to implement the at least one or more slits 180. The at least one or more slits 180 may have an elongated shape.

The at least one or more slits 180 may include first to fourth slits 181 to 184. When an electrical signal is supplied to the at least one or more slits 180, the at least one or more slits 180 may operate as an antenna. The at least one or more slits 180 may be electrical paths for transmitting and receiving a signal in the second frequency band. For example, when an electrical signal is supplied to the first slit 181, the signal may be transmitted through an electrical path formed by the first slit 181. An antenna operated by the at least one or more slits 180 may be referred to as a "slit antenna."

According to an embodiment, the first to fourth slits 181 to 184 may support a first signal, a second signal, a third signal, or a fourth signal in the second frequency band. For example, the first to fourth slits 181 to 184 may support MIMO transmission/reception.

According to an embodiment, the electronic device 100 may transmit or receive a V2X signal through the second frequency band. Hereinafter, the second frequency band may be referred to as a "V2X band."

According to an embodiment, the second layer 202 may include an eleventh conductive pattern 112. For example, the eleventh conductive pattern 112 may transmit and/or receive a signal in a sixth frequency band. For example, the sixth frequency band may include an ultra-wide band (UWB). Hereinafter, the sixth frequency band may be referred to as an "UWB frequency band."

According to an embodiment, the eleventh conductive pattern 112 may be implemented with a chip antenna. For example, the eleventh conductive pattern 112 may be part of a UWB chip. The eleventh conductive pattern 112 may be attached to the UWB chip for UWB communication. The eleventh conductive pattern 112 may be a printed circuit board embedded antenna (PEA). The eleventh conductive pattern 112 may be disposed in a non-conductive region (e.g., a non-conductive region 118) on the printed circuit board 110 forming the second layer 202.

According to an embodiment, the third layer 203 may include a twelfth conductive pattern 125. For example, the twelfth conductive pattern 125 may transmit and/or receive a signal in a seventh frequency band. In an embodiment, the seventh frequency band may be used for transmitting and receiving signals for opening and/or closing access point of a vehicle (e.g., a door, a trunk, etc.). For example, the twelfth conductive pattern 125 may transmit and/or receive a signal to and/or from a smart key. In an embodiment, the seventh frequency band may be a low frequency (LF) band. For example, the twelfth conductive pattern 125 may be an LF antenna. In an embodiment, the twelfth conductive pattern 125 may be implemented with a patch antenna. Hereinafter, the seventh frequency band may be referred to as an "LF frequency band."

According to an embodiment, the third layer 203 may include a thirteenth conductive pattern 126. For example, the thirteenth conductive pattern 126 may transmit and/or receive a signal in an eighth frequency band. The eighth frequency band may be a frequency band for broadcasting reception. For example, the eighth frequency band may be a frequency band for TV broadcasting reception. The eighth frequency band may be an ultra-high frequency (UHF) band. Hereinafter, the eighth frequency band may be referred to as an "UHF frequency band."

According to an embodiment, when viewed from above the first plane 204, the twelfth conductive pattern 125 and the thirteenth conductive pattern 126 may be disposed not to overlap with the first to eighth conductive patterns 101, 102, 121, 122, 103, 104, 123, and 214. For example, the twelfth conductive pattern 125 may be interposed between the third conductive pattern 121 and the fourth conductive pattern 122. The twelfth conductive pattern 125 and the thirteenth conductive pattern 126 may be disposed to be physically spaced from each other.

Table 1 illustrates an example of a communication type applied to the first to eighth frequency bands and a frequency range for each communication type.

TABLE 1

| Frequency band | Communication type (example) | Frequency range |
| --- | --- | --- |
| First frequency band | Long Term Evolution (LTE) | 698~960 MHz, 1710~3000 MHz |
| Second frequency band | Vehicle-to-everything (V2X) | 5.85~5.93 GHz |
| Third frequency band | Wi-Fi/Bluetooth | 2400~2485 MHz, 5112~5850 MHz/ 2400~2480 MHz |
| Fourth frequency band | SDARS | 2320~2345 MHz |
| Fifth frequency band | GNSS | 1575 MHz & 1252 MHz |
| Sixth frequency band | UWB | 3.1~10.6 GHz |
| Seventh frequency band | LF | 3~300 KHz |
| Eighth frequency band | UHF | 300 MHz~3.0 GHz |

Figure 4:
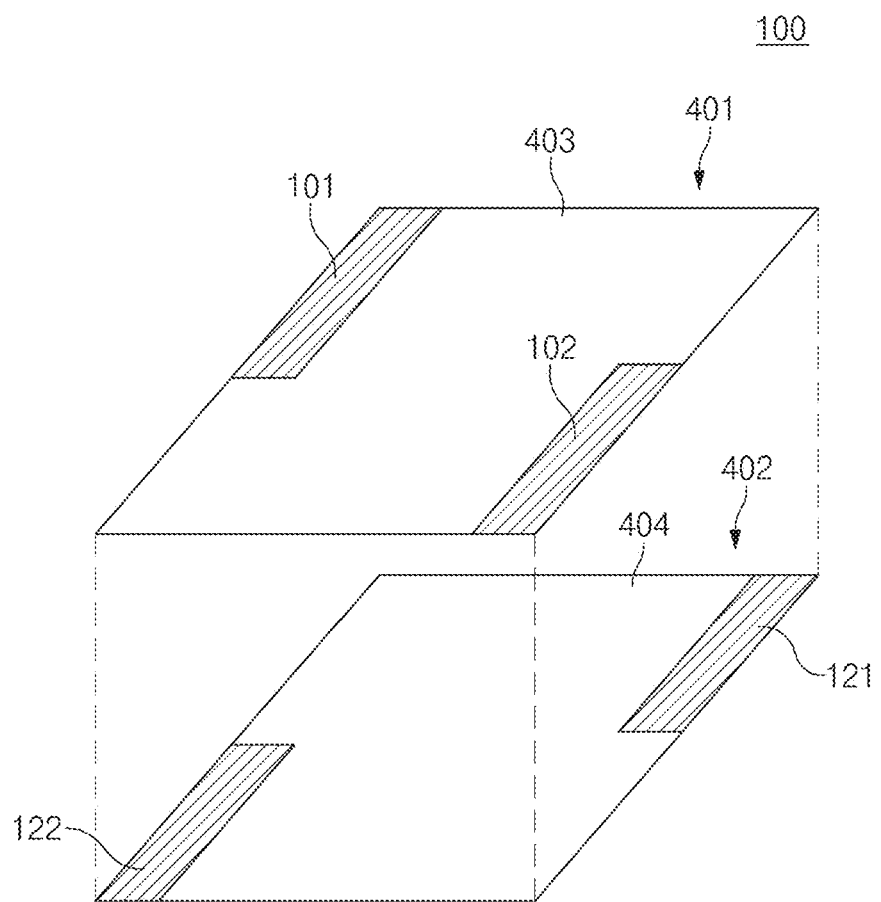
FIG. 4 schematically illustrates a hierarchical configuration of an antenna included in an electronic device according to still another embodiment of the disclosure.

FIG. 4 schematically illustrates a hierarchical configuration of an antenna included in an electronic device according to an embodiment of the disclosure.

According to an embodiment, the electronic device 100 (e.g., the electronic device 100 of FIG. 1) may include two layers. The electronic device 100 may include a first layer 401 and a second layer 402. A gap or a dielectric for securing the radiation space may be formed between the first layer 401 and the second layer 402.

Referring to FIG. 4, the first to fourth conductive patterns 101, 102, 121, and 122 may be substantially identical to the first to fourth conductive patterns 101, 102, 121, and 122 of FIG. 2 or 3. According to an embodiment, the first layer 401 may include a first plane 403 facing in a first direction (e.g., an upwards or +z direction). In an embodiment, the first plane 403 may be the upper surface of the electronic device 100. For example, the second layer 402 may be a second plane 404 that faces in a direction (e.g., a downwards or '−z' direction) opposite to the first plane 403 and constitutes the support member of the electronic device 100.

According to an embodiment, the first layer 401 may include the first conductive pattern 101 and the second conductive pattern 102. The second layer 402 may include the third conductive pattern 121 and the fourth conductive pattern 122. The first to fourth conductive patterns 101, 102, 121, and 122 may be disposed not to overlap with each other, when viewed from above the first plane 403.

The configuration of the electronic device 100 illustrated in FIG. 4 may be variously changed according to various embodiments of the disclosure. For example, the first layer 401 may include the fifth conductive pattern 103 of FIG. 3. For example, the second layer 402 may include a twelfth conductive pattern 125 of FIG. 2.

Figure 5:
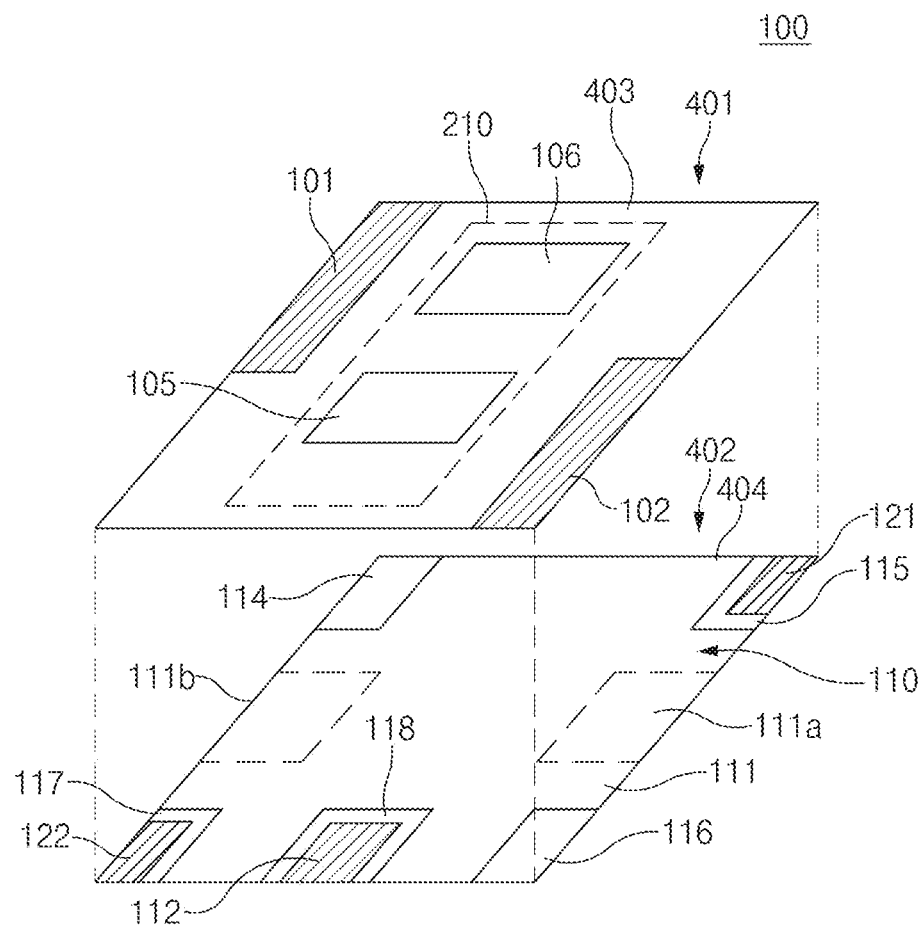
FIG. 5 schematically illustrates a hierarchical configuration of an antenna included in an electronic device according to an embodiment of the disclosure.

FIG. 5 schematically illustrates a hierarchical configuration of an antenna included in an electronic device according to an embodiment of the disclosure.

According to an embodiment, the electronic device 100 (e.g., the electronic device 100 of FIG. 1) may include two layers. The electronic device 100 may include the first layer 401 and the second layer 402. In FIG. 5, the first to fourth conductive patterns 101, 102, 121, and 122 may be substantially identical to the first to fourth conductive patterns 101, 102, 121, and 122 of FIG. 2, 3, or 4.

Referring to FIG. 5, the first layer 401 may include the first plane 403 facing in a first direction. In an embodiment, the first plane 403 may be the upper surface of the electronic device 100. According to an embodiment, the second layer 402 may include the conductive layer 111. For example, the second layer 402 may face in a direction opposite to the first plane 403 and may include the conductive layer 111. The second layer 402 may include the second plane 404 forming the support member of the electronic device 100 or the printed circuit board 110 on which the conductive layer 111 is formed. The second plane 404 may include the printed circuit board 110 on which the conductive layer 111 is formed. In FIG. 5, the antenna configuration of the electronic device 100 will be described with reference to the case where the printed circuit board 110 is included.

According to an embodiment, the third conductive pattern 121 and the fourth conductive pattern 122 may be disposed in the non-conductive regions 115 and 117 in which a part of the conductive layer 111 is removed. The third conductive pattern 121 and the fourth conductive pattern 122 may be disposed in the non-conductive regions 115 and 117 that are positioned diagonally at opposing corners with each other on the printed circuit board 110. When viewed from above the first plane 403, the third conductive pattern 121 and the fourth conductive pattern 122 may not overlap with the first conductive pattern 101 and the second conductive pattern 102. According to an embodiment, the first to fourth conductive patterns 101, 102, 121, and 122 may be implemented with a PEA. For example, the third conductive pattern 121 and the fourth conductive pattern 122 that are disposed on the second layer 402 may be implemented with the PEA.

Referring to FIG. 5, the first layer 401 may include the first conductive pattern 101 and the second conductive pattern 102. The second layer 402 may include the third conductive pattern 121 and the fourth conductive pattern 122. The first to fourth conductive patterns 101, 102, 121, and 122 may be disposed not to overlap with each other, when viewed from above the first plane 403.

According to an embodiment, the first layer 401 may further include the ninth conductive pattern 105 and the tenth conductive pattern 106. When viewed from above the first plane 403, the ninth conductive pattern 105 and the tenth conductive pattern 106 may be disposed not to overlap with the first to fourth conductive patterns 101, 102, 121, and 122. For example, the ninth conductive pattern 105 and the tenth conductive pattern 106 may be substantially identical to the ninth conductive pattern 105 and the tenth conductive pattern 106 of FIG. 3.

According to an embodiment, the first layer 401 may include the ground plane 210 providing ground to the ninth conductive pattern 105 and/or the tenth conductive pattern 106, or the ground plane 210 may be formed in the first layer 201. The ninth conductive pattern 105 and the tenth conductive pattern 106 may share the ground plane 210 with each other. The interference due to signal transmission/reception between the first conductive pattern 101 and the second conductive pattern 102 may be reduced by the ground plane 210.

According to an embodiment, the second layer 402 may include the conductive layer 111. The second layer 402 may include the non-conductive regions 114, 115, 116, 117, and 118 exposed by removing a part of a conductive layer 111. The eleventh conductive pattern 112 for transmitting and receiving signals in a UWB frequency band may be disposed in a non-conductive region (e.g., the non-conductive region 118). For example, the eleventh conductive pattern 112 may be substantially identical to the eleventh conductive pattern 112 of FIG. 3.

According to an embodiment, the second layer 402 may include a fourteenth conductive pattern 111a. For example, the fourteenth conductive pattern 111a may transmit and/or receive a signal (e.g., a signal in compliance with the fifth generation (5G) standard) in a ninth frequency band. For example, the ninth frequency band may be a frequency band for the 5G service (e.g. 28 GHz, 37 GHz, or the like). Hereinafter, the ninth frequency band may be referred to as a "5G frequency band."

According to an embodiment, the second layer 402 may further include a fifteenth conductive pattern 111b. For example, the fifteenth conductive pattern 111b may transmit and/or receive a signal (e.g., a signal in compliance with the 5G standard) in a tenth frequency band. The fifteenth conductive pattern 111b may be disposed on the printed circuit board 110.

According to an embodiment, at least one of the fourteenth conductive pattern 111a and the fifteenth conductive pattern 111b may be disposed on the printed circuit board 110. For example, the fourteenth conductive pattern 111a and the fifteenth conductive pattern 111b may be formed on the conductive layer 111. The fourteenth conductive pattern 111a and the fifteenth conductive pattern 111b may be formed along a side surface of the conductive layer 111. The fourteenth conductive pattern 111a and the fifteenth conductive pattern 111b may be formed to have an electrical length in compliance with the ninth frequency band, by removing the conductive layer 111 with a specific pattern or may be disposed in a non-conductive region exposed by removing the conductive layer 111. According to an embodiment, the fourteenth conductive pattern 111a and/or the fifteenth conductive pattern 111b may be implemented with a dipole antenna array.

Referring to FIGS. 2 to 5, it is possible to isolate each conductive pattern by arranging the various conductive patterns that are positioned on the same plane to overlap with each other, when viewed from above the first plane of the electronic device 100. For example, when viewed from above the first plane 403, the first conductive pattern 101 and the second conductive pattern 102 may be disposed diagonally at opposing corners with each other, when viewed in a direction perpendicular to the first plane 403, the first conductive pattern 101 and the third conductive pattern 121, or the second conductive pattern 102 and fourth conductive pattern 122 may be disposed diagonally at opposing corners with each other.

In the case where of MIMO transmission/reception for transmitting and receiving a signal by using a plurality of antenna, for example, an antenna supporting 2×2 MIMO or 4×4 MIMO, the antenna performance may be improved by providing sufficient isolation between the antennas. For example, the first to fourth conductive patterns 101, 102, 121, and 122 may be disposed adjacent to vertices which do not overlap with the first to fourth conductive patterns 101, 102, 121, and 122, when viewed from above a plane of the support member (e.g., bracket) of the electronic device 100, thereby reducing electromagnetic influence between each other. The MIMO transmission/reception by conductive patterns may be effectively performed by maximally isolating conductive patterns.

Figure 6:
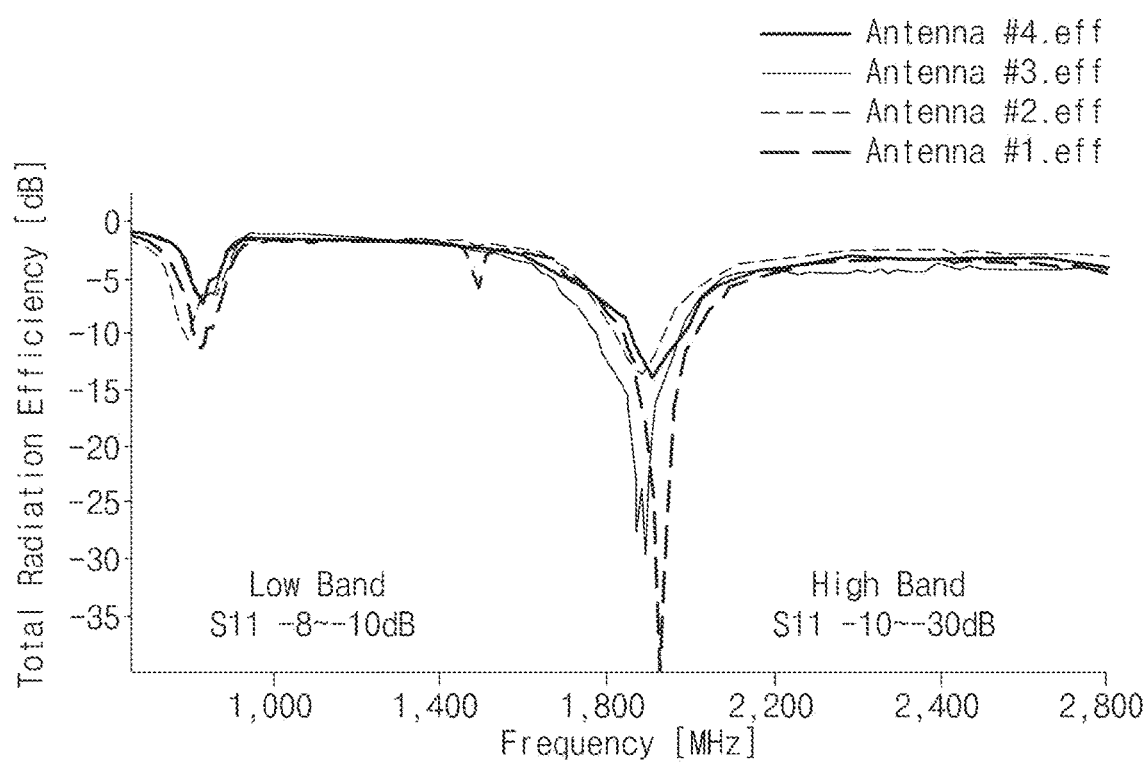
FIG. 6 is a graph illustrating return loss of a multi input multi output (MIMO) antenna according to an embodiment of the disclosure.

FIG. 6 is a graph illustrating return loss of an MIMO antenna according to an embodiment of the disclosure.

Referring to FIG. 6, the return loss of each antenna of a 4×4 MIMO antenna of an electronic device (e.g., the electronic device 100 of FIG. 2, 3, or 4) is illustrated. For example, FIG. 6 illustrates the result obtained by measuring the return loss of each antenna, which includes a conductive pattern disposed at each edge, from among antennas of the electronic device (e.g., the electronic device 100 of FIG. 2, 3, or 4).

The reflection coefficient S11 of each of a first conductive pattern antenna #1 101 to a fourth conductive pattern antenna #4 122 of the electronic device may have a value between −8 and −10 dB in a frequency range of about 700 MHz to 900 MHz and may have a value between −10 and −30 dB in a frequency range of about 1700 MHz to 2000 MHz.

Referring to FIG. 6, the first to fourth conductive patterns 101, 102, 121, and 122 may operate in a low band of about 700 MHz to 900 MHz and may operate in a middle band of about 1700 MHz to 2000 MHz. The electronic device may perform LTE MIMO transmission/reception by using the first to fourth conductive patterns 101, 102, 121, and 122.

Figure 7:
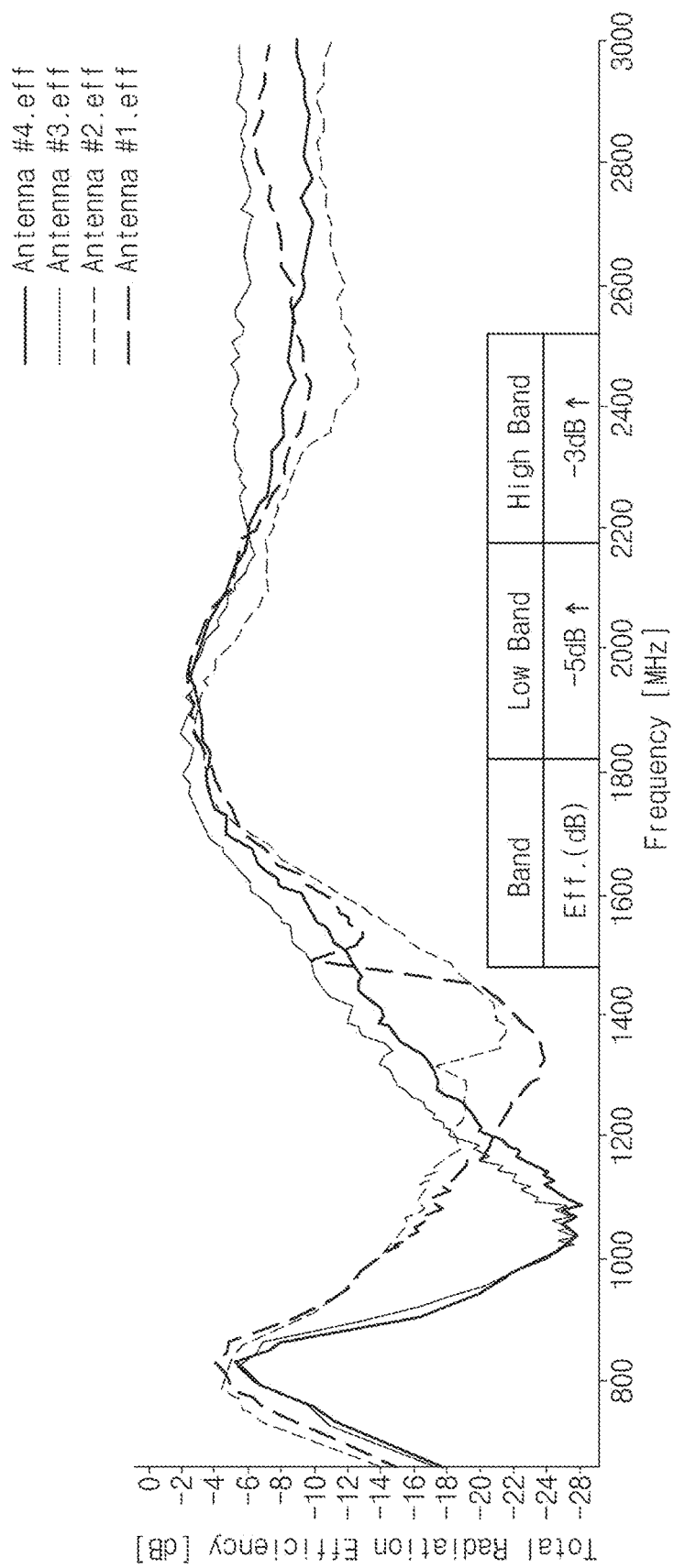
FIG. 7 is a graph illustrating total radiation efficiency of an MIMO antenna according to an embodiment of the disclosure.

FIG. 7 is a graph illustrating total radiation efficiency of an MIMO antenna according to an embodiment of the disclosure.

Referring to FIG. 7, the total radiation efficiency is illustrated for each antenna of a 4×4 MIMO of an electronic device (e.g., the electronic device 100 of FIG. 3) according to an embodiment of the disclosure.

According to an embodiment, the first conductive pattern antenna #1 101 to fourth conductive pattern antenna #4 122 of an electronic device (e.g., the electronic device 100 of FIG. 3) may resonate in a frequency range of about 700 MHz to 900 MHz and 1700 MHz to 2000 MHz. The first to fourth conductive patterns 101, 102, 121, and 122 may operate in a frequency band of about 700 MHz to 900 MHz having radiation efficiency higher than −5 dB and may operate in a frequency band of about 1700 MHz to 2000 MHz having radiation efficiency higher than −3 dB. The first to fourth conductive patterns 101, 102, 121, and 122 may be used for MIMO transmission/reception in a frequency range of about 700 MHz to 900 MHz or about 1700 MHz to 2000 MHz.

Figure 8:
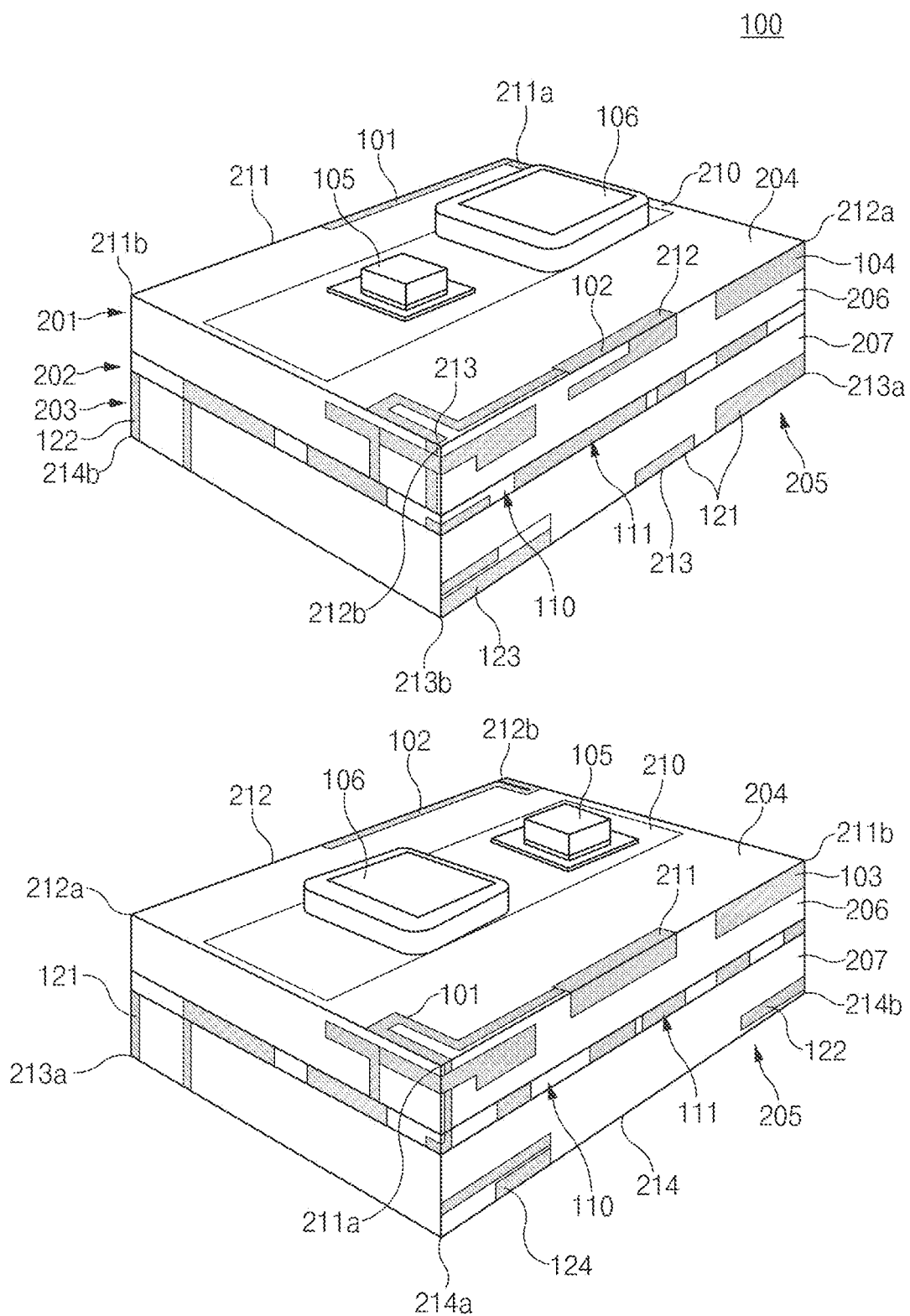
FIG. 8 is a perspective view of an electronic device according to an embodiment of the disclosure.

FIG. 8 is a perspective view of an electronic device according to an embodiment of the disclosure.

Referring to FIG. 8, illustrated is a perspective view of the electronic device 100 (e.g., the electronic device 100 of FIG. 2 or 3) when viewed in one direction and a direction opposite to the one direction. Hereinafter, for convenience of description, descriptions duplicated with descriptions about the electronic device 100 of FIG. 2 or 3 will not be repeated here.

According to an embodiment, the electronic device 100 may include the first to third layers 201 to 203. The first layer 201 may include the at least first plane 204 facing in a first direction of the electronic device 100, and the third layer 203 may include the second plane 205 opposite to the at least first direction. The second layer 202 may include the printed circuit board 110 interposed between the first layer 201 and the third layer 203 of the electronic device 100.

According to an embodiment, the first layer 201 may include a third plane 206 perpendicular to the first plane 204. For example, the third plane 206 may include four planes facing in directions different from each other. At least part of the first conductive pattern 101, the second conductive pattern 102, the fifth conductive pattern 103, or the sixth conductive pattern 104 may be disposed on at least one of four planes in the third plane 206.

According to an embodiment, the third layer 203 may include a fourth plane 207 perpendicular to the second plane 205. For example, the fourth plane 207 may include four planes facing in directions different from each other. The third plane 206 and the fourth plane 207 may be distinguished from each other by the printed circuit board 110. For example, the third plane 206 and the fourth plane 207 may be the side surface of the electronic device 100. At least part of the third conductive pattern 121, the fourth conductive pattern 122, the seventh conductive pattern 123, or the eighth conductive pattern 124 may be disposed on at least one of four planes in the fourth plane 207.

According to an embodiment, the first conductive pattern 101 may be disposed along the first edge 211 of the electronic device 100 facing the first direction. The first conductive pattern 101 may be disposed adjacent to a first vertex 211a among the first vertex 211a and a second vertex 211b connected to the first edge 211. The first conductive pattern 101 may be positioned on at least one plane of three planes forming the first vertex 211a.

According to an embodiment, the second conductive pattern 102 may be disposed along the second edge 212. The second conductive pattern 102 may be disposed adjacent to a fourth vertex 212b among two vertices 212a and 212b connected to the second edge 212. The first vertex 211a and the fourth vertex 212b may be positioned diagonally at opposing corners with each other, when viewed from above the first plane 204.

According to an embodiment, the third conductive pattern 121 may be disposed adjacent to a fifth vertex 213a among vertices 213a and 213b connected to the third edge 213. The fourth conductive pattern 122 may be disposed adjacent to an eighth vertex 214b among vertices 214a and 214b connected to the fourth edge 214. The fifth vertex 213a and the eighth vertex 214b may be positioned diagonally at opposing corners with each other, when viewed from above the first plane 204.

According to an embodiment, the first conductive pattern 101 and the second conductive pattern 102 may be positioned diagonally at opposing corners with each other, with respect to the center of the first plane 204 of the electronic device 100. The third conductive pattern 121 and the fourth conductive pattern 122 may be positioned diagonally at opposing corners with each other, with respect to the center of the second plane 205 of the electronic device 100. The first to fourth conductive patterns 101, 102, 121, and 122 may be disposed not to overlap with each other, when viewed from above a plane of the electronic device 100.

According to an embodiment, the first to fourth conductive patterns 101, 102, 121, and 122 may have an electrical length for transmitting and receiving signals in the LTE frequency band. For example, the electrical length and/or the radiation pattern of each of the conductive patterns may be identical or similar.

According to an embodiment, the electronic device 100 may include the fifth conductive pattern 103, the sixth conductive pattern 104, the seventh conductive pattern 123, and the eighth conductive pattern 124. For example, the fifth to eighth conductive patterns 103, 104, 123, and 124 may support a plurality of Wi-Fi frequencies.

According to an embodiment, the fifth to eighth conductive patterns 103, 104, 123, and 124 may be disposed to be physically spaced apart from each other in the electronic device 100. The fifth to eighth conductive patterns 103, 104, 123, and 124 may be disposed to be electrically spaced from the first to fourth conductive patterns 101, 102, 121, and 122 in the electronic device 100. For example, the fifth conductive pattern 103 may be formed along the first edge 211 and may be disposed adjacent to the second vertex 211b positioned on the opposite side of the first vertex 211a among the vertices 211a and 211b connected to the first edge 211.

According to an embodiment, the sixth conductive pattern 104 may be formed along the second edge 212 and may be disposed adjacent to the third vertex 212a among the vertices 212a and 212b connected to the second edge 212. The third vertex 212a may be positioned on the opposite side of the fourth vertex 212b.

According to an embodiment, the seventh conductive pattern 123 may extend along the third edge 213 and may be disposed adjacent to the sixth vertex 213b positioned on the opposite side of the fifth vertex 213a among the vertices 213a and 213b connected to the third edge 213.

According to an embodiment, the eighth conductive pattern 124 may be formed along the fourth edge 214 and may be disposed to the seventh vertex 214a positioned on the opposite side of the eighth vertex 214b among vertices 214a and 214b connected to the fourth edge 214.

According to an embodiment, when viewed from above the first plane 204, the second vertex 211b may be positioned diagonally against the third vertex 212a. When viewed from above the first plane 204, the sixth vertex 213b may be positioned diagonally against the seventh vertex 214a. The second vertex 211b, the third vertex 212a, the sixth vertex 213b, and the seventh vertex 214a may not overlap with each other, when viewed from above the first plane 204.

According to an embodiment, four conductive patterns 103, 104, 123, and 124 for various Wi-Fi frequencies are exemplified in FIG. 8. However, embodiments of the disclosure are not limited thereto. For example, the electronic device 100 may include a plurality of conductive patterns for the various Wi-Fi frequencies. According to an embodiment, the ninth conductive pattern 105 and the tenth conductive pattern 106 may be disposed on the first plane 204 of the electronic device 100. According to an embodiment, each of the ninth conductive pattern 105 and the tenth conductive pattern 106 may operate as an antenna. For example, when an electrical signal is supplied to the ninth conductive pattern 105, the ninth conductive pattern 105 may operate as an SDARS antenna. For another example, when an electrical signal is supplied to the tenth conductive pattern 106, the tenth conductive pattern 106 may operate as a GPS antenna. For the purpose of operating as a patch antenna, the ninth conductive pattern 105 and the tenth conductive pattern 106 may include a ground plane at regular intervals with a dielectric layer interposed between the ninth conductive pattern 105 and the tenth conductive pattern 106. According to an embodiment, for example, the ninth conductive pattern 105 and the tenth conductive pattern 106 may use the ground plane 210 disposed on the first layer 201, as one ground plane. The ninth conductive pattern 105 and the tenth conductive pattern 106 may share the ground plane 210 with each other.

Figure 9:
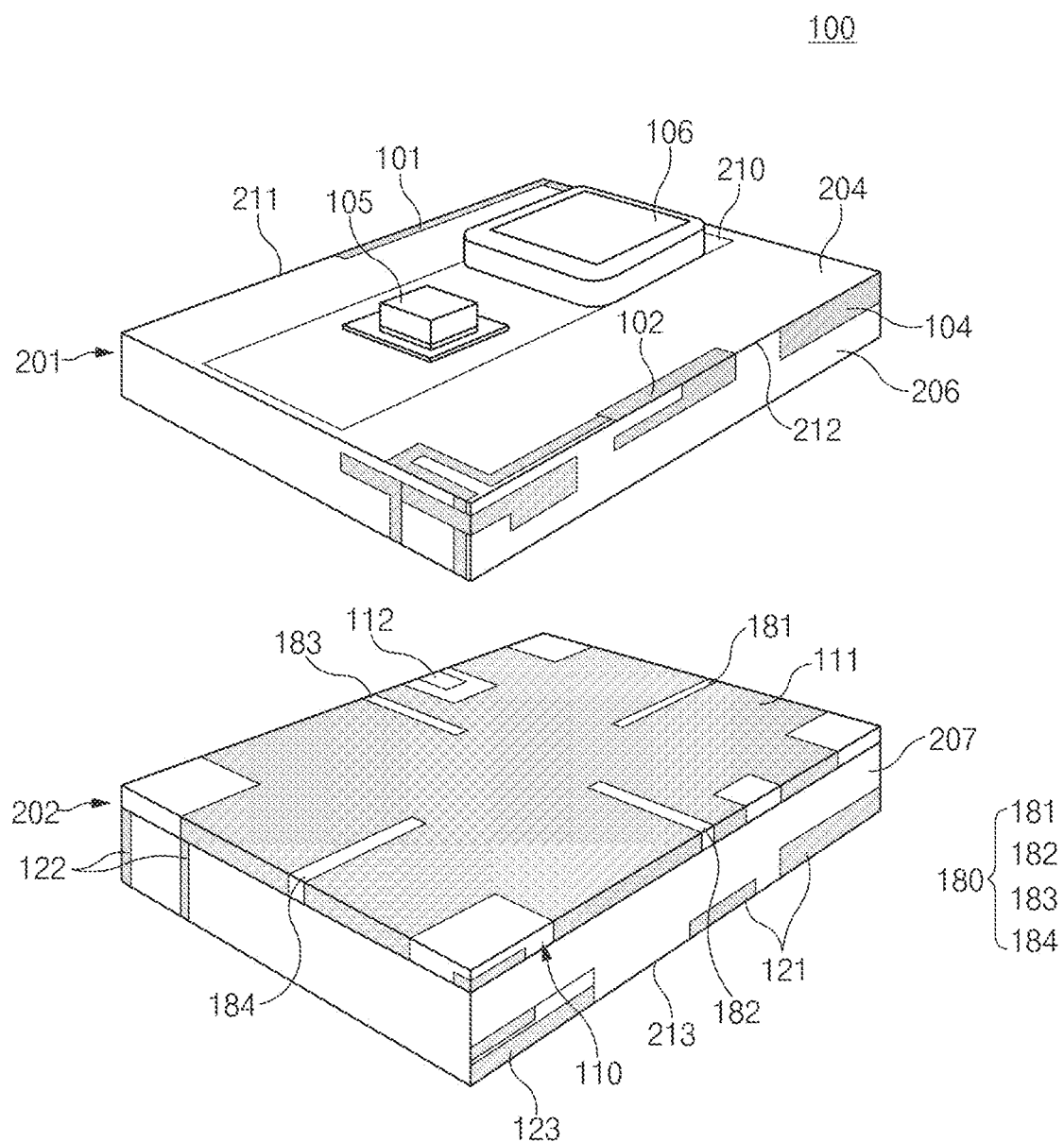
FIG. 9 is an exploded perspective view of an electronic device according to an embodiment of the disclosure.

FIG. 9 is an exploded perspective view of an electronic device according to an embodiment of the disclosure.

Referring to FIG. 9, the upper portion of the electronic device 100 (e.g., the electronic device 100 of FIG. 2, 3, 4, 5, or 8) and the lower portion of the electronic device 100 is illustrated. For example, the electronic device 100 may be substantially identical to a part of the electronic device 100 of FIG. 2, 3, 4, 5, or 8. Hereinafter, for convenience of description, descriptions duplicated with descriptions about the electronic device 100 of FIG. 2, 3, 4, 5, or 8 will be not repeated here.

According to an embodiment, the second layer 202 may include the conductive layer 111 in a partial region. For example, the conductive layer 111 may include a conductive pattern for a V2X frequency. The conductive pattern for the V2X frequency may include the at least one slit 180 in which a part of the conductive layer 111 is removed. The electronic device 100 may transmit and/or receive a signal in a V2X frequency band by using the at least one slit 180.

According to an embodiment, the second layer 202 may further include an eleventh conductive pattern (e.g., the eleventh conductive pattern 112 of FIG. 3) and/or a fourteenth conductive pattern (e.g., the conductive pattern 111a of FIG. 5). For example, the eleventh conductive pattern may transmit and/or receive a signal in a UWB frequency band. For example, the fourteenth conductive pattern may transmit and/or receive a signal in a 5G frequency band.

Figure 10:
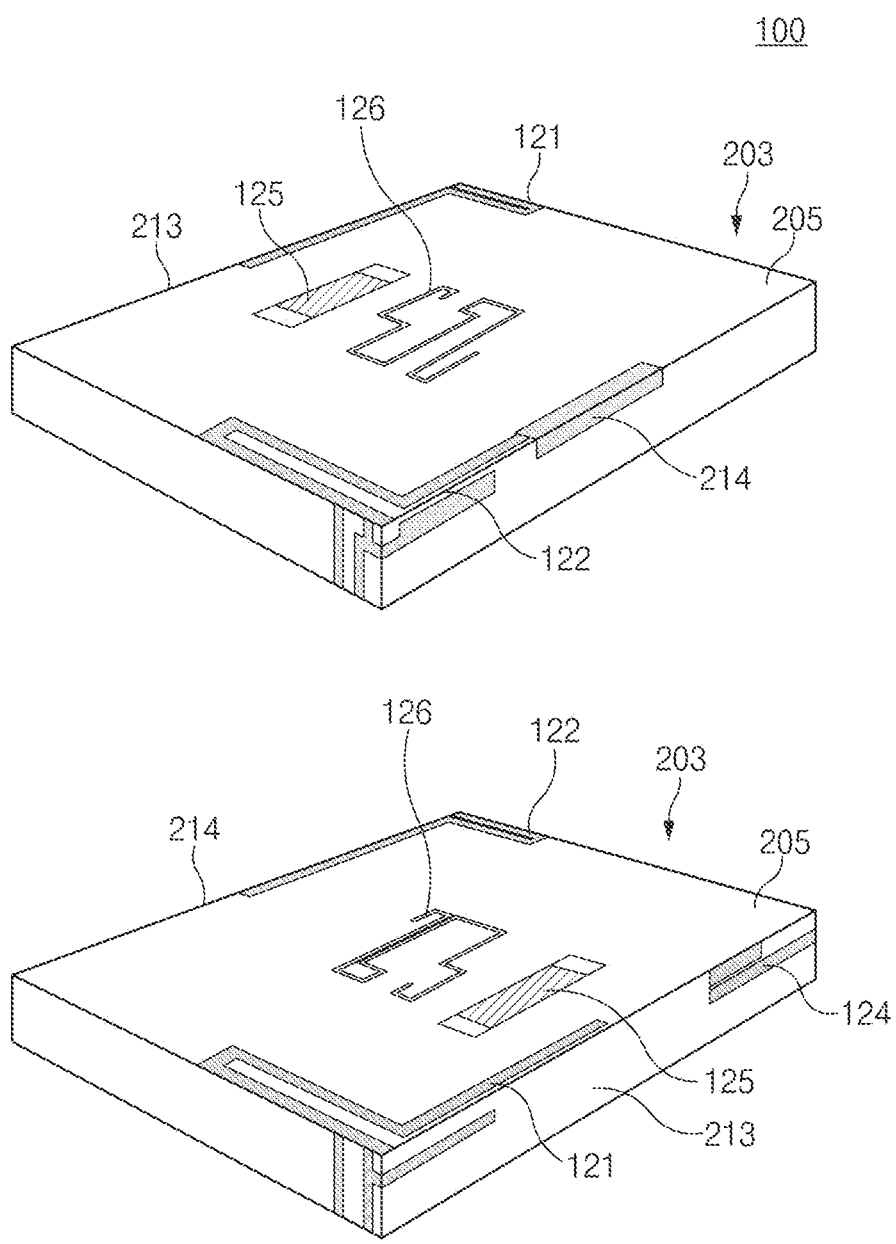
FIG. 10 is a perspective view of a lower portion of an electronic device according to an embodiment of the disclosure.

FIG. 10 is a perspective view of a third layer of an electronic device according to an embodiment of the disclosure.

Referring to FIG. 10, a perspective view of the third layer 203 of the electronic device 100 (e.g., the electronic device 100 of FIG. 2, 3, 4, 5, 8, or 9) is illustrated when viewed in one direction and another direction opposite to the one direction. The electronic device 100 may be substantially identical to a part of the electronic device 100 of FIG. 2, 3, 4, 5, or 8. For example, the third layer 203 may include the third conductive pattern 121, the fourth conductive pattern 122, the twelfth conductive pattern 125, and the thirteenth conductive pattern 126. Hereinafter, for convenience of description, since descriptions are duplicated with descriptions about the electronic device 100 of FIG. 2, 3, 4, 5, or 8, the detailed descriptions will not be repeated here.

FIGS. 11A and 11B are sectional views schematically illustrating a partial configuration of an electronic device according to an embodiment of the disclosure.

Referring to FIG. 11A, conductive patterns that are mounted in the electronic device 100 (e.g., the electronic device 100 of FIG. 2, 3, 5, or 8) may be disposed inside the electronic device 100. Referring to FIG. 11B, the conductive patterns may be interposed between a housing 1000, which surrounds the outside so as to protect the electronic device 100, and the electronic device 100.

Referring back to FIG. 11A, at least one of the ninth conductive pattern 105, the tenth conductive pattern 106, or the twelfth conductive pattern 125 may be positioned inside the electronic device 100.

In an embodiment, the ninth conductive pattern 105 may be disposed in a space between the first layer 201 and the second layer 202 of the electronic device 100, or on the first layer 201. In an embodiment, the tenth conductive pattern 106 may be disposed in a space between the first layer 201 and the second layer 202 of the electronic device 100, or on the first layer 201. In an embodiment, the twelfth conductive pattern 125 may be disposed in a space between the third layer 203 and the second layer 202 of the electronic device 100, or on the third layer 203. In other words, the twelfth conductive pattern 125 may be interposed between the second plane 205 and the printed circuit board 110 of the electronic device 100.

Referring back to FIG. 11B, at least one of the ninth conductive pattern 105, the tenth conductive pattern 106, or the twelfth conductive pattern 125 may be disposed inside the housing 1000. Alternatively, the at least one may be interposed between the electronic device 100 and the housing 1000 surrounding the electronic device 100. For example, the electronic device 100 may be at least disposed in a space between the first layer 201 and the housing 1000, and on the first layer 201.

Figure 12:
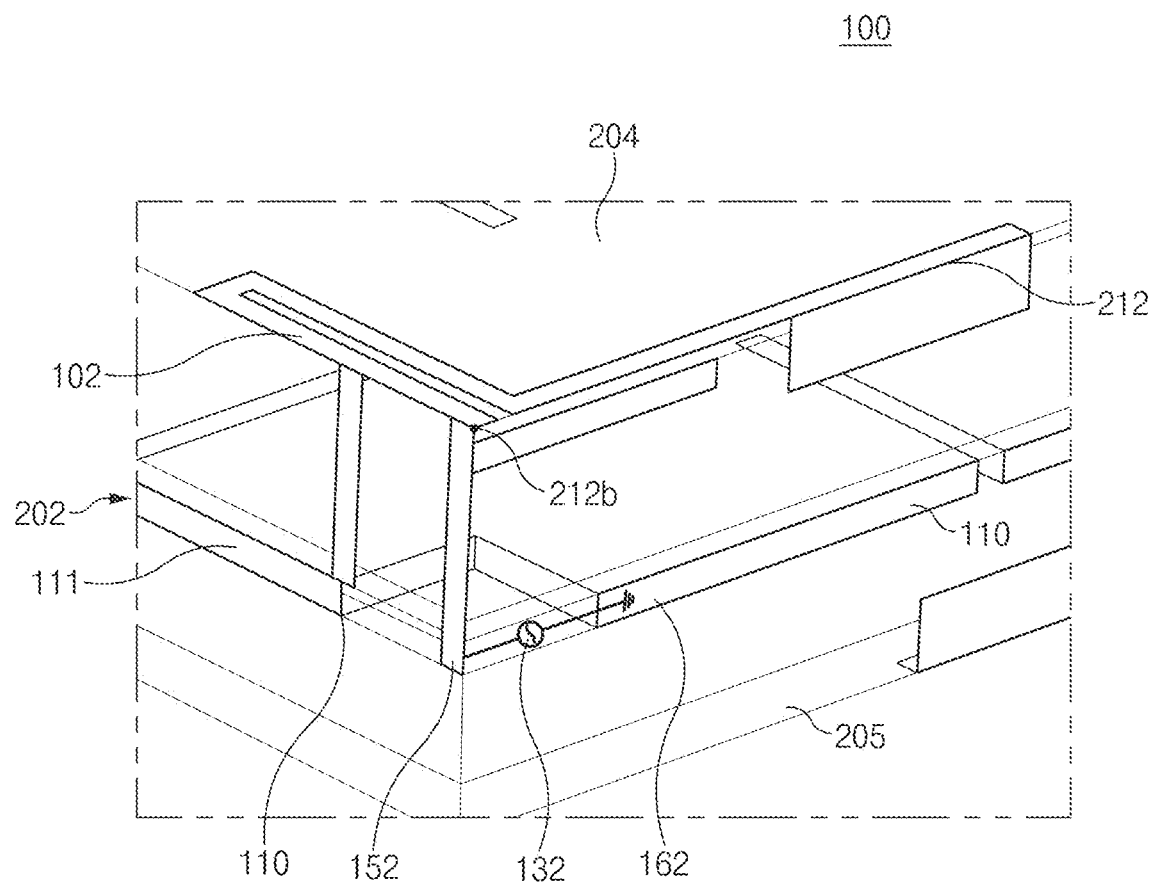
FIG. 12 is a perspective view illustrating a part of an electronic device according to an embodiment of the disclosure.

FIG. 12 is a perspective view illustrating a part of an electronic device according to an embodiment of the disclosure.

Referring to FIG. 12, a perspective view of the electronic device 100 (e.g., the electronic device 100 of FIG. 2, 3, 5, or 8) when viewed from above the second edge 212 is illustrated. According to an embodiment, the second conductive pattern 102 may be disposed along the second edge 212.

According to an embodiment, the second conductive pattern 102 may be disposed in a specific region of the second edge 212 to increase the isolation from another conductive pattern (e.g., the first conductive pattern 101 of FIG. 2). The second conductive pattern 102 may be disposed adjacent to the vertex 212b among vertices connected to the second edge 212. For example, the second conductive pattern 102 may be disposed over two planes among three planes forming the one vertex 212b so as to be adjacent to the one vertex 212b to increase the isolation from another conductive pattern (e.g., the first conductive pattern 101 of FIG. 2).

According to an embodiment, the second conductive pattern 102 may be disposed along at least the second edge 212 so as to have an electrical length for a specific frequency band. For example, the length of the second conductive pattern 102 may extend along an edge perpendicular to the second edge 212.

According to an embodiment, the printed circuit board 110 may be disposed in parallel to the first plane 204 and the second plane 205 of the electronic device 100. The conductive layer 111 may be disposed on the printed circuit board 110. A part of the printed circuit board 110 may be formed of a non-conductive material.

According to an embodiment, the second conductive pattern 102 may be electrically connected to a wireless communication circuit through an electrically conductive line. According to an embodiment, one point 162 of the printed circuit board 110 may be electrically connected to the wireless communication circuit. For example, the wireless communication circuit may be electrically connected to the one point 162 of the printed circuit board 110 through a cable including the electrically conductive line. The wireless communication circuit according to an embodiment may include a RF chip (e.g., a communication module 3490 of FIG. 34). In an embodiment, the RF chip may be disposed in the electronic device 100 or may be connected to a separate external electronic device. The wireless communication circuit may transmit and/or receive an LTE signal through the electrically conductive line.

According to an embodiment, a feeding part 132 may be electrically connected to one point 152 of the second conductive pattern 102. The feeding part 132 may be electrically connected to the one point 152 of the second conductive pattern 102 through the one point 162 of the printed circuit board 110. An electrical signal supplied to the one point 162 of the printed circuit board 110 may be transmitted to the one point 152 of the second conductive pattern 102. In an embodiment, the one point 152 of the second conductive pattern 102 may be positioned on at least one plane of planes perpendicular to the first plane 204 and the second plane 205 of the electronic device 100.

The descriptions in FIG. 12 are described based on the second conductive pattern 102. However, the above-described embodiment may be applied identically to the first conductive pattern 101, the third conductive pattern 121, or the fourth conductive pattern 122 or may be applied thereto after being changed.

Figure 13:
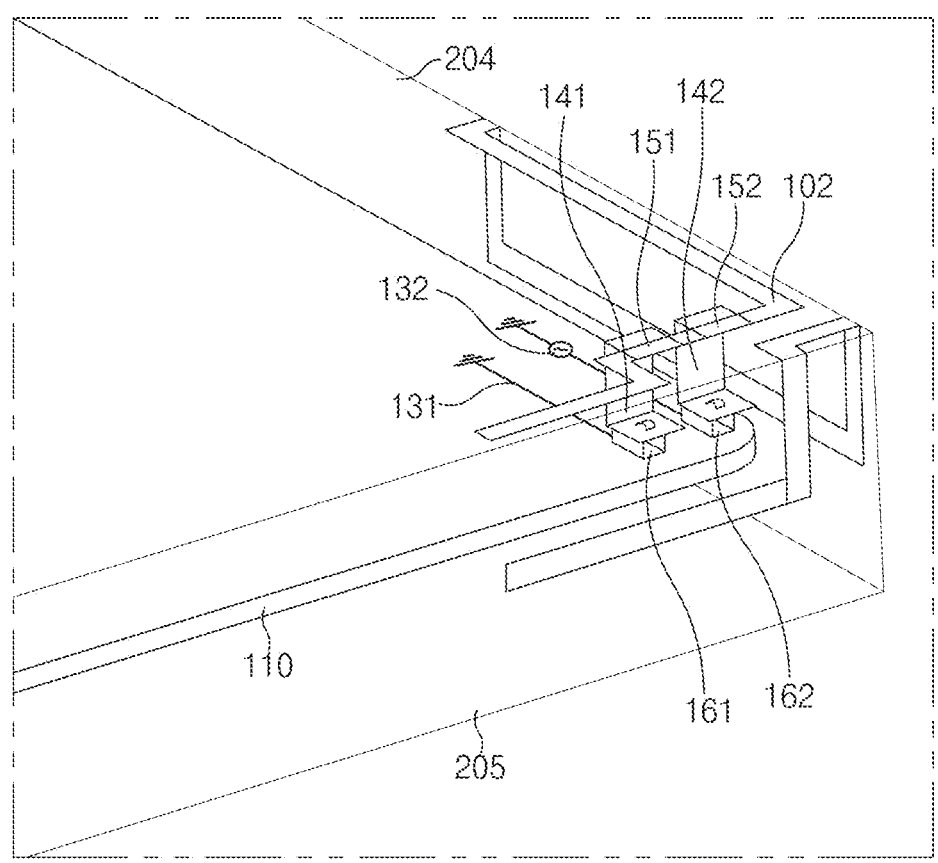
FIG. 13 is a perspective view illustrating a part of an electronic device according to an embodiment of the disclosure.

FIG. 13 is a perspective view illustrating a part of an electronic device according to an embodiment of the disclosure.

Referring to FIG. 13, the feeding part 132 of an electronic device (e.g., the electronic device 100 of FIG. 2, 3, 5, or 8) may transmit an electrical signal to the second conductive pattern 102 through the one point 162 of the printed circuit board 110. According to an embodiment, the feeding part 132 may be connected to the one point 152 of the second conductive pattern 102 through a connection member 142. According to an embodiment, for example, the one point 152 of the second conductive pattern 102 may be disposed on the first plane 204 of the electronic device 100.

According to an embodiment, a ground part 131 may be electrically connected to one point 151 of the second conductive pattern 102 through one point 161 of the printed circuit board 110. According to an embodiment, the ground part 131 may be electrically connected to the one point 151 of the second conductive pattern 102 through a connection member 141. According to an embodiment, for example, the one point 151 of the second conductive pattern 102 may be disposed on the first plane 204 of the electronic device 100.

The descriptions in FIG. 13 are described based on the second conductive pattern 102. However, the above-described embodiment may be applied identically to the first conductive pattern 101, the third conductive pattern 121, or the fourth conductive pattern 122 or may be applied thereto after being changed. For example, one point of the fourth conductive pattern 122 positioned on the second plane 205 of the electronic device 100 may be electrically connected to the ground part and the feeding part positioned on the printed circuit board 110 through the connection member.

Figure 14:
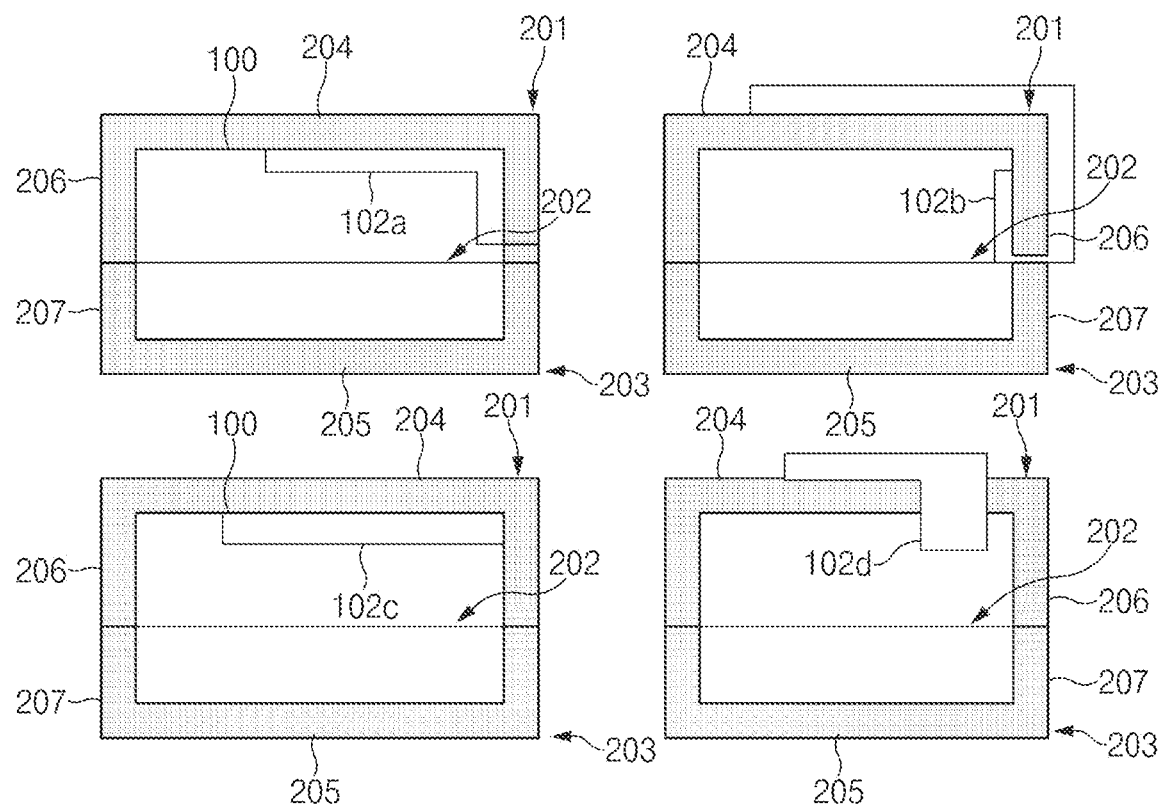
FIG. 14 illustrates arrangement of conductive patterns of an electronic device according to various embodiments of the disclosure.

FIG. 14 illustrates arrangement of conductive patterns of an electronic device according to various embodiments of the disclosure.

Hereinafter, an embodiment is exemplified as conductive pattern is arranged by using the second conductive pattern 102. However, the arrangement of the conductive pattern may be applied to various conductive patterns (e.g., the first conductive pattern 101 of FIG. 2). As in conductive patterns 102a, 102b, 102c, and 102d of FIG. 14, the second conductive pattern 102 of the electronic device 100 (e.g., the electronic device 100 of FIG. 2, 3, 5, or 8) may be disposed in various forms.

Referring to FIG. 14, the conductive pattern 102a according to an embodiment may be formed inside planes constituting the electronic device 100. The plane constituting the electronic device 100 may be a plane forming a support member for supporting an antenna.

According to an embodiment, the first layer 201 may include a plane on which the second conductive pattern 102a is arranged. For example, the first layer 201 may include the first plane 204 of the electronic device 100. For example, the first layer 201 may include at least one of the third planes 206 perpendicular to the first plane 204.

According to an embodiment, the first layer 201 may be distinguished from the third layer 203 by the printed circuit board 110. The first layer 201 may be disposed above the printed circuit board 110 when viewed from above a cross-sectional surface perpendicular to the first plane 204. The third layer 203 may be disposed under the printed circuit board 110 when viewed from above a cross-sectional surface perpendicular to the first plane 204. For example, the third layer 203 may include the second plane 205 or may include the second plane 205 and the fourth plane 207 perpendicular to the second plane 205.

According to an embodiment, the third plane 206 and the fourth plane 207 may be separated by the printed circuit board 110 or may be provided in separate processes. The third plane 206 and the fourth plane 207 may constitute the side surface of the electronic device 100.

According to an embodiment, for example, the first layer 201 may include the upper portion of the electronic device 100, and the third layer 203 may include the lower portion of the electronic device 100.

According to an embodiment, the second conductive pattern 102a may be disposed inside the electronic device 100. For example, the second conductive pattern 102a may extend along at least one plane of the first plane 204 forming the first layer 201 (e.g., the first layer 201 of FIG. 3) and the third plane 206 perpendicular to the first plane 204. In this case, the second conductive pattern 102a may be electrically connected to ground part (e.g., the ground part 131 of FIG. 13) and/or feeding part (e.g., the feeding part 132 of FIG. 13) through a connection member (e.g., the connection member 141 or 142 of FIG. 13). For example, the connection member may be a C-clip.

According to an embodiment, the second conductive pattern 102b may be disposed along the outer side and the inner side of a plane constituting the electronic device 100. For example, the second conductive pattern 102b may be disposed to surround the first layer 201. For example, the second conductive pattern 102b may extend along the outer side of at least one plane of the first plane 204 of a support member constituting the electronic device 100 and the third plane 206 perpendicular to the first plane 204 or may extend along the inner side of at least one plane. The second conductive pattern 102b may be electrically connected to a ground part and/or a feeding part through a connection member. For example, the connection member may be a C-clip.

According to another embodiment, the second conductive pattern 102c may be disposed inside the electronic device 100. The second conductive pattern 102c may extend along the first plane 204 of the electronic device 100 constituting the first layer 201 (e.g., the first layer 201 of FIG. 3). For example, the connection member connecting the ground part and/or the feeding part to the second conductive pattern 102c may be a C-clip. In another example, the connection member may be a pogo pin.

According to another embodiment, the second conductive pattern 102d may be formed at the outer side of the electronic device 100. For example, the second conductive pattern 102d may extend along the outer side of the first plane 204 constituting the first layer 201. The second conductive pattern 102d may extend along the outer side of the first plane 204 and may be formed to pass through the first plane 204 for feeding or grounding. For example, the connection member connecting the ground part and/or the feeding part to the second conductive pattern 102d may be a pogo pin.

Figure 15:
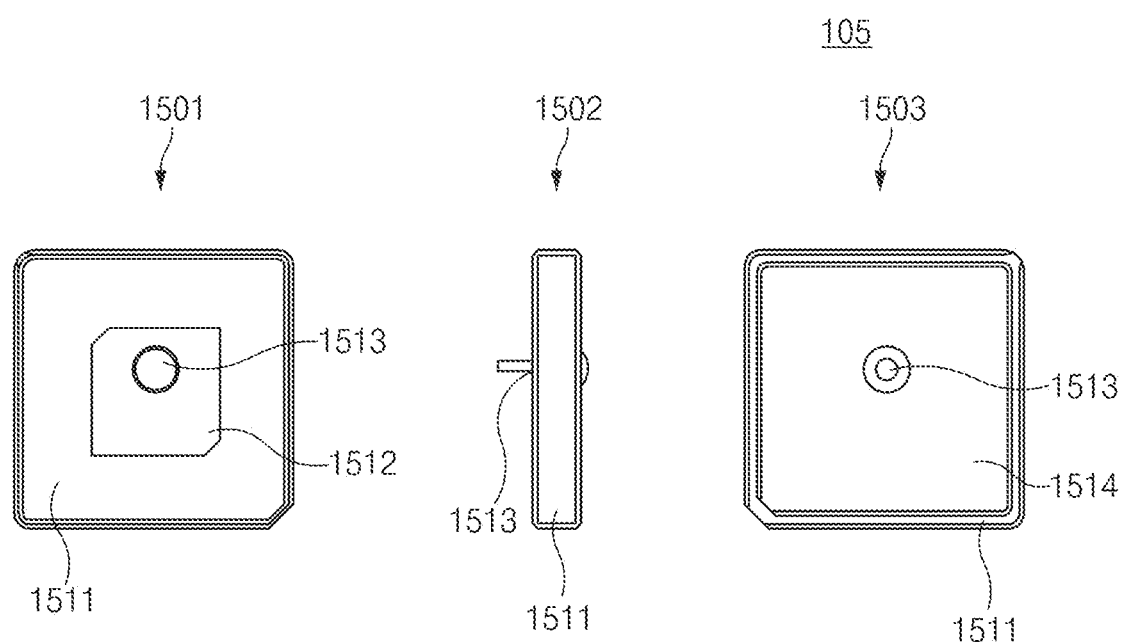
FIG. 15 illustrates a structure of a ninth conductive pattern according to an embodiment of the disclosure.

FIG. 15 illustrates a structure of a ninth conductive pattern according to an embodiment of the disclosure.

Referring to FIG. 15, different views of the ninth conductive pattern 105. In particular, a front view 1501 illustrates the ninth conductive pattern 105 when viewed from the top, a side view 1502 illustrates the ninth conductive pattern 105 when viewed from a side surface, and a bottom view 1503 illustrates the ninth conductive pattern 105 when viewed from the bottom surface.

According to an embodiment, the ninth conductive pattern 105 may be implemented with a patch antenna including a high-dielectric material 1511, a conductive patch element 1512, and a feeding pin 1513. The ninth conductive pattern 105 may be electrically connected to a feeding part through the feeding pin 1513. The feeding pin 1513 may be directly connected to the conductive patch element 1512 positioned on the ninth conductive pattern 105.

According to an embodiment, when viewed from above the ninth conductive pattern 105, the conductive patch element 1512 may surround the feeding pin 1513 and the high-dielectric material 1511 may be disposed to surround the conductive patch element 1512. The conductive patch element 1512 may include at least one cut-corner. In an embodiment, a part of the feeding pin 1513 may be implemented in a cylindrical shape. When viewed from the left side of the ninth conductive pattern 105, the cylindrical feeding pin 1513 may be disposed to pass through the high-dielectric material 1511. When viewed from the bottom of the ninth conductive pattern 105, the high-dielectric material 1511 may be disposed to surround the feeding pin 1513. The high-dielectric material 1511 may include a cut-corner at one edge.

According to an embodiment, a ground plane 1514 may be formed in the high-dielectric material 1511. The ground plane 1514 may be formed with a specific pattern in the high-dielectric material 1511. According to an embodiment, the ground plane 1514 may be connected to a ground plane (e.g., the ground plane 210 of FIG. 3) formed on a first layer (e.g., the first layer 201 of FIG. 8) through one point of a second layer (e.g., the second layer 202 of FIG. 8).

Figure 16:
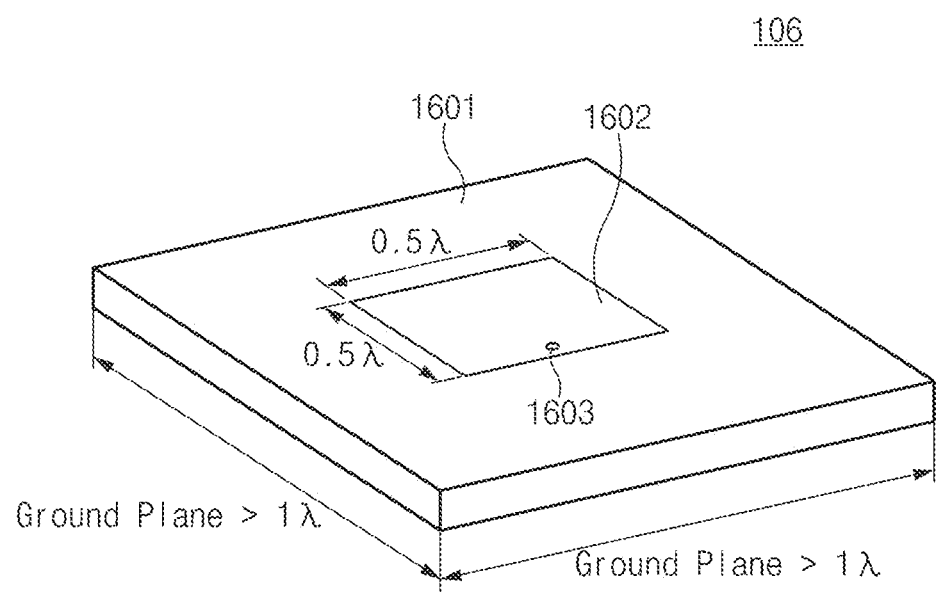
FIG. 16 is a perspective view of a tenth conductive pattern when viewed from one edge of an electronic device according to an embodiment of the disclosure.

FIG. 16 is a perspective view of a tenth conductive pattern when viewed from one edge of an electronic device according to an embodiment of the disclosure.

Referring to FIG. 16, a tenth conductive pattern 106 may be implemented with a patch antenna including a conductive patch element 1602 surrounding a feeding pin 1603 and a dielectric 1601 surrounding the conductive patch element 1602. A ground plane (or ground layer) having a predetermined length may be disposed in the dielectric 1601 constituting the tenth conductive pattern 106. In an embodiment, the dielectric 1601 may be implemented with an adhesive tape.

According to an embodiment, the wavelength of the tenth conductive pattern 106 may be referred to as "λ." In an embodiment, the conductive patch element 1602 may be implemented with a square whose the length of one side is 0.5λ. The ground plane may be implemented with a rectangle or square of which the length of one side is greater than λ. The ground plane may be connected to a ground plane (e.g., the ground plane 210 of FIG. 3) formed on the first layer 201, through one point of the second layer 202.

Figure 17:
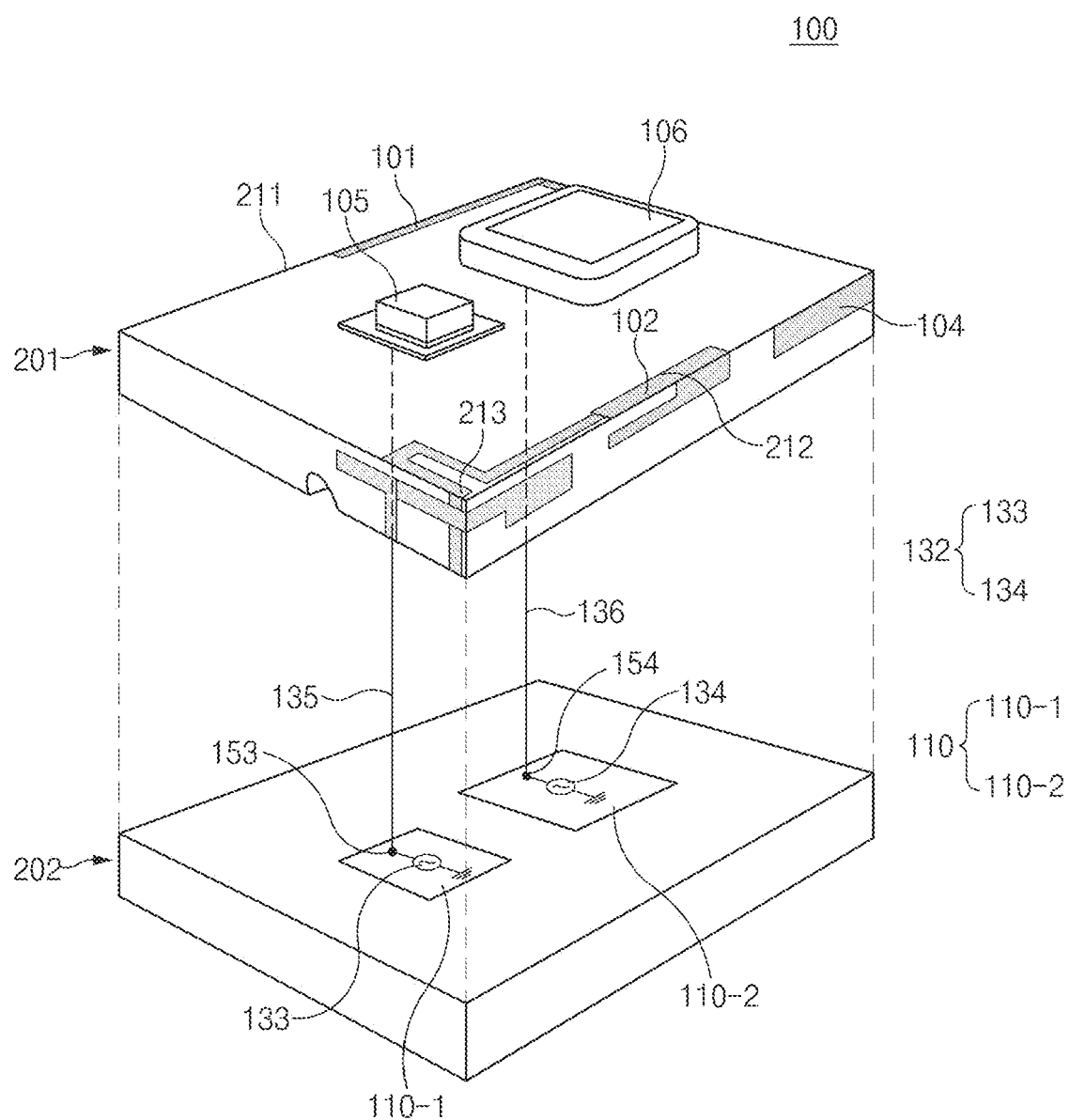
FIG. 17 illustrates a feeding method of a ninth conductive pattern and a tenth conductive pattern according to an embodiment of the disclosure.

FIG. 17 illustrates a feeding method of a ninth conductive pattern and a tenth conductive pattern according to an embodiment of the disclosure.

Referring to FIG. 17, the electronic device 100 (e.g., the electronic device 100 of FIG. 2, 3, 5, or 8) may include the printed circuit board 110. The electronic device 100 may include the plurality of printed circuit boards 110. According to an embodiment, the second layer 202 may include the plurality of printed circuit boards 110. For example, the plurality of printed circuit boards 110 may include a first printed circuit board 110-1 and a second printed circuit board 110-2. The first printed circuit board 110-1 and the second printed circuit board 110-2 may include a first feeding part 133 and a second feeding part 134, which feed the ninth conductive pattern 105 and the tenth conductive pattern 106, respectively.

According to an embodiment, points of the ninth conductive pattern 105 and the tenth conductive pattern 106 may be electrically connected to a first feeding part 133 and a second feeding part 134, through a connection member, respectively. In an embodiment, the connection member may be a C-clip or a pogo pin. The first feeding part 133 may transmit an electrical signal to the ninth conductive pattern 105 through a first electrical path 135 that is connected to one point 153 of the first printed circuit board 110-1. The second feeding part 134 may transmit an electrical signal to the tenth conductive pattern 106 through a second electrical path 136 that is connected to one point 154 of the second printed circuit board 110-2.

Figure 18:
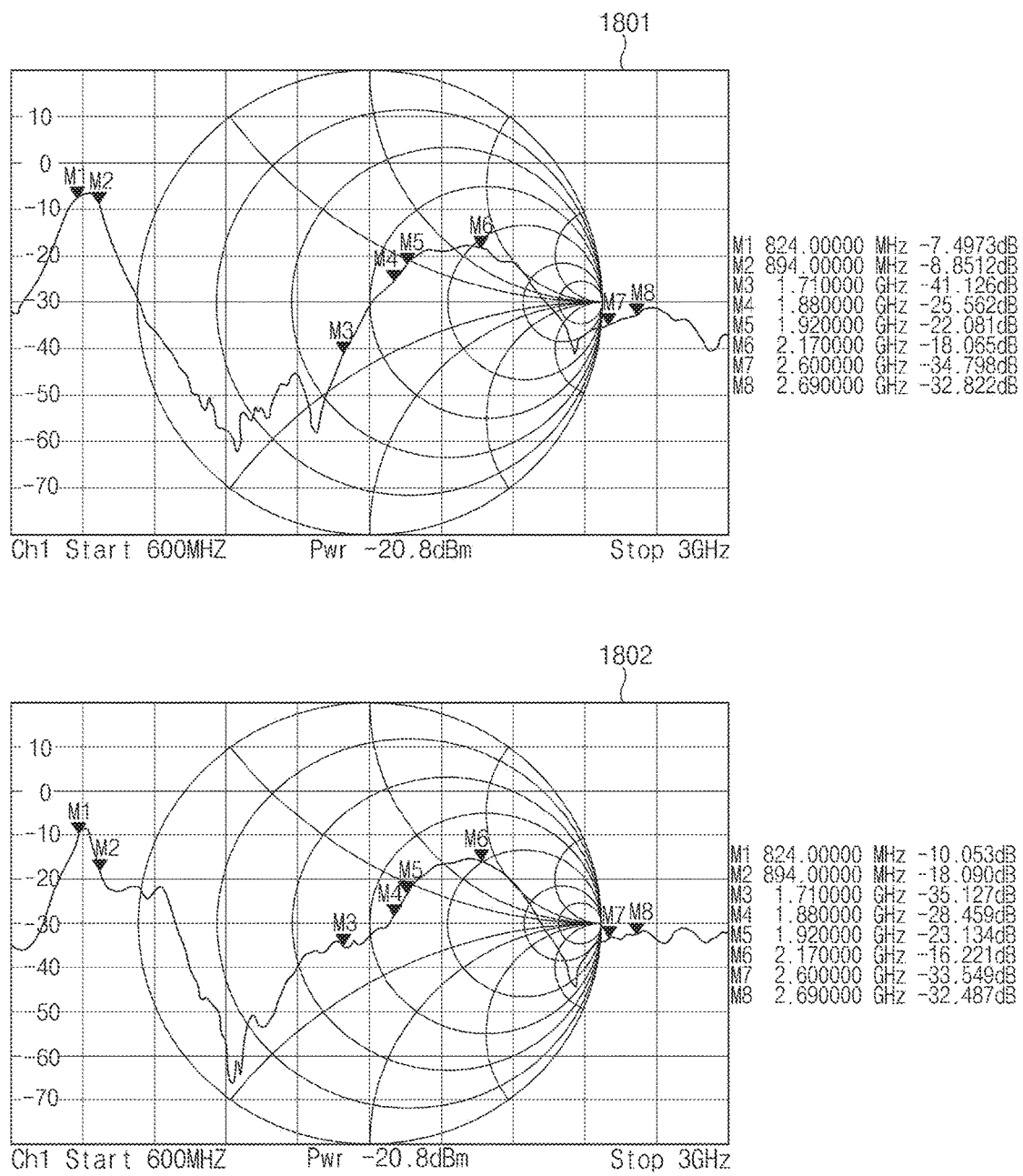
FIG. 18 is a graph illustrating a characteristic of an MIMO antenna, according to an embodiment of the disclosure.

FIG. 18 is a graph illustrating a characteristic of an MIMO antenna according to an embodiment of the disclosure.

Referring to FIG. 18, a graph is illustrated in which the characteristic of an antenna is measured in the case where the first to fourth conductive patterns 101, 102, 121, and 122 for the LTE frequency band are LTE MIMO antennas, the ninth conductive pattern 105 is an SDARS antenna, and the tenth conductive pattern 106 is a GPS antenna.

Referring to graph 1801 of FIG. 18, an isolation measurement result is illustrated in the case where only the LTE MIMO antenna is disposed at the upper end of the electronic device 100. Referring to graph 1802, an isolation measurement result is illustrated in the case where the LTE MIMO antenna (e.g., the first to fourth conductive patterns 101, 102, 121, and 122 of FIG. 2) is disposed at the upper end of the electronic device 100 and both an SDARS antenna (e.g., the ninth conductive pattern 105 of FIG. 3) and a GPS antenna (e.g., the tenth conductive pattern 106 of FIG. 3) are interposed between LTE MIMO antennas.

Referring to graph 1801, when the SDARS antenna and the GPS antenna are absent at the upper end of the electronic device 100, the isolation characteristics at M1 (824.0 MHz) and M2 (894 MHz) may be 7.4973 dB and −8.8512 dB, respectively. Referring to graph 1802, it is understood that the isolation characteristics are improved as −10.053 dB and −18.090 dB at M1 and M2 in the case where the SDARS antenna and the GPS antenna are present. For example, when the SDARS antenna and the GPS antenna are interposed between LTE MIMO antennas, the isolation characteristic of the antenna may be improved. The isolation of the LTE MIMO antenna may be increased by a ground plane (e.g., the ground plane 210 of FIG. 3) that the SDARS antenna and the GPS antenna share.

Figure 19:
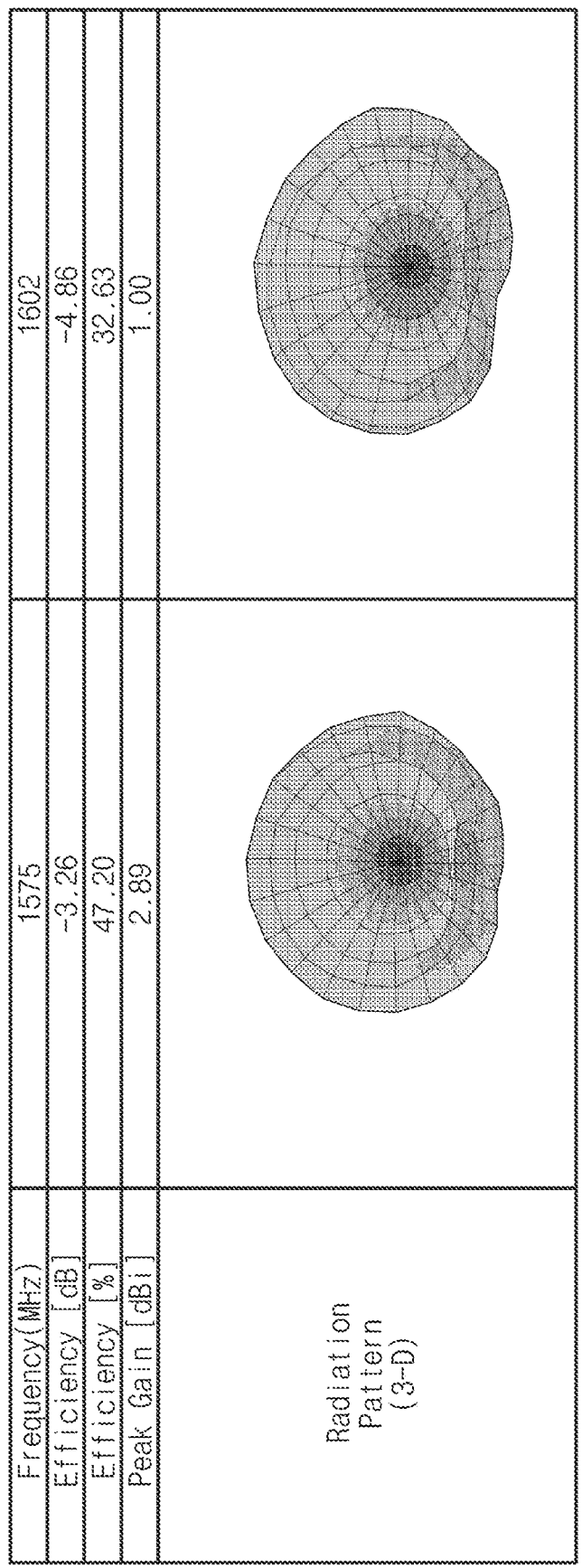
FIG. 19 is a graph illustrating a radiation pattern measurement result of a global positioning system (GPS) antenna according to another embodiment of the disclosure.

FIG. 19 is a graph illustrating a radiation pattern measurement result of a GPS antenna according to another embodiment of the disclosure.

Referring to FIG. 19, the peak gain of GPS antenna operating at 1575 MHz frequency may be 2.89 dBi and the antenna efficiency thereof may indicate −3.26 dB and 47.20%. The peak gain of the GPS antenna operating at 1602 MHz frequency may be 1.00 dBi, and the antenna efficiency thereof may be −4.86 dB and 32.63%. Referring to FIG. 19, it may be efficient to arrange an antenna associated with a satellite signal such as GPS on a first layer (e.g., the first layer 201 of FIG. 2 or 3 or the first layer 401 of FIG. 4 or 5) that is positioned at the upper end of an electronic device to improve vertical radiation.

Figure 20:
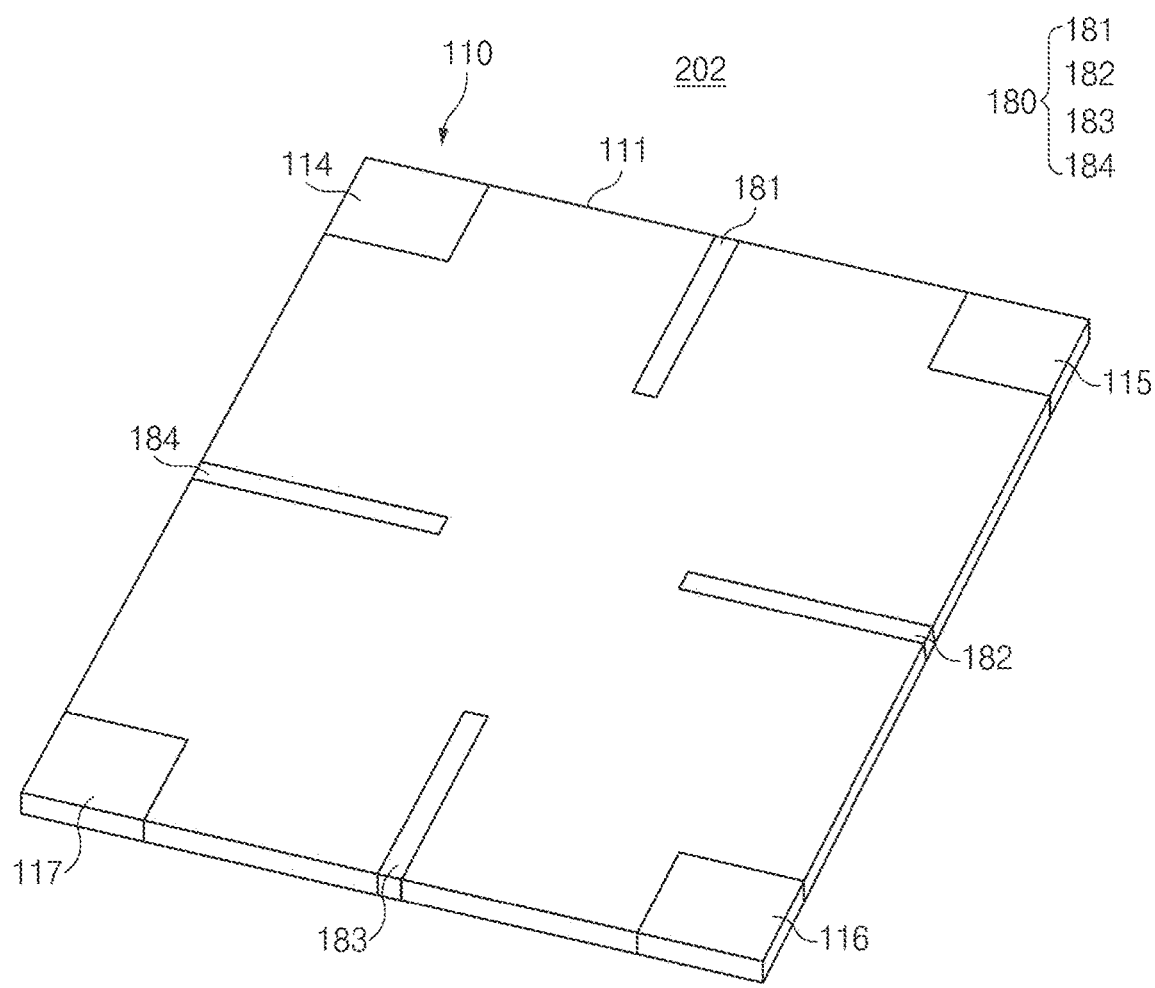
FIG. 20 schematically illustrates a configuration of a second layer of an electronic device according to an embodiment of the disclosure.

FIG. 20 schematically illustrates a configuration of a second layer of an electronic device according to an embodiment of the disclosure.

Referring to FIG. 20, the second layer 202 of an electronic device (e.g., the electronic device 100 of FIGS. 1 to 5) may include the printed circuit board 110. The printed circuit board 110 may include the conductive layer 111. According to an embodiment, the conductive layer 111 may include an antenna ground plane. The printed circuit board 110 may include a non-conductive material. The non-conductive regions 114, 115, 116, and 117 of the printed circuit board 110 may be a region in which a part of the conductive layer 111 is removed.

The conductive layer 111 may be disposed to cover the front surface or the rear surface of the printed circuit board 110. The conductive layer 111 according to an embodiment may be disposed in a cross shape on the printed circuit board 110 having the shape of a rectangle or a square, by removing a part of the conductive layer 111.

In an embodiment, the at least one or more slits 180 may be formed on the conductive layer 111 and may comprise first to fourth slits 181 to 184 that are formed from a non-conductive material. For the purpose of forming the first to fourth slits 181 to 184 in the printed circuit board 110, a part of the conductive layer 111 of the printed circuit board 110 may be removed.

According to an embodiment, the electronic device may transmit and/or receive a signal in a V2X frequency band by using a radiation pattern formed by the at least one or more slits 180. The at least one or more slits 180 formed on the conductive layer 111 may operate as an antenna radiator that resonates at a V2X frequency. An antenna for the V2X frequency may correspond to radiation patterns respectively formed by the at least one or more slits 180. The antenna for the V2X frequency may be a V2X antenna. An antenna resonating through the at least one or more slits 180 may be an MIMO antenna.

According to an embodiment, the first to fourth slits 181 to 184 may be formed on the conductive layer 111. According to an embodiment, the first to fourth slits 181 to 184 may be disposed to be physically spaced from each other on the printed circuit board 110. For example, the first to fourth slits 181 to 184 may be disposed to extend from one point of a side different from each other and to be physically spaced from each other. One point of the printed circuit board 110 from which the first to fourth slits 181 to 184 start may be positioned on the conductive layer 111. For example, the first to fourth slits 181 to 184 may extend from different sides of the printed circuit board 110 in a direction perpendicular to each side. The first slit 181 may extend from one point of the first side of the printed circuit board 110 in a direction parallel to a second side adjacent to a first side. The second slit 182 may extend from one point of the second side in a direction different from the first slit 181. The second slit 182 may extend from one point of the second side of the printed circuit board 110 in a direction parallel to the first side or a third side adjacent to the second side. The third slit 183 may extend from one point of the third side of the printed circuit board 110 in a direction of the first side. The fourth slit 184 may extend from one point of the fourth side of the printed circuit board 110 in a direction perpendicular to the fourth side. The isolation of a conductive pattern for the LTE frequency or the V2X frequency may be optimized by arranging the first to fourth slits 181 to 184 in different directions. According to an embodiment, the first slit 181 and third slit 183 may be positioned on a straight line. The second slit 182 and the fourth slit 184 may be positioned on a straight line.

According to an embodiment, when signals are provided to the first to fourth slits 181 to 184, the first to fourth slits 181 to 184 may operate as an antenna. The first to fourth slits 181 to 184 may be provided signals through a cable or conductive line disposed on the printed circuit board 110. According to an embodiment, the cable or conductive line may be electrically connected to a communication circuit. At least one of the first to fourth slits 181 to 184 may support the transmission and/or reception of a V2X signal, and the cable or conductive line may be electrically connected to the communication circuit supporting the transmission and/or reception of the V2X signal.

Although not illustrated in FIG. 20, other configurations (e.g., communication circuit) of the electronic device may be disposed on the printed circuit board 110. The printed circuit board 110 may include cables or conductive lines for transmitting an electrical signal. According to an embodiment, one point of the printed circuit board 110 may be electrically connected to the wireless communication circuit. For example, the wireless communication circuit may be electrically connected to the one point of the printed circuit board 110 through the conductive line. An embodiment is exemplified in FIG. 20 having four slits. However, embodiments are not limited thereto. For example, the electronic device 100 may include a plurality of slits.

According to various embodiments of the disclosure, each radiation pattern formed by the at least one or more slits 180 may be referred to as a "slit antenna."

According to an embodiment, antennas of a first layer (e.g., the first layer 201 of FIG. 3) and a third layer (e.g., the third layer 203 of FIG. 3) may share the conductive layer 111 of a second layer (e.g., the second layer 202 of FIG. 3) as an antenna ground. When the slit antenna is disposed on the second layer 202, ground points of the antenna of the first layer 201 and the antenna of the third layer 203 may be electrically spaced apart from each other. As the electrical distance between ground points of an antenna increases, the isolation between antennas may increase, and thus antenna efficiency may increase.

Figure 21:
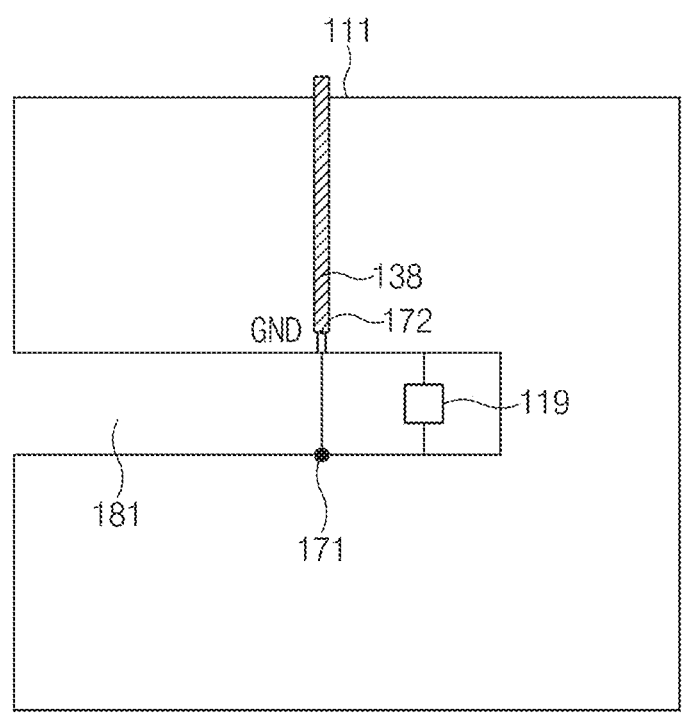
FIG. 21 illustrates a structure of a slit antenna according to another embodiment of the disclosure.

FIG. 21 illustrates a structure of a slit antenna according to another embodiment of the disclosure.

Referring to FIG. 21, a matching element 119 may be disposed in at least one of at least one or more slits (e.g., the slit 180 of FIG. 20) formed on the conductive layer 111. According to an embodiment, the matching element 119 may include inductance L and/or capacitance C. The matching element 119 may be disposed across a specific slit (e.g., the first slit 181 of FIG. 20). Hereinafter, it is described that the matching element 119 is disposed on the first slit 181. However, the structure of a slit antenna may be applied to a slit (e.g., slits 182, 183, or 184 of FIG. 3).

According to an embodiment, when an electrical signal is supplied to a first point 171, the slit may operate as an antenna. According to an embodiment, the first point 171 may be a feeding point connected to a feeding part. According to an embodiment, a second point 172 may be a ground point connected to a ground part.

According to an embodiment, the first point 171 may be one point at which a transmission line 138 or the conductive line connected to the transmission line 138 meets the conductive layer 111 across the slit 181. The first point 171 may be connected to a communication circuit (e.g., a RF circuit 3320 of FIG. 33) connected to the transmission line 138, through the conductive lines on a printed circuit board (e.g., the printed circuit board 110 of FIG. 3). The first point 171 may be disposed on the conductive layer 111 including the slit 181.

According to an embodiment, the second point 172 may be disposed on the conductive layer 111 including the slit 181. The second point 172 may correspond to the first point 171, and the slit 181 may be interposed between the first point 171 and the second point 172. The ground of the transmission line 138 may be connected to the ground of the conductive layer 111 through the second point 172.

According to an embodiment, the transmission line 138 may include a transmission line or a cable (e.g., the cable 21 of FIG. 1) disposed on a printed circuit board (e.g., the printed circuit board 110 of FIG. 3). For example, the cable may be a coaxial cable.

According to an embodiment, the matching element 119 may be disposed at a slit. According to an embodiment, the matching element 119 may be interposed between the feeding point, the ground point, and one end-point of the slit. One end-point among opposite end-points of the slit may be opened, and the one end-point may be disposed opposite to the opened end-point.

According to an embodiment, the efficiency between slit antennas may be improved by arranging the matching element 119. According to an embodiment, it is possible to adjust the resonance frequency of a slit antenna by using the matching element 119. According to an embodiment, it is possible to adjust the isolation between slit antennas by using the matching element 119.

Figure 22:
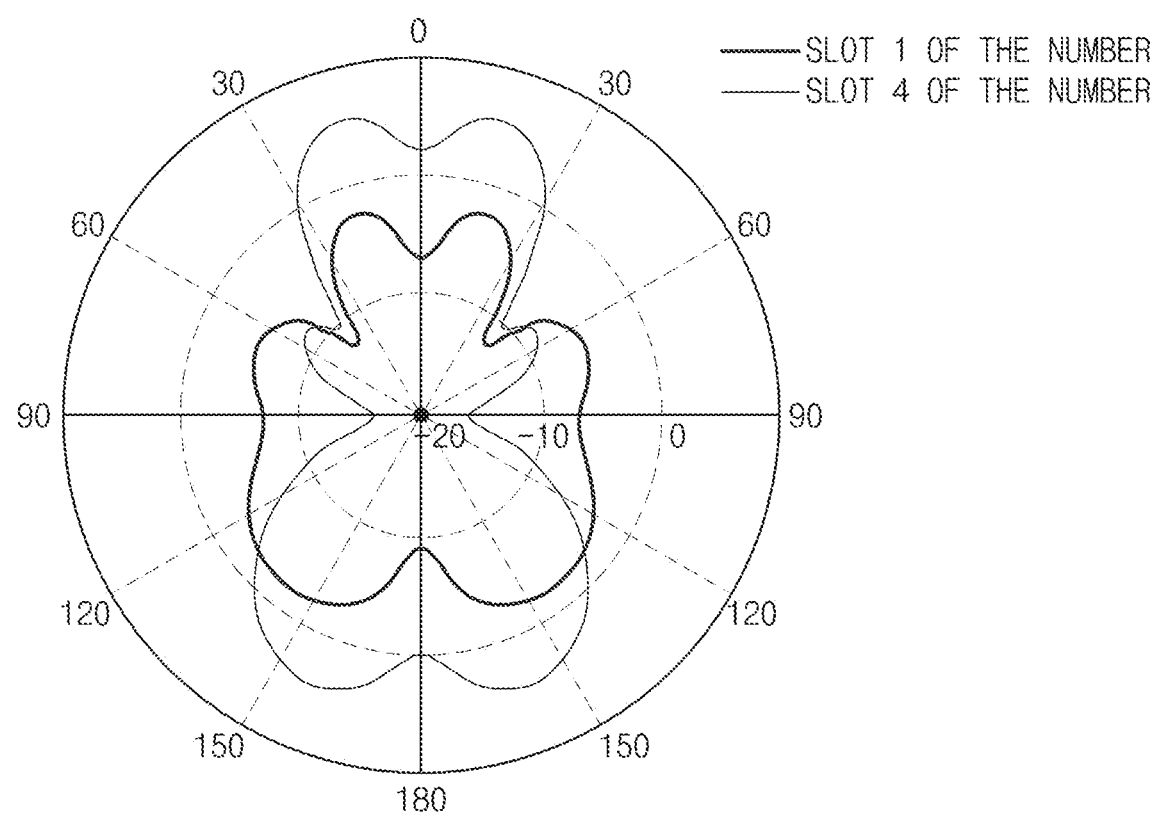
FIG. 22 illustrates a beam pattern of a slit antenna according to various embodiments of the disclosure.

FIG. 22 illustrates a beam pattern of a slit antenna according to various embodiments of the disclosure.

Referring to FIG. 22, compared with the case where one slit is used, when four slits are simultaneously used by using simultaneous feeding, directivity of the slit antenna may be improved. When the plurality of slits is fed simultaneously, the slit antenna may be used as a directional antenna. In an embodiment, an MIMO antenna may be implemented by using at least one slit 181, 182, 183, or 184 regardless of an antenna type. In another embodiment, an electronic device (e.g., the electronic device 100 of FIG. 2, 3, 5, or 8) may adjust the directionality of an antenna by using at least one or more slits (e.g., the slit 180 of FIG. 20).

Figure 23:
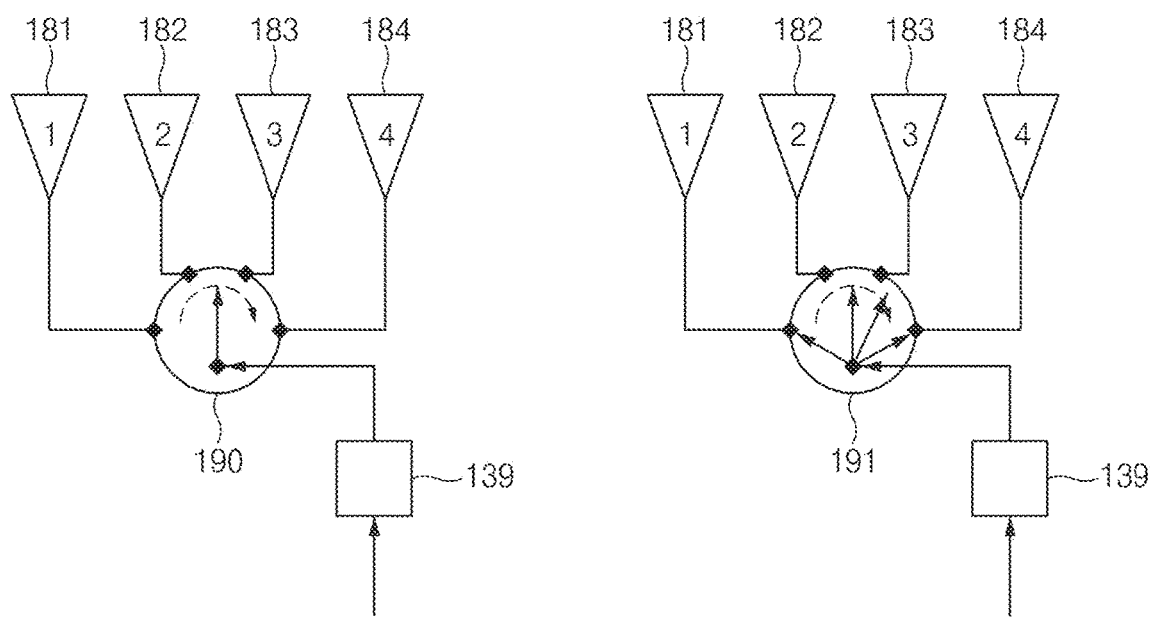
FIG. 23 illustrates a method of switching a slit antenna formed by a plurality of slits according to various embodiments of the disclosure.

FIG. 23 illustrates a method of switching a slit antenna formed by a plurality of slits according to various embodiments of the disclosure.

Referring to FIG. 23, a first switch 190 and/or a second switch 191 may be disposed on the printed circuit board 110 of the electronic device 100 (e.g., the electronic device 100 of FIG. 2, 3, 5, or 8). The first switch 190 may selectively connect a feeding part 139 to at least one of the first to fourth slits 181 to 184. The electronic device 100 may switch an antenna depending on a direction. The first switch 190 according to an embodiment may be connected to a processor. The processor according to an embodiment may be disposed on a printed circuit board.

According to an embodiment, the second switch 191 may simultaneously connect the feeding part 139 to the first to fourth slits 181 to 184. The electronic device 100 may use slit antennas by using the simultaneous feeding as a directional antenna having a specific direction. The second switch 191 according to an embodiment may be connected to a processor. The processor according to an embodiment may be disposed on the printed circuit board 110. In an embodiment, the second switch 191 may perform an on-off operation. In an embodiment, the second switch 191 may select two or more antennas.

Figure 24:
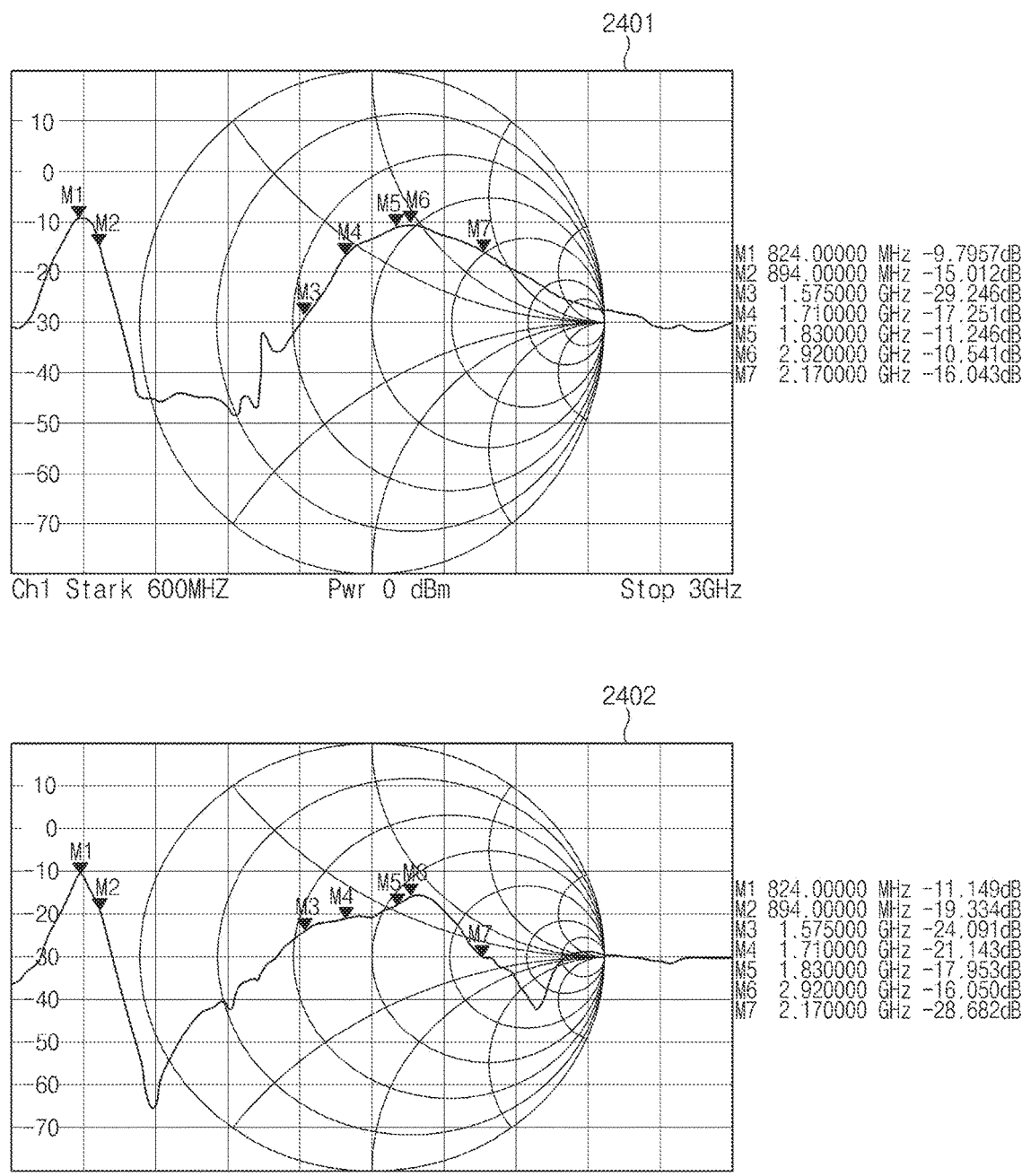
FIG. 24 is a graph illustrating a characteristic of an MIMO antenna according to another embodiment of the disclosure.

FIG. 24 is a graph illustrating a characteristic of an MIMO antenna according to another embodiment of the disclosure.

Referring to FIG. 24, a graph illustrates the result of measuring an antenna characteristic in the case where a slit antenna as illustrated in FIG. 20 is not disposed in the electronic device 100 (e.g., the electronic device 100 of FIG. 2, 3, 5, or 8) and in the case where a slit antenna as illustrated in FIG. 20 is disposed in the electronic device 100. FIG. 24 illustrates the result assuming that the first to fourth conductive patterns 101, 102, 121, and 122 for the LTE frequency band are an LTE MIMO antenna.

Graph 2401 of FIG. 24 illustrates an isolation measurement result in the case where only the LTE MIMO antenna is disposed at the upper end of the electronic device 100 as illustrated in FIG. 2. Graph 2402 of FIG. 24 illustrates the isolation measurement result in the case where a slit antenna (e.g., the slit 181, 182, 183, or 184 of FIG. 20) is additionally disposed on a second layer (e.g., the second layer 202 of FIG. 3) of the electronic device 100 as illustrated in FIG. 3.

Referring to graph 2401, in the case where the slit antenna is not disposed on a second layer, the isolation characteristic may indicate about −9.7957 dB to −15.012 dB at M1 (824.0 MHz) and M2 (894 MHz), and the isolation characteristic may indicate about −10.541 dB to −16.013 dB at M5 (1.83 GHz) to M7 (2.17 GHz). Referring to graph 2402, in the case where the slit antenna is disposed, the isolation characteristic may indicate about −11.149 dB to −19.334 dB at M1 and M2. The isolation characteristic may indicate about −16.050 dB to −20.682 dB at M5 to M7. That is, when the slit antenna is disposed on the second layer 202, the isolation characteristic of an LTE MIMO antenna may be improved.

Figure 25:
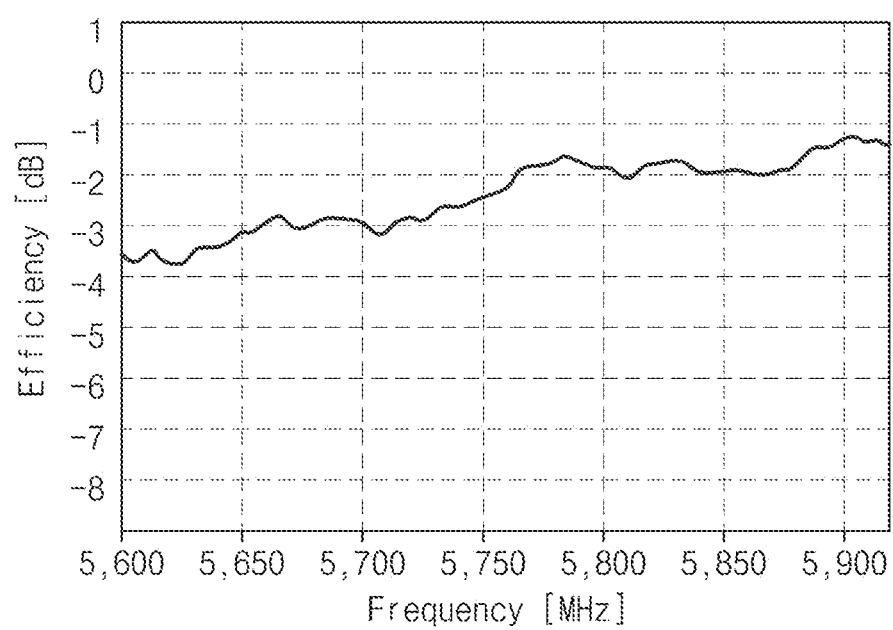
FIG. 25 is a graph illustrating an antenna efficiency of a slit antenna, according to an embodiment of the disclosure.

FIG. 25 is a graph illustrating an antenna efficiency of a slit antenna according to an embodiment of the disclosure.

Referring to FIG. 25, antenna efficiency is illustrated in the case where the matching element 119 is disposed at a slit (e.g., the slit 181 of FIG. 21). Referring to FIG. 24, the antenna efficiency may be above −2 dB in a frequency range of 5.85 GHz to 5.93 GHz. For example, the slit antenna may be used to transmit and/or receive a signal in a very high frequency area. For example, the slit antenna may be used as a V2X antenna.

Figure 26:
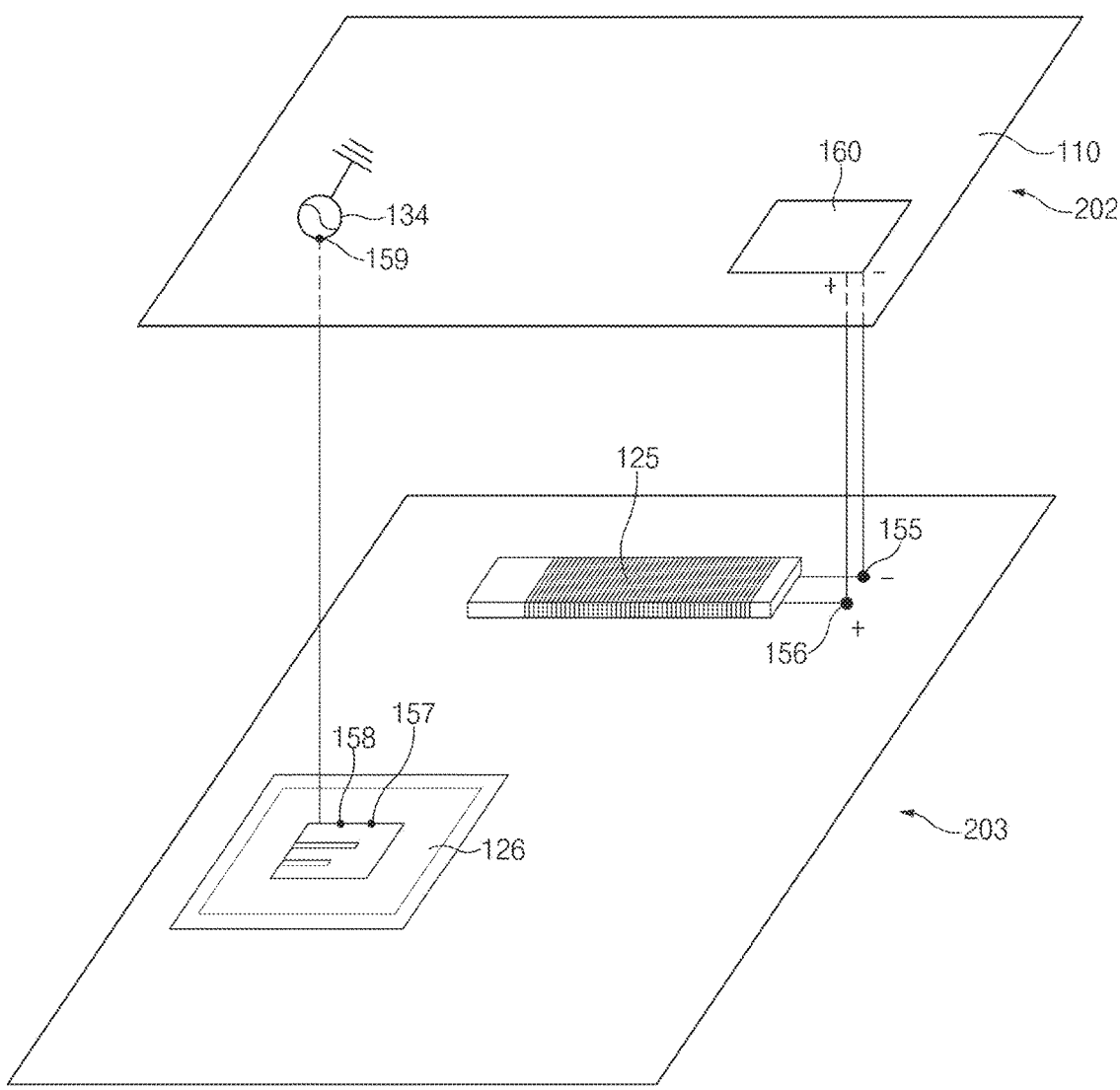
FIG. 26 illustrates a feeding method of a part of a configuration of a third layer of an electronic device according to an embodiment of the disclosure.

FIG. 26 illustrates a feeding method of a part of a configuration of a third layer of an electronic device according to an embodiment of the disclosure.

Referring to FIG. 26, illustrated is an example of an antenna configuration of a second plane (e.g., the second plane 205 of FIG. 8) included in the third layer 203 of the electronic device 100.

Referring to FIG. 26, the third layer 203 including a second plane of the electronic device 100 (e.g., the electronic device 100 of FIG. 2, 3, 4, 5, or 8) may include the twelfth conductive pattern 125 and the thirteenth conductive pattern 126. For example, the second plane may be the rear surface of the electronic device 100.

According to an embodiment, the twelfth conductive pattern 125 may be a roof antenna or a coil antenna that has positive terminal '+' and negative terminal '-'. The positive terminal 156 and the negative terminal 155, or the positive terminal 156 and a ground terminal 157 of the twelfth conductive pattern 125 may be connected to a communication circuit 160. For example, the communication circuit 160 may be a UHF transmitter and receiver circuit (e.g., an inductive transmitter 2712 of FIG. 27).

According to an embodiment, the thirteenth conductive pattern 126 may be connected to the feeding part 134 disposed on the second layer 202, through one point 158. The feeding part 134 may feed one point 159 of the printed circuit board 110, and an electrical signal supplied to the one point 159 of the printed circuit board 110 may be transmitted to the thirteenth conductive pattern 126 through one point 158 of the third layer 203. In an embodiment, the one point 158 of the third layer 203 may be connected to the one point 159 of the second layer 202 through a connection member. For example, the connection member may be a C-clip.

The ground terminal 157 of the thirteenth conductive pattern 126 may be grounded through one point of the second layer 202.

Figure 27:
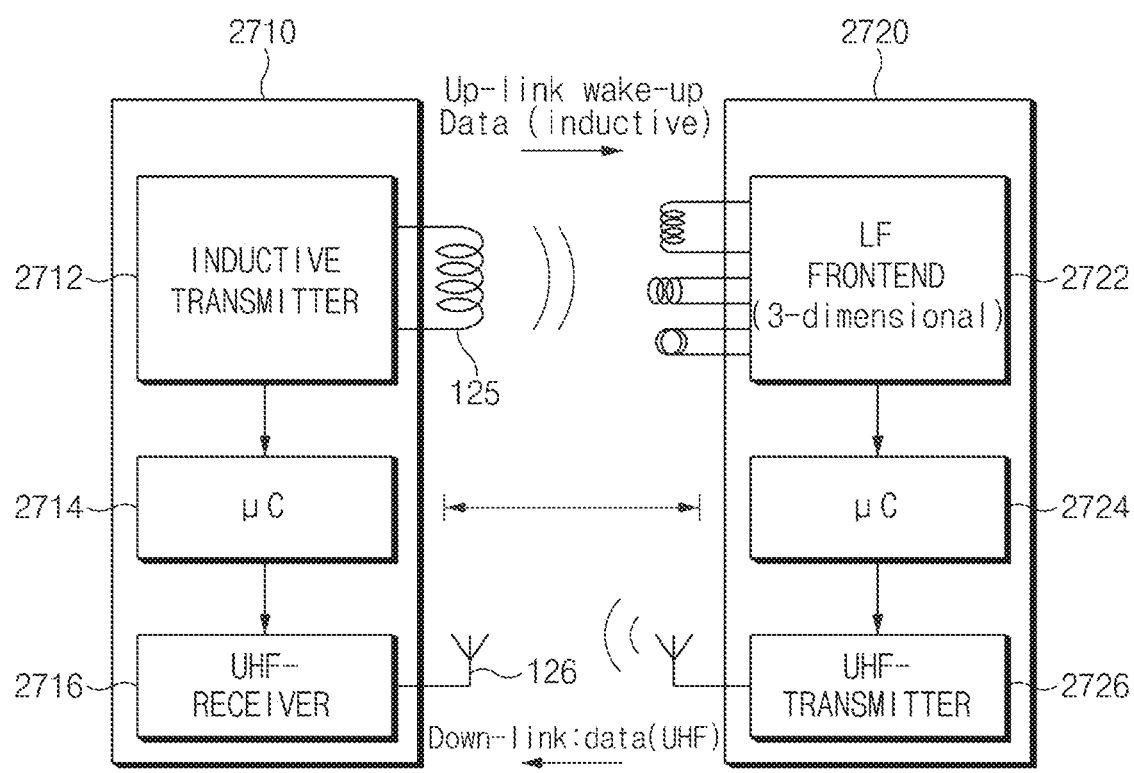
FIG. 27 illustrates a communication system according to a part of a configuration of a third layer of an electronic device according to an embodiment of the disclosure.

FIG. 27 illustrates a communication system according to a part of a configuration of a third layer of an electronic device according to an embodiment of the disclosure.

Referring to FIG. 27, an LF antenna 125 (e.g., the twelfth conductive pattern 125 of FIG. 3) and an UHF antenna 126 (e.g., the thirteenth conductive pattern 126 of FIG. 3) that are disposed on a third layer (e.g., the third layer 203 of FIG. 2) of an electronic device (e.g., the electronic device 100 of FIG. 2, 3, 4, 5, or 8) may be used for a bi-directional passive keyless entry (PKE) system.

The keyless entry system for vehicle security may include a base station 2710 and a transponder 2720. A smart transponder may have been recently changed to bi-directional communication capable of receiving and transmitting data. In such a system, the base station 2710 and the transponder 2720 may automatically communicate with each other without requiring user input.

The base station 2710 may transmit a command by using LF and may wait for a response from the valid transponder 2720. The transponder 2720 is in a reception mode most of the time and may wait for the transmission of a valid base station command. When the valid base station command is received, the transponder may transmit a response by using UHF. Such a system may be referred to as a "bi-directional PKE system."

In the bi-directional PKE system, it is possible to implement a bidirectional communication transponder at a low cost by using a dual frequency of a frequency (e.g., 125 KHz) of a LF band for receiving data and a UHF (315, 433, 868, or 915 MHz) band for transmitting data.

According to an embodiment, the base station 2710 may include the inductive transmitter 2712, a micro controller µC 2714, or a UHF receiver 2716. For example, the inductive transmitter 2712 may transmit a LF signal of about 125 KHz. The UHF receiver 2716 may receive a signal of a UHF band. The micro controller 2714 may control the function of the base station 2710. The LF signal of about 125 KHz may be generated by a resonant circuit. According to an embodiment of the disclosure, the twelfth conductive pattern 125 of FIG. 26 may transmit an LF signal. According to an embodiment of the disclosure, an LF antenna (e.g., the twelfth conductive pattern 125 of FIG. 26) may be connected to the inductive transmitter 2712 of the base station 2710. In an embodiment, the base station 2710 may be a vehicle or the electronic device 100 disclosed in the disclosure.

The transponder 2720 may include an LF frontend 2722, a micro controller 2724, or a UHF transmitter 2726. Although not illustrated in FIG. 27, the transponder 2720 may include a wake-up pattern detection unit, which detects a pattern of a wake-up signal, and a power detection unit that detects power.

The LF frontend 2722 may receive an LF command from the base station 2710. For example, the LF command may be an uplink wake-up signal or a data signal. The LF frontend 2722 may be connected to an antenna for receiving a 3-dimensional LF signal or may receive a 3-dimensional LF signal. The micro controller 2724 may control the function of the transponder 2720. The UHF transmitter 2726 may transmit a UHF signal to the base station 2710. The UHF signal may be a downlink data signal. According to an embodiment of the disclosure, the UHF antenna (e.g., the thirteenth conductive pattern 126 of FIG. 26) may receive a UHF signal. According to an embodiment of the disclosure, the UHF antenna may be connected to the UHF receiver 2716 of the base station 2710. In an embodiment, the transponder 2720 may be a device, which transmits a signal for controlling the vehicle or an electronic device (e.g., the electronic device 100 of FIG. 2, 3, 4, 5, or 8) of the disclosure, or an identification device. For example, the transponder 2720 may be a key for controlling the vehicle.

Figure 28:
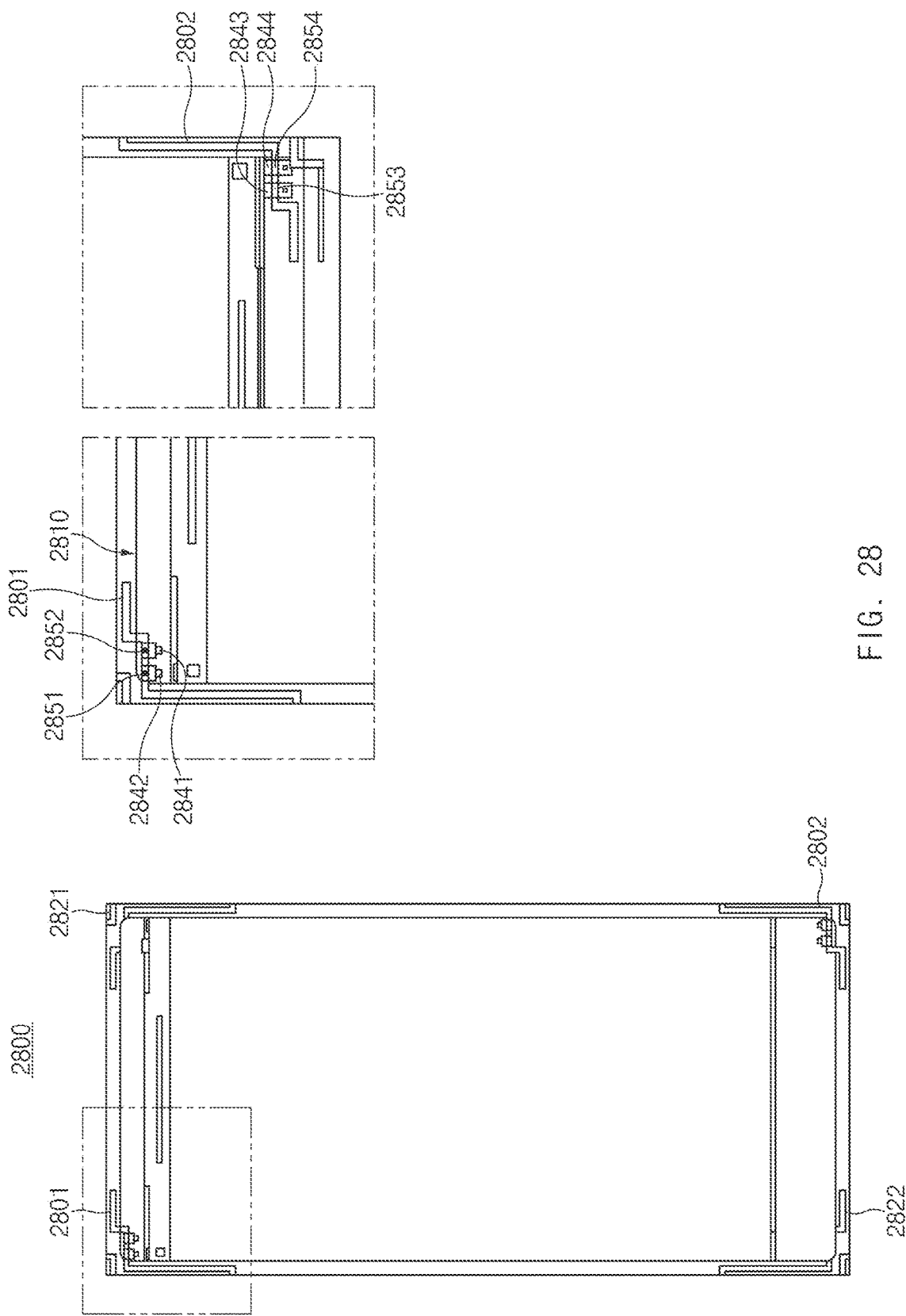
FIG. 28 schematically illustrates a structure of an electronic device according to another embodiment of the disclosure.

FIG. 28 schematically illustrates a structure of an electronic device according to another embodiment of the disclosure.

Referring to FIG. 28, an electronic device 2800 (e.g., the electronic device 100 of FIG. 2, 3, 4, 5, or 8) according to an embodiment may be a mobile device such as a smartphone, a tablet PC, or the like.

According to an embodiment, the electronic device 2800 may include a plurality of conductive patterns 2801, 2802, 2821, and 2822, which have an electrical length, for transmitting and/or receiving a signal in a specific frequency band, at the edge of a support member supporting a housing surrounding the electronic device or an antenna inside the housing. Hereinafter, the arrangement of a conductive pattern is described assuming that a plurality of conductive patterns 2801, 2802, 2821, and 2822 are disposed at the support member.

According to an embodiment, the electronic device 2800 may include three layers. A first layer may include a first plane facing in a first direction (e.g., upward or +z direction) of the electronic device. The first conductive pattern 2801 may be disposed at a first edge among edges corresponding to the first plane. The first conductive pattern 2801 may have an electrical length for transmitting and/or receiving the signal in the at least specific frequency band. Hereinafter, the conductive patterns for transmitting and/or receiving the signal in the at least specific frequency band may be referred to as a "first conductive pattern," "second conductive pattern," "third conductive pattern," or "fourth conductive pattern."

According to an embodiment, the first plane may include a first edge and a second edge extending in a third direction (e.g., a backwards or +y direction). The second conductive pattern 2802 for transmitting and/or receiving the signal in the at least specific frequency band may be disposed at a second edge. When viewed from above the first plane, the first conductive pattern 2801 and second conductive pattern 2802 may be positioned diagonally at opposing corners with each other. The first plane of the electronic device 2800 according to an embodiment may include a display.

According to an embodiment, the second layer may be interposed between the first layer and third layer. According to an embodiment, the second layer may include a printed circuit board 2810.

According to an embodiment, the third layer may include a third edge and a fourth edge corresponding to the first edge and the second edge, respectively. At least part of the third conductive pattern 2821 for transmitting and/or receiving the signal in the at least specific frequency band may be disposed along at least part of the third edge. At least part of the fourth conductive pattern 2822 for transmitting and/or receiving the signal in the at least specific frequency band may be disposed along at least part of the fourth edge. The third conductive pattern 2821 and fourth conductive pattern 2822 may not overlap with each other when viewed from above the first plane. In an embodiment, when viewed from above the first plane, the first to fourth conductive patterns 2801, 2802, 2821, and 2822 may not overlap with each other.

According to an embodiment, the first to fourth conductive patterns 2801, 2802, 2821, and 2822 may operate as an MIMO antenna. In an embodiment, the first to fourth conductive patterns 2801, 2802, 2821, and 2822 may be an LTE antenna.

According to an embodiment, at least one of the first to fourth conductive patterns 2801, 2802, 2821, and 2822 may be connected to an electrically conductive line. A wireless communication circuit may transmit and/or receive a signal in a specific frequency band, by using a first electrically conductive line. For example, the first conductive pattern 2801 may be connected to the first electrically conductive line, and the wireless communication circuit may transmit and/or receive a signal in an LTE frequency band by using the first conductive pattern 2801. The fourth conductive pattern 2822 may be connected to the fourth electrically conductive line, and the wireless communication circuit may transmit and/or receive a signal in an LTE frequency band by using the fourth conductive pattern 2822.

According to an embodiment, one point 2851 of the first conductive pattern 2801 may be connected to a ground part through a connection member 2841. The one point 2852 of the first conductive pattern 2801 may be connected to a feeding part through a connection member 2842. In an embodiment, at least one of the one point 2851 and the one point 2852 may be positioned on the first plane. The ground part and/or the feeding part may be disposed on the printed circuit board 2810.

According to an embodiment, one point 2853 of the second conductive pattern 2802 may be connected to a ground part through a connection member 2843. The one point 2854 of the second conductive pattern 2802 may be connected to the feeding part through a connection member 2844. The ground part and/or the feeding part may be disposed on the printed circuit board 2810.

Figure 29:
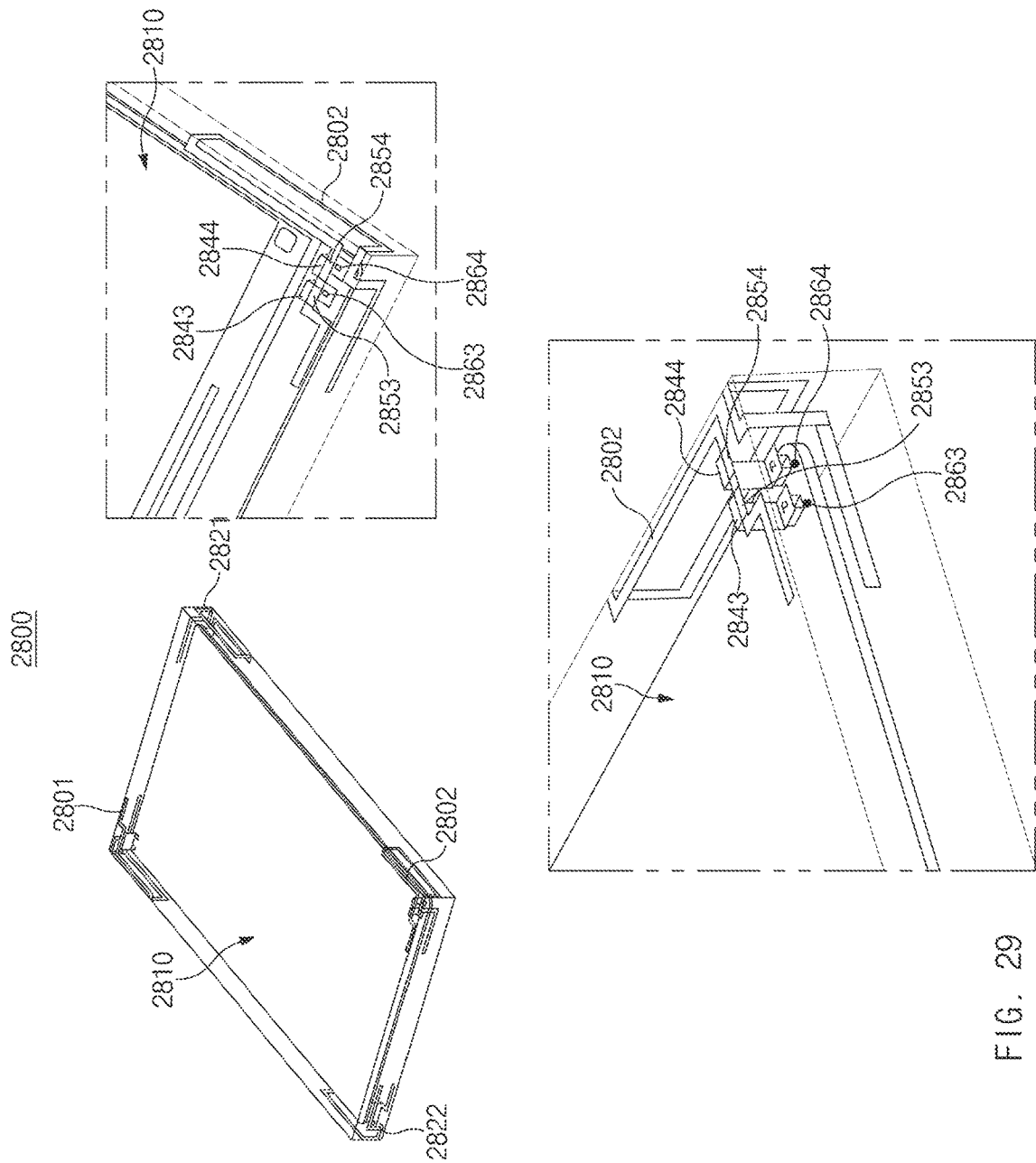
FIG. 29 is a perspective view illustrating a side surface of an electronic device according to another embodiment of the disclosure.

FIG. 29 is a perspective view illustrating a side surface of an electronic device according to an embodiment of the disclosure.

Referring to FIG. 29, a first layer of the electronic device 2800 (e.g., the electronic device 100 of FIG. 2, 3, 4, 5, or 8) may include a first plane facing in at least a first direction (e.g., an upwards or +z direction). The second layer may include the printed circuit board 2810. A third layer of electronic device 2800 may include a second plane (e.g., a downwards or '−z' direction) facing in a direction opposite to at least the first direction. The first plane and the second plane may be one plane of a housing of the electronic device 2800 or the support member of the electronic device 2800.

According to an embodiment, a ground part of the printed circuit board 2810 may be electrically connected to a second conductive pattern 2802 through the one point 2853 of the first layer. The one point 2853 of the second conductive pattern 2802 may be connected to one point 2863 of the printed circuit board 2810 through the connection member 2843. The one point 2863 may be connected to the ground part.

According to an embodiment, a feeding part of the printed circuit board 2810 may feed the second conductive pattern 2802. The feeding part may be electrically connected to one point 2864 positioned on the printed circuit board 2810. An electrical signal supplied to the one point 2864 of the printed circuit board 2810 may be transmitted to the second conductive pattern 2802 through the connection member 2844. The connection member 2844 may electrically connect the one point 2864 of the printed circuit board 2810 to one point 2854 of the second conductive pattern 2802.

Figure 30:
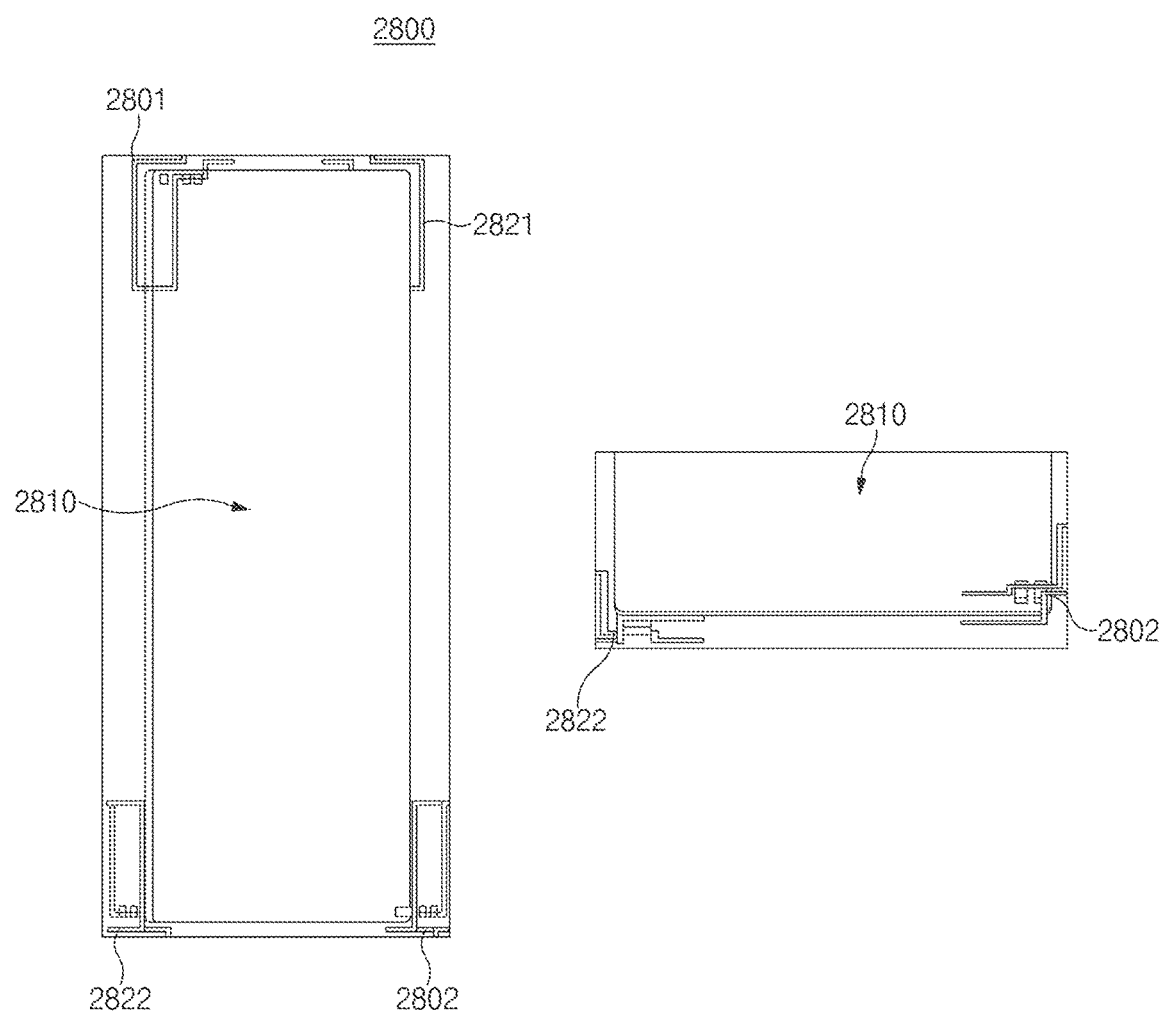
FIG. 30 illustrates a side surface of an electronic device and a side surface of a lower portion of an electronic device of the disclosure.

FIG. 30 illustrates a side surface of an electronic device and a side surface of a lower portion of an electronic device according to an embodiment of the disclosure.

Referring to FIG. 30, the first conductive pattern 2801 of an electronic device 2800 (e.g., the electronic device 2800 of FIG. 29) may be disposed adjacent to one vertex (i.e., first vertex) among vertices connected to a first edge. For example, the first conductive pattern 2801 may be disposed on at least one surface among surfaces adjacent to the first vertex. The second conductive pattern 2802 may be disposed adjacent to one vertex (i.e., second vertex) among vertices connected to a second edge.

According to an embodiment, the third conductive pattern 2821 disposed on a third layer may be disposed adjacent to one vertex (i.e., third vertex) among vertices connected to a third edge. The fourth conductive pattern 2822 may be disposed adjacent to one vertex (i.e., fourth vertex) among vertices connected to a fourth edge. The first to fourth vertices may not overlap with each other, when viewed from above the first plane facing in a first direction (e.g., an upwards or +z direction) of the electronic device 2800.

According to an embodiment, the second conductive pattern 2802 and the fourth conductive pattern 2822 may be disposed on the side surface of a lower portion of the electronic device. When viewed from the side surface of a lower portion of the electronic device, the second conductive pattern 2802 and the fourth conductive pattern 2822 may be disposed diagonally against each other.

The configuration of the electronic device 2800 illustrated in FIG. 30 may be variously changed according to various embodiments of the disclosure. For example, the electronic device 2800 may include a configuration such as the fifth conductive pattern 103 for a Wi-Fi frequency band of FIG. 3.

According to various embodiments of the disclosure, it is possible to maximize the data transmission/reception ratio in a limited space. According to various embodiments of the disclosure, the electromagnetic mutual coupling between antennas and the isolation characteristics between antennas having different resonance frequencies may be optimized.

Figure 31:
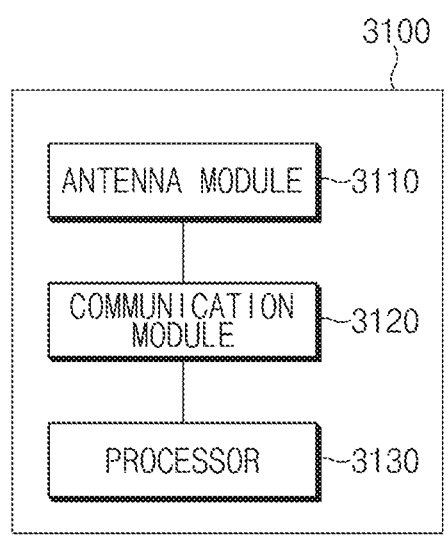
FIG. 31 is a block diagram of an electronic device according to an embodiment of the disclosure.

FIG. 31 illustrates a block diagram of an electronic device according to an embodiment of the disclosure.

Referring to FIG. 31, an electronic device 3100 (e.g., the electronic device 100 of FIG. 2, 3, 4, 5, or 8) may include an antenna module 3110, a communication module 3120, and a processor 3130. According to an embodiment, the electronic device 3100 may be a TCU, a smartphone, a tablet PC, or the like.

According to an embodiment, the antenna module 3110 may be referred to as a "conductive pattern" or an "antenna assembly" integrating antennas. For example, the antenna module 3110 may include an LTE antenna, an LF antenna for transmitting and/or receiving a signal for a vehicle, a UHF antenna, or the like.

According to an embodiment, the communication module 3120 may process the signal obtained from the antenna module 3110. For example, the communication module 3120 may include a baseband module. The communication module 3120 may include a separate module to process a signal of Wi-Fi, Bluetooth, or the like. For example, the communication module 3120 may be the communication module 3490 of FIG. 34.

According to an embodiment, the processor 3130 may perform an operation based on the signal obtained from the communication module 3120 or may control other configuration. For example, the processor 3130 may control the communication module 3120 to transmit a signal. The processor 3130 may be, for example, an application processor (AP) or a communication processor (CP).

Figure 32:
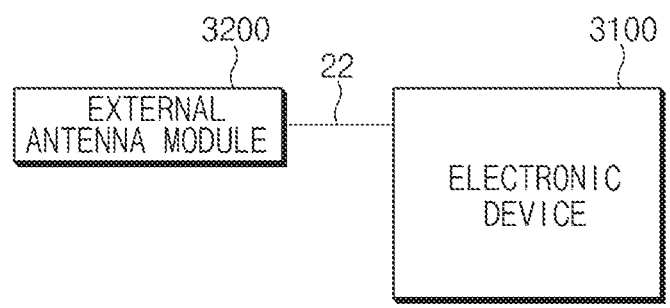
FIG. 32 illustrates an operating environment of an electronic device according to an embodiment of the disclosure.

FIG. 32 illustrates an operating environment of an electronic device according to an embodiment of the disclosure.

Referring to FIG. 32, the electronic device 3100 may be the electronic device 3100 of FIG. 31. The electronic device 3100 may transmit and/or receive a signal by using an antenna module (e.g., the antenna module 3110 of FIG. 31) therein. However, embodiments are not limited thereto. For example, the electronic device 3100 may transmit and/or receive a signal by using at least one external antenna module 3200.

According to an embodiment, the external antenna module 3200 may be positioned to the outside of the electronic device 3100, may transmit a signal, which is obtained through an antenna, to the electronic device 3100, or may transmit the signal obtained from the electronic device 3100, to an external device. For example, the external antenna module 3200 may include a 5G antenna or an antenna for transmitting and/or receiving a satellite signal. The external antenna module 3200 may be disposed at a position where upward radiation is easy. For example, the external antenna module 3200 may be disposed at the sun roof of a vehicle.

According to an embodiment, the external antenna module 3200 may interact with the electronic device 3100 through a cable 22. The cable 22 according to an embodiment may be a coaxial cable.

Figure 33:
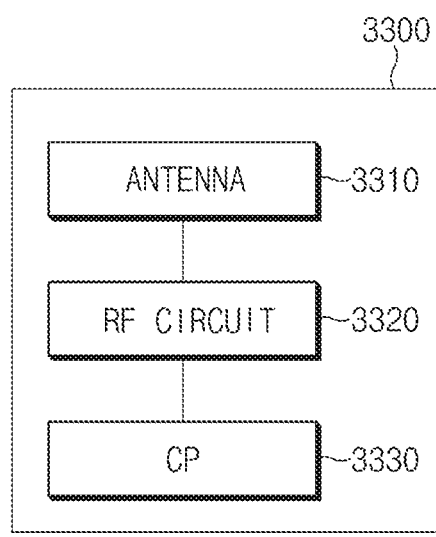
FIG. 33 is a block diagram of an electronic device according to an embodiment of the disclosure.

FIG. 33 is a block diagram of an electronic device according to an embodiment of the disclosure.

Referring to FIG. 33, an electronic device 3300 may include an antenna 3310, the RF circuit 3320, and a CP 3330.

According to an embodiment, the antenna 3310 may correspond to at least one of conductive patterns constituting the electronic device 100 of FIG. 2, 3, 4, 5, or 8. For example, the antenna 3310 may include a first conductive pattern (e.g., the first conductive pattern 101 of FIG. 2) to a fourth conductive pattern (e.g., the fourth conductive pattern 122 of a FIG. 2). The electronic device 3300 may transmit and/or receive an LTE signal through the first to fourth conductive patterns. According to an embodiment, the antenna 3310 may operate as an MIMO antenna.

According to an embodiment, the RF circuit 3320 may transmit an electrical signal to the antenna 3310. The RF circuit 3320 may be disposed on a printed circuit board (e.g., the printed circuit board 110 of FIG. 2). The RF circuit 3320 may be the communication module 3490 of FIG. 34.

According to an embodiment, the CP 3330 may control the RF circuit 3320 so as to transmit and/or receive a signal through the antenna 3310 corresponding to a target frequency. The CP 3330 may select the antenna 3310 suitable for communication context and may allow the selected antenna 3310 to transmit and receive a signal.

According to an embodiment, a vehicle (e.g., the external device 10 of FIG. 1) may include an antenna assembly (e.g., the electronic device 100 of FIG. 1) and a plurality of wireless communication circuits (e.g., the communication module 3120 of FIG. 31) electrically connected to the antenna assembly.

According to an embodiment, the antenna assembly may include a first plane (e.g., the first plane 204 of FIG. 2) including a first edge (e.g., the first edge 211 of FIG. 2) and a second edge (e.g., the second edge 212 of FIG. 2) extending in parallel to each other in a first direction. The first plane may include a first conductive pattern (e.g., the first conductive pattern 101 of FIG. 2) formed along a portion of the first edge, and a second conductive pattern (e.g., the second conductive pattern 102 of FIG. 2) formed along a portion of the second edge. The first conductive pattern and the second conductive pattern may be positioned diagonally against each other when viewed from above the first plane.

According to an embodiment, the antenna assembly may include a second plane (e.g., the second plane 205 of FIG. 2) spaced from the first plane, while overlapping at least partially with the first plane when viewed from above the first plane, and including a third edge (e.g., the third edge 213 of FIG. 2) extending along the first edge, and a fourth edge (e.g., the fourth edge 214 of FIG. 2) extending along the second edge. The second plane may include a third conductive pattern (e.g., the third conductive pattern 121 of FIG. 2) formed along a portion of the third edge, and a fourth conductive pattern (e.g., the fourth conductive pattern 122 of FIG. 2) formed along a portion of the fourth edge. The second plane may include the third conductive pattern and the fourth conductive pattern positioned diagonally against each other without overlapping with the first and second conductive patterns, when viewed from above the first plane.

According to an embodiment, the antenna assembly may include a non-conductive layer (e.g., the non-conductive region 113 of FIG. 2) between the first plane and the second plane.

According to an embodiment, the plurality of wireless communication circuits may include a first electrically conductive line electrically connected to the first conductive pattern, a second electrically conductive line electrically connected to the second conductive pattern, a third electrically conductive line electrically connected to the third conductive pattern, and a fourth electrically conductive line electrically connected to the fourth conductive pattern.

According to an embodiment, the plurality of wireless communication circuits may include a first signal in a range of 0.7 GHz to 1 GHz or 1.7 GHz to 3.0 GHz through the first electrically conductive line, a second signal in a range of 0.7 GHz to 1 GHz or 1.7 GHz to 3.0 GHz through the second electrically conductive line, a third signal in a range of 0.7 GHz to 1 GHz or 1.7 GHz to 3.0 GHz through the third electrically conductive line, and a fourth signal in a range of 0.7 GHz to 1 GHz or 1.7 GHz to 3.0 GHz through the fourth electrically conductive line.

According to an embodiment, the first to fourth signals may be in compliance with the LTE standard.

According to an embodiment, the first conductive pattern may include a first elongated strip formed at the portion of the first edge, and wherein the second conductive pattern includes a second elongated strip formed at the portion of the second edge.

According to an embodiment, the third conductive pattern may include a first open loop spaced from the third edge when viewed from above the first plane, and the fourth conductive pattern may include a second open loop spaced from the fourth edge when viewed from above the first plane.

According to an embodiment, the antenna assembly may further include a fifth conductive pattern (e.g., the tenth conductive pattern 106 of FIG. 3) formed on or above the first plane between the first and second edges without overlapping with the first to fourth conductive patterns, when viewed from above the first plane. According to an embodiment, the plurality of wireless communication circuits may be configured to receive a GPS signal through the fifth conductive pattern.

According to an embodiment, the antenna assembly may further include a sixth conductive pattern (e.g., the ninth conductive pattern 105 of FIG. 3). The sixth conductive pattern may be formed on or above the first plane between the first and second edges without overlapping with the first to fifth conductive patterns when viewed from above the first plane. The plurality of wireless communication circuits may be configured to receive a SDARS signal through the sixth conductive pattern.

The antenna assembly may further include a seventh conductive pattern (e.g., the seventh conductive pattern 123 FIG. 3) formed on or above the second plane between the third and fourth edges without overlapping with the first to sixth conductive patterns when viewed from above the first plane. The plurality of wireless communication circuits may be configured to transmit and/or receive a signal in compliance with Wi-Fi standard through the seventh conductive pattern.

According to an embodiment, at least one of the first plane or second plane may include a conductive layer (e.g., the ground plane 210 of FIG. 3 or the conductive layer 111 of FIG. 5) forming a ground plane.

The antenna assembly may include a printed circuit board (e.g., the printed circuit board 110 of FIG. 3) including a conductive layer forming a ground plane between the first plane and the second plane.

The conductive layer may include at least one slit (e.g., the slit 180 of FIG. 3). The plurality of wireless communication circuits may be configured to transmit and/or receive a signal through the at least one slit.

According to an embodiment, the electronic device (e.g., the electronic device 100 of FIG. 1) may include housing (e.g., the housing 1000 of FIGS. 11A and 11B). According to an embodiment, the housing may include a first plane (e.g., the first plane 204 of FIG. 2) including a first edge (e.g., the first edge 211 of FIG. 2) and a second edge (e.g., the second edge 212 of FIG. 2) extending in parallel to each other in a first direction. The first plane may include a first conductive pattern first conductive pattern (e.g., the first conductive pattern 101 of FIG. 1) formed along a portion of the first edge.

According to an embodiment, the housing may include a second plane (e.g., the second plane 205 of FIG. 2) spaced from the first plane, while overlapping at least partially with the first plane when viewed from above the first plane, and including a third edge (e.g., the third edge 213 of FIG. 2) extending along the first edge, and a fourth edge (e.g., the fourth edge 214 of FIG. 2) extending along the second edge. The second plane may include a second conductive pattern (e.g., the second conductive pattern 102 of FIG. 2) formed along a portion of the third edge or the fourth edge and formed without overlapping with the first conductive pattern when viewed from above the first plane.

According to an embodiment, the housing may include a non-conductive layer (e.g., the non-conductive region 113 of FIG. 2) interposed between the first plane and the second plane.

According to an embodiment, the electronic device may include a plurality of wireless communication circuits (e.g., the communication module 3120 of FIG. 31) electrically connected to the first conductive pattern or the second conductive pattern.

According to an embodiment, the plurality of wireless communication circuits may include a first electrically conductive line electrically connected to the first conductive pattern and a second electrically conductive line electrically connected to the second conductive pattern.

According to an embodiment, the plurality of wireless communication circuits may be configured to transmit and/ or receive a signal in compliance with a LTE standard through at least one of the first electrically conductive line or the second electrically conductive line.

According to an embodiment, the antenna assembly may include a printed circuit board (e.g., the printed circuit board 110 of FIG. 3) including a conductive layer (e.g., the conductive layer 111 of FIG. 5) forming a ground plane between the first plane and the second plane.

According to an embodiment, the conductive layer may include at least one slit (e.g., the slit 180 of FIG. 3). The plurality of wireless communication circuits may be configured to transmit and/or receive a signal through the at least one slit.

Figure 11:
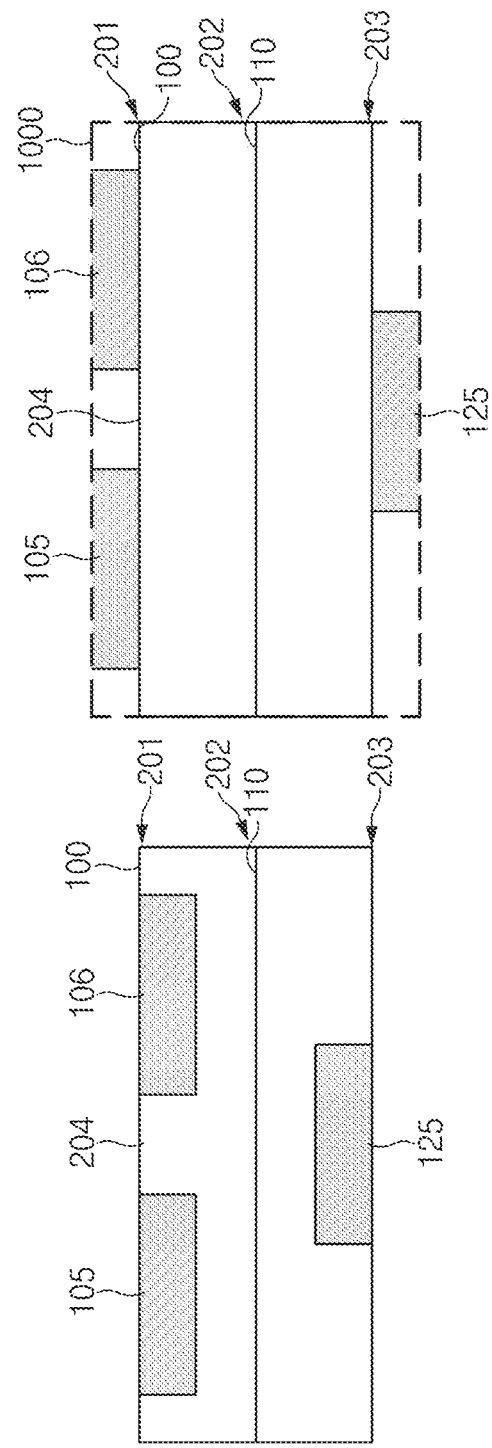
FIGS. 11A and 11B are sectional views schematically illustrating a partial configuration of an electronic device according to an embodiment of the disclosure.

According to an embodiment, the electronic device (e.g., the electronic device 100 of FIG. 1) may include housing (e.g., the housing 1000 of FIGS. 11 A and 11B). According to an embodiment, the housing may include a first plane (e.g., the first plane 204 of FIG. 2) including a first edge (e.g., the first edge 211 of FIG. 2) and a second edge (e.g., the second edge 212 of FIG. 2) extending in parallel to each other in a first direction. The first plane may include a first conductive pattern first conductive pattern (e.g., the first conductive pattern 101 of FIG. 1) formed along a portion of the first edge.

According to an embodiment, the housing may include a second plane (e.g., the second plane 205 of FIG. 2) spaced from the first plane, while overlapping at least partially with the first plane when viewed from above the first plane, and including a third edge (e.g., the third edge 213 of FIG. 2) extending along the first edge, and a fourth edge (e.g., the fourth edge 214 of FIG. 2) extending along the second edge. The second plane may include a second conductive pattern (e.g., the second conductive pattern 102 of FIG. 2) formed along a portion of the third edge or the fourth edge and formed without overlapping with the first conductive pattern when viewed from above the first plane.

According to an embodiment, the housing may include a non-conductive layer (e.g., the non-conductive region 113 of FIG. 2) interposed between the first plane and the second plane.

According to an embodiment, the electronic device may include a plurality of wireless communication circuits (e.g., the communication module 3120 of FIG. 31) electrically connected to the first conductive pattern or the second conductive pattern.

According to an embodiment, the plurality of wireless communication circuits may include a first electrically conductive line electrically connected to the first conductive pattern and a second electrically conductive line electrically connected to the second conductive pattern.

According to an embodiment, the plurality of wireless communication circuits may be configured to transmit and/or receive a signal in compliance with a LTE standard through at least one of the first electrically conductive line or the second electrically conductive line.

According to an embodiment, the antenna assembly may include a printed circuit board (e.g., the printed circuit board 110 of FIG. 3) including a conductive layer (e.g., the conductive layer 111 of FIG. 5) forming a ground plane between the first plane and the second plane.

According to an embodiment, the conductive layer may include at least one slit (e.g., the slit 180 of FIG. 3). The plurality of wireless communication circuits may be configured to transmit and/or receive a signal through the at least one slit.

Figure 34:
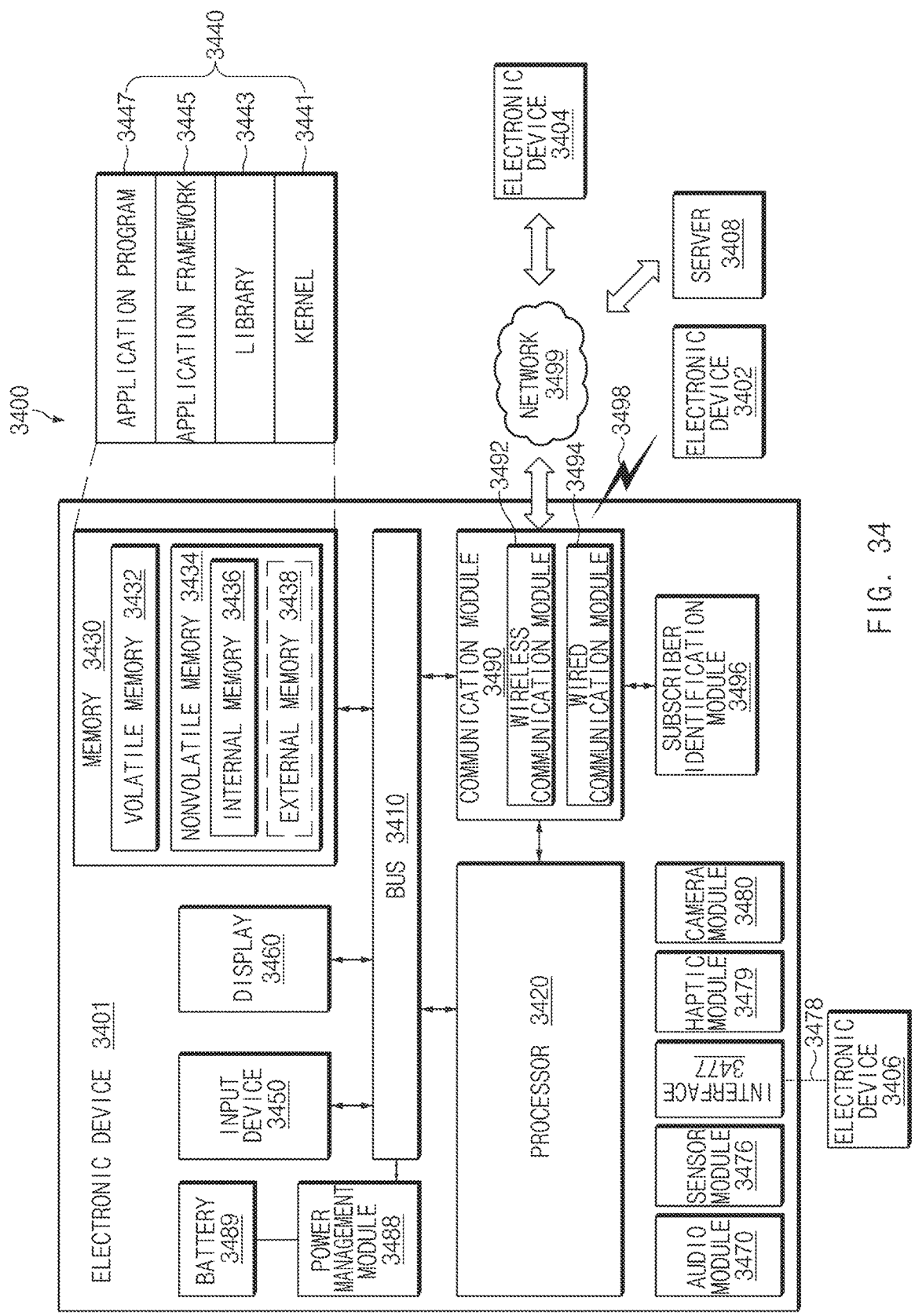
FIG. 34 illustrates a block diagram of an electronic device in a network environment according to various embodiments of the disclosure.

FIG. 34 illustrates a block diagram of an electronic device in a network environment according to various embodiments of the disclosure.

Referring to FIG. 34, an electronic device according to various embodiments of this disclosure may include various forms of devices. For example, the electronic device may include at least one of, for example, portable communication devices (e.g., smartphones), computer devices (e.g., personal digital assistants (PDAs), tablet PCs, laptop PCs, desktop PCs, workstations, or servers), portable multimedia devices (e.g., electronic book readers or Motion Picture Experts Group (MPEG-1 or MPEG-2) audio layer 3 (MP3) players), portable medical devices (e.g., heartbeat measuring devices, blood glucose monitoring devices, blood pressure measuring devices, and body temperature measuring devices), cameras, or wearable devices. The wearable device may include at least one of an accessory type (e.g., watches, rings, bracelets, anklets, necklaces, glasses, contact lens, or head-mounted-devices (HIMDs)), a fabric or garment-integrated type (e.g., an electronic apparel), a body-attached type (e.g., a skin pad or tattoos), or a bio-implantable type (e.g., an implantable circuit). According to various embodiments, the electronic device may include at least one of, for example, TVs, digital versatile disc (DVD) players, audios, audio accessory devices (e.g., speakers, headphones, or headsets), refrigerators, air conditioners, cleaners, ovens, microwave ovens, washing machines, air cleaners, set-top boxes, home automation control panels, security control panels, game consoles, electronic dictionaries, electronic keys, camcorders, or electronic picture frames.

In another embodiment, the electronic device may include at least one of navigation devices, satellite navigation system (e.g., GNSS), event data recorders (EDRs) (e.g., black box for a car, a ship, or a plane), vehicle infotainment devices (e.g., head-up display for vehicle), industrial or home robots, drones, automatic teller's machines (ATMs), points of sales (POSs), measuring instruments (e.g., water meters, electricity meters, or gas meters), or internet of things (e.g., light bulbs, sprinkler devices, fire alarms, thermostats, or street lamps). The electronic device according to an embodiment of this disclosure may not be limited to the above-described devices, and may provide functions of a plurality of devices like smartphones which have measurement function of personal biometric information (e.g., heart rate or blood glucose). In this disclosure, the term "user" may refer to a person who uses an electronic device or may refer to a device (e.g., an artificial intelligence electronic device) that uses the electronic device.

Referring to FIG. 34, under the network environment 3400, the electronic device 3401 (e.g., the electronic device 100) may communicate with an electronic device 3402 through a first network 3498 (e.g., a local wireless communication) or may communication with an electronic device 3404 or a server 3408 through a second network 3499. According to an embodiment, the electronic device 3401 may communicate with the electronic device 3404 through the server 3408.

According to an embodiment, the electronic device 3401 may include a bus 3410, a processor 3420 (e.g., the processor 3130), a memory 3430, an input device 3450 (e.g., a micro-phone or a mouse), a display device 3460, an audio module 3470, a sensor module 3476, an interface 3477, a haptic module 3479, a camera module 3480, a power management module 3488, a battery 3489, a communication module 3490, and a subscriber identification module (SIM) 3496. According to an embodiment, the electronic device 3401 may not include at least one (e.g., the display device 3460 or the camera module 3480) of the above-described elements or may further include other element(s).

The bus 3410 may interconnect the above-described elements 3420 to 3490 and may include a circuit for conveying signals (e.g., a control message or data) between the above-described elements.

The processor 3420 may include one or more of a central processing unit (CPU), an AP, a graphic processing unit (GPU), an image signal processor (ISP) of a camera or a CP. According to an embodiment, the processor 3420 may be implemented with a system on chip (SoC) or a system in package (SiP). For example, the processor 3420 may drive an operating system (OS) or an application program to control at least one of another element (e.g., hardware or software element) of the electronic device 3401 connected to the processor 3420 and may process and compute various data. The processor 3420 may load a command or data, which is received from at least one of other elements (e.g., the communication module 3490), into a volatile memory 3432 to process the command or data and may store the result data into a nonvolatile memory 3434.

The memory 3430 may include, for example, the volatile memory 3432 or the nonvolatile memory 3434. The volatile memory 3432 may include, for example, a random access memory (RAM) (e.g., a dynamic RAM (DRAM), a static RAM (SRAM), or a synchronous DRAM (SDRAM)). The nonvolatile memory 3434 may include, for example, a read-only memory (ROM), a programmable ROM (PROM), an one time PROM (OTPROM), an erasable PROM (EPROM), an electrically EPROM (EEPROM), a mask ROM, a flash ROM, a flash memory, a hard disk drive (HDD), or a solid-state drive (SSD). In addition, the nonvolatile memory 3434 may be configured in the form of an internal memory 3436 or the form of an external memory 3438 which is available through connection only if necessary, according to the connection with the electronic device 3401. The external memory 3438 may further include a flash drive such as compact flash (CF), secure digital (SD), micro-SD, mini-SD, extreme digital (xD), a multimedia card (MMC), or a memory stick. The external memory 3438 may be operatively or physically connected with the electronic device 3401 in a wired manner (e.g., a cable or a USB) or a wireless (e.g., Bluetooth) manner.

For example, the memory 3430 may store, for example, at least one different software element, such as a command or data associated with the program 3440, of the electronic device 3401. The program 3440 may include, for example, a kernel 3441, a library 3443, an application framework 3445 or an application program (interchangeably, "application") 3447.

The input device 3450 may include a microphone, a mouse, or a keyboard. According to an embodiment, the keyboard may include a keyboard physically connected or a virtual keyboard displayed through the display device 3460.

The display device 3460 may include a display, a hologram device or a projector, and a control circuit to control a relevant device. The display may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 3401.

The audio module 3470 may convert, for example, from a sound into an electrical signal or from an electrical signal into the sound. According to an embodiment, the audio module 3470 may acquire sound through the input device 3450 (e.g., a microphone) or may output sound through an output device (not illustrated) (e.g., a speaker or a receiver) included in the electronic device 3401, an external electronic device (e.g., the electronic device 3402 (e.g., a wireless speaker or a wireless headphone)) or an electronic device 3406 (e.g., a wired speaker or a wired headphone) connected with the electronic device 3401.

The sensor module 3476 may measure or detect, for example, an internal operating state (e.g., power or temperature) of the electronic device 3401 or an external environment state (e.g., an altitude, a humidity, or brightness) to generate an electrical signal or a data value corresponding to the information of the measured state or the detected state. The sensor module 3476 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint senor, a heartbeat rate monitoring (HRM) sensor, an e-nose sensor, an electromyography (EMG) sensor, an electroencephalogram (EEG) sensor, an electrocardiogram (ECG) sensor), a temperature sensor, a humidity sensor, an illuminance sensor, or an ultraviolet (UV) sensor. The sensor module 3476 may further include a control circuit for controlling at least one or more sensors included therein. According to an embodiment, the electronic device 3401 may control the sensor module 3476 by using the processor 3420 or a processor (e.g., a sensor hub) separate from the processor 3420. In the case that the separate processor (e.g., a sensor hub) is used, while the processor 3420 is in a sleep state, the separate processor may operate without awakening the processor 3420 to control at least a portion of the operation or the state of the sensor module 3476.

According to an embodiment, the interface 3477 may include a HDMI, a USB, an optical interface, a recommended standard 232 (RS-232), a D-subminiature (D-sub), a mobile high-definition link (MHL) interface, a SD card/MMC interface, or an audio interface. A connector 3478 may physically connect the electronic device 3401 and the electronic device 3406. According to an embodiment, the connector 3478 may include, for example, an USB connector, an SD card/MMC connector, or an audio connector (e.g., a headphone connector).

The haptic module 3479 may convert an electrical signal into mechanical stimulation (e.g., vibration or motion) or into electrical stimulation. For example, the haptic module 3479 may apply tactile or kinesthetic stimulation to a user. The haptic module 3479 may include, for example, a motor, a piezoelectric element, or an electric stimulator.

The camera module 3480 may capture, for example, a still image and a moving picture. According to an embodiment, the camera module 3480 may include at least one lens (e.g., a wide-angle lens and a telephoto lens, or a front lens and a rear lens), an image sensor, an ISP, or a flash (e.g., a LED or a xenon lamp).

The power management module 3488, which is to manage the power of the electronic device 3401, may constitute at least a portion of a power management integrated circuit (PMIC).

The battery 3489 may include a primary cell, a secondary cell, or a fuel cell and may be recharged by an external power source to supply power at least one element of the electronic device 3401.

The communication module 3490 may establish a communication channel between the electronic device 3401 and an external device (e.g., the first external electronic device 3402, the second external electronic device 3404, or the server 3408). The communication module 3490 may support wired communication or wireless communication through the established communication channel. According to an embodiment, the communication module 3490 may include a wireless communication module 3492 or a wired communication module 3494. The communication module 3490 may communicate with the external device through a first network 3498 (e.g. a wireless LAN such as Bluetooth or infrared data association (IrDA)) or a second network 3499 (e.g., a wireless WAN such as a cellular network) through a relevant module among the wireless communication module 3492 or the wired communication module 3494.

The wireless communication module 3492 may support, for example, cellular communication, local wireless communication, GNSS communication. The cellular communication may include, for example, LTE, LTE-A, CDMA, WCDMA, UMTS, WiBro, or GSM. The local wireless communication may include Wi-Fi, Wi-Fi Direct, light fidelity (Li-Fi), Bluetooth, BLE, Zigbee, NFC, MST, RF, or a BAN. The GNSS may include at least one of a GPS, a Glonass, Beidou navigation satellite system (Beidou), the European global satellite-based navigation system (Galileo), or the like.

According to an embodiment, when the wireless communication module 3492 supports cellar communication, the wireless communication module 3492 may, for example, identify or authenticate the electronic device 3401 within a communication network using the SIM 3496. According to an embodiment, the wireless communication module 3492 may include a CP separate from the processor 3420 (e.g., an AP). In this case, the CP may perform at least a portion of functions associated with at least one of elements 3410 to 3496 of the electronic device 3401 in substitute for the processor 3420 when the processor 3420 is in an inactive (sleep) state, and together with the processor 3420 when the processor 3420 is in an active state. According to an embodiment, the wireless communication module 3492 may include a plurality of communication modules, each supporting only a relevant communication scheme among cellular communication, local wireless communication, or a GNSS communication.

The wired communication module 3494 may include, for example, a LAN service, a power line communication, or a POTS.

For example, the first network 3498 may employ, for example, Wi-Fi direct or Bluetooth for transmitting or receiving commands or data through wireless direct connection between the electronic device 3401 and the first external electronic device 3402. The second network 3499 may include a telecommunication network (e.g., a computer network such as a LAN or a WAN, the Internet or a telephone network) for transmitting or receiving commands or data between the electronic device 3401 and the second electronic device 3404.

According to various embodiments, the commands or the data may be transmitted or received between the electronic device 3401 and the second external electronic device 3404 through the server 3408 connected with the second network 3499. Each of the first and second external electronic devices 3402 and 3404 may be a device of which the type is different from or the same as that of the electronic device 3401. According to various embodiments, all or a part of operations that the electronic device 3401 will perform may be executed by another or a plurality of electronic devices (e.g., the electronic devices 3402 and 3404 or the server 3408). According to an embodiment, in the case that the electronic device 3401 executes any function or service automatically or in response to a request, the electronic device 3401 may not perform the function or the service internally, but may alternatively or additionally transmit requests for at least a part of a function associated with the electronic device 3401 to any other device (e.g., the electronic device 3402 or 3404 or the server 3408). The other electronic device (e.g., the electronic device 3402 or 3404 or the server 3408) may execute the requested function or additional function and may transmit the execution result to the electronic device 3401. The electronic device 3401 may provide the requested function or service using the received result or may additionally process the received result to provide the requested function or service. To this end, for example, cloud computing, distributed computing, or client-server computing may be used.

Various embodiments of the disclosure and terms used herein are not intended to limit the technologies described in the disclosure to specific embodiments, and it should be understood that the embodiments and the terms include modification, equivalent, and/or alternative on the corresponding embodiments described herein. With regard to description of drawings, similar elements may be marked by similar reference numerals. The terms of a singular form may include plural forms unless otherwise specified. In the disclosure disclosed herein, the expressions "A or B," "at least one of A and/or B," "A, B, or C," or "at least one of A, B, and/or C," and the like used herein may include any and all combinations of one or more of the associated listed items. Expressions such as "first," or "second," and the like, may express their elements regardless of their priority or importance and may be used to distinguish one element from another element but is not limited to these components. When an (e.g., first) element is referred to as being "(operatively or communicatively) coupled with/to" or "connected to" another (e.g., second) element, it may be directly coupled with/to or connected to the other element or an intervening element (e.g., a third element) may be present.

According to the situation, the expression "adapted to or configured to" used herein may be interchangeably used as, for example, the expression "suitable for," "having the capacity to," "changed to," "made to," "capable of" or "designed to" in hardware or software. The expression "a device configured to" may mean that the device is "capable of" operating together with another device or other components. For example, a "processor configured to (or set to) perform A, B, and C" may mean a dedicated processor (e.g., an embedded processor) for performing corresponding operations or a generic-purpose processor (e.g., a CPU or an AP) which performs corresponding operations by executing one or more software programs which are stored in a memory device (e.g., the memory 3430).

The term "module" used herein may include a unit, which is implemented with hardware, software, or firmware, and may be interchangeably used with the terms "logic," "logical block," "component," "circuit," or the like. The "module" may be a minimum unit of an integrated component or a part thereof or may be a minimum unit for performing one or more functions or a part thereof. The "module" may be implemented mechanically or electronically and may include, for example, an application-specific integrated circuit (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media (e.g., the memory 3430) in the form of a program module. The instruction, when executed by a processor (e.g., the processor 3420), may cause the processor to perform a function corresponding to the instruction. The computer-readable recording medium may include a hard disk, a floppy disk, a magnetic media (e.g., a magnetic tape), an optical media (e.g., a compact disc ROM (CD-ROM) and a DVD, a magneto-optical media (e.g., a floptical disk)), an embedded memory, and the like. The one or more instructions may contain a code made by a compiler or a code executable by an interpreter.

Each element (e.g., a module or a program module) according to various embodiments may be composed of single entity or a plurality of entities, a part of the above-described sub-elements may be omitted, or other sub-elements may be further included. Alternatively or additionally, after being integrated in one entity, some elements (e.g., a module or a program module) may identically or similarly perform the function executed by each corresponding element before integration. According to various embodiments, operations executed by modules, program modules, or other elements may be executed by a successive method, a parallel method, a repeated method, or a heuristic method, or at least one part of operations may be executed in different sequences or omitted. Alternatively, other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An antenna assembly in a vehicle, the antenna assembly comprising:
    a first plane including a first edge and a second edge extending in parallel to each other in a first direction;
    a second plane spaced apart from the first plane that overlaps the first plane and including a third edge extending along the first edge, and a fourth edge extending along the second edge;
    a layer interposed between the first plane and the second plane, the layer interposed between the first plane and the second plane comprising a non-conductive portion and a conductive portion; and
    a plurality of wireless communication circuits electrically connected to the antenna assembly,
    wherein the first plane further includes:
        a first conductive pattern formed along a portion of the first edge, and
        a second conductive pattern formed along a portion of the second edge,
    wherein the first conductive pattern and the second conductive pattern are positioned diagonally at opposing corners from each other when viewed from above the first plane,
    wherein the second plane includes:
        a third conductive pattern formed along a portion of the third edge, and
        a fourth conductive pattern formed along a portion of the fourth edge,
    wherein the third conductive pattern and the fourth conductive pattern are positioned diagonally at opposing corners with each other without overlapping with the first and second conductive patterns, when viewed from above the first plane, and
    wherein the conductive portion of the layer interposed between the first plane and the second plane is different from the first conductive pattern, the second conductive pattern, the third conductive pattern, and the fourth conductive pattern.

2. The antenna assembly of claim 1, wherein the plurality of wireless communication circuits includes:
    a first electrically conductive line electrically connected to the first conductive pattern;
    a second electrically conductive line electrically connected to the second conductive pattern;
    a third electrically conductive line electrically connected to the third conductive pattern; and
    a fourth electrically conductive line electrically connected to the fourth conductive pattern.

3. The antenna assembly of claim 2,
    wherein a first signal having a frequency of 0.7 GHz to 1 GHz or 1.7 GHz to 3.0 GHz is provided to the first electrically conductive line,
    wherein a second signal having a frequency of 0.7 GHz to 1 GHz or 1.7 GHz to 3.0 GHz is provided to the second electrically conductive line,
    wherein a third signal having a frequency of 0.7 GHz to 1 GHz or 1.7 GHz to 3.0 GHz is provided to the third electrically conductive line, and
    wherein a fourth signal having a frequency of 0.7 GHz to 1 GHz or 1.7 GHz to 3.0 GHz is provided to the fourth electrically conductive line.

4. The antenna assembly of claim 3, wherein the first to fourth signals are in compliance with a long term evolution (LTE) standard.

5. The antenna assembly of claim 1,
    wherein the first conductive pattern includes a first elongated strip formed at the portion of the first edge, and
    wherein the second conductive pattern includes a second elongated strip formed at the portion of the second edge.

6. The antenna assembly of claim 5,
    wherein the third conductive pattern includes a first open loop spaced apart from the third edge when viewed from above the first plane, and
    wherein the fourth conductive pattern includes a second open loop spaced apart from the fourth edge when viewed from above the first plane.

7. The antenna assembly of claim 1, further comprising a fifth conductive pattern formed on or above the first plane between the first and second edges without overlapping with the first to fourth conductive patterns when viewed from above the first plane.

8. The antenna assembly of claim 7, wherein the plurality of wireless communication circuits is configured to receive a global positioning system (GPS) signal through the fifth conductive pattern.

9. The antenna assembly of claim 8, further comprising a sixth conductive pattern formed on or above the first plane between the first and second edges without overlapping with the first to fifth conductive patterns when viewed from above the first plane.

10. The antenna assembly of claim 9, wherein the plurality of wireless communication circuits is configured to receive a satellite digital audio radio service (SDARS) signal through the sixth conductive pattern.

11. The antenna assembly of claim 10, further comprising a seventh conductive pattern formed on or above the second plane between the third and fourth edges without overlapping with the first to sixth conductive patterns when viewed from above the first plane.

12. The antenna assembly of claim 11, wherein the plurality of wireless communication circuits is configured to transmit and/or receive a Wi-Fi signal through the sixth conductive pattern.

13. The antenna assembly of claim 1, wherein at least one of the first plane or second plane includes a conductive layer forming a ground plane.

14. The antenna assembly of claim 1, further comprising a printed circuit board including a conductive layer forming a ground plane between the first plane and the second plane.

15. The antenna assembly of claim 14, wherein the conductive layer includes at least one slit configured to transmit and/or receive a signal from the plurality of wireless communication circuits.

16. A housing of an electronic device, the housing comprising:
   a first plane including a first edge and a second edge extending in parallel to each other in a first direction;
   a second plane spaced from the first plane that overlaps the first plane and including a third edge extending along the first edge, and a fourth edge extending along the second edge;
   a layer interposed between the first plane and the second plane, the layer interposed between the first plane and the second plane comprising a non-conductive portion and a conductive portion; and
   a plurality of wireless communication circuits electrically connected to conductive patterns including a first conductive pattern or a second conductive pattern,
   wherein the first plane includes the first conductive pattern formed along a portion of the first edge,
   wherein the second plane includes the second conductive pattern formed along a portion of the third edge or the fourth edge and formed without overlapping with the first conductive pattern when viewed from above the first plane, and
   wherein the conductive portion of the layer interposed between the first plane and the second plane is different from the conductive patterns.

17. The housing of claim 16, wherein the plurality of wireless communication circuits includes:
   a first electrically conductive line electrically connected to the first conductive pattern; and
   a second electrically conductive line electrically connected to the second conductive pattern.

18. The housing of claim 17, wherein the plurality of wireless communication circuits is configured to transmit and/or receive a signal in compliance with a long term evolution (LTE) standard through at least one of the first electrically conductive line or the second electrically conductive line.

19. The housing of claim 16, further comprising:
   a printed circuit board including a conductive layer forming a ground plane between the first plane and the second plane.

20. The housing of claim 19, wherein the conductive layer includes at least one slit, and
   wherein the plurality of wireless communication circuits is configured to transmit and/or receive a signal through the at least one slit.

* * * * *